United States Patent
Brandstetter et al.

(10) Patent No.: US 11,551,238 B2
(45) Date of Patent: Jan. 10, 2023

(54) SYSTEMS AND METHODS FOR CONTROLLING MEDIA CONTENT ACCESS PARAMETERS

(71) Applicant: IPAR, LLC, San Francisco, CA (US)

(72) Inventors: Jeffrey D. Brandstetter, San Francisco, CA (US); Joseph L. Spears, Hayward, CA (US)

(73) Assignee: IPAR, LLC, San Francisco, CA (US)

( * ) Notice: Subject to any disclaimer, the term of this patent is extended or adjusted under 35 U.S.C. 154(b) by 783 days.

(21) Appl. No.: 15/990,990

(22) Filed: May 29, 2018

(65) Prior Publication Data

US 2018/0276686 A1 Sep. 27, 2018

Related U.S. Application Data

(63) Continuation of application No. 12/697,145, filed on Jan. 29, 2010, now abandoned.

(51) Int. Cl.
*G06Q 30/02* (2012.01)
*G06Q 30/06* (2012.01)
(Continued)

(52) U.S. Cl.
CPC ......... *G06Q 30/02* (2013.01); *G06Q 30/0201* (2013.01); *G06Q 30/0204* (2013.01); *G06Q 30/06* (2013.01); *G06Q 30/0625* (2013.01); *H04N 21/252* (2013.01); *H04N 21/25841* (2013.01); *H04N 21/25883* (2013.01);
(Continued)

(58) Field of Classification Search
CPC ........... H04N 21/252; H04N 21/25841; H04N 21/25883; H04N 21/47211; H04N 21/4755; H04N 21/4782; H04N 21/4828; G06Q 30/02; G06Q 30/0201; G06Q 30/0204;
(Continued)

(56) References Cited

U.S. PATENT DOCUMENTS

| 5,664,133 A | 9/1997 | Malamud et al. |
| 5,737,527 A | 4/1998 | Shiels et al. |

(Continued)

FOREIGN PATENT DOCUMENTS

WO   WO 2008/094616   8/2008

OTHER PUBLICATIONS

"Service Delivery within an IMS Environment"; John O'Connell; IEEE Vehicular Technology Magazine—Mar. 2007 (Year: 2007).*

(Continued)

*Primary Examiner* — John W Hayes
*Assistant Examiner* — Edgar R. Martinez-Hernandez
(74) *Attorney, Agent, or Firm* — Jones Day

(57) ABSTRACT

Systems and methods enabling marketing and distribution of motion pictures and other media content by content creators and other content providers are described herein. A platform is provided by which a plurality of content providers can market and distribute media content to users. Information about activity of the users on the platform is obtained in relation to the item of media content or in relation to media content related to the item of media content. A request is received for an activity report comprising information related to a user demographic or a media content characteristic. Responsive to the activity report request, the activity report is provided to the content provider.

14 Claims, 62 Drawing Sheets

(51) Int. Cl.

| | |
|---|---|
| H04N 21/25 | (2011.01) |
| H04N 21/258 | (2011.01) |
| H04N 21/472 | (2011.01) |
| H04N 21/475 | (2011.01) |
| H04N 21/4782 | (2011.01) |
| H04N 21/482 | (2011.01) |
| H04H 60/33 | (2008.01) |
| H04H 60/63 | (2008.01) |
| H04H 60/66 | (2008.01) |

(52) U.S. Cl.
CPC ..... *H04N 21/4755* (2013.01); *H04N 21/4782* (2013.01); *H04N 21/47211* (2013.01); *H04N 21/4828* (2013.01); *H04H 60/33* (2013.01); *H04H 60/63* (2013.01); *H04H 60/66* (2013.01)

(58) Field of Classification Search
CPC .... G06Q 30/06; G06Q 30/0625; H04H 60/33; H04H 60/63; H04H 60/66
See application file for complete search history.

(56) References Cited

U.S. PATENT DOCUMENTS

| | | | |
|---|---|---|---|
| 5,802,361 A | 9/1998 | Wang et al. | |
| 7,136,853 B1 | 11/2006 | Kohda et al. | |
| 7,302,591 B2* | 11/2007 | Oliver | G06F 21/10 713/193 |
| 7,464,058 B2 | 12/2008 | Yen et al. | |
| 7,627,530 B2* | 12/2009 | Siegel | G06F 21/10 705/57 |
| 7,806,329 B2 | 10/2010 | Dmitriev et al. | |
| 8,001,612 B1* | 8/2011 | Wieder | H04L 63/0807 726/28 |
| 8,011,012 B2* | 8/2011 | Carle | H04N 7/1675 726/27 |
| 8,199,935 B2* | 6/2012 | Davidson | G11B 27/034 381/119 |
| 8,639,625 B1* | 1/2014 | Ginter | H04L 63/101 705/50 |
| 8,707,375 B2* | 4/2014 | Hainline | H04N 21/23113 725/87 |
| 9,436,805 B1* | 9/2016 | Kravets | G06F 21/10 |
| 9,635,435 B1* | 4/2017 | Roberts | G06Q 30/02 |
| 2002/0120501 A1 | 8/2002 | Bell et al. | |
| 2002/0184314 A1 | 12/2002 | Riise | |
| 2004/0139318 A1* | 7/2004 | Fiala | G06Q 20/1235 713/165 |
| 2004/0261114 A1* | 12/2004 | Addington | H04N 7/165 725/106 |
| 2005/0120858 A1* | 6/2005 | Fitzgerald | H04N 21/8113 84/1 |
| 2005/0131762 A1 | 6/2005 | Bharat et al. | |
| 2006/0011716 A1* | 1/2006 | Perkowski | G06Q 30/02 235/375 |
| 2006/0020596 A1 | 1/2006 | Liu et al. | |
| 2006/0089912 A1* | 4/2006 | Spagna | G06Q 30/00 705/51 |
| 2006/0173782 A1* | 8/2006 | Gargi | H04N 21/25841 348/E7.071 |
| 2006/0235723 A1 | 10/2006 | Millard | |
| 2006/0278064 A1 | 12/2006 | Lourdeaux | |
| 2007/0073596 A1 | 3/2007 | Alexander et al. | |
| 2007/0106551 A1 | 5/2007 | McGucken | |
| 2007/0112811 A1* | 5/2007 | Shen | H04N 21/4424 |
| 2007/0156594 A1 | 7/2007 | McGucken | |
| 2007/0169165 A1 | 7/2007 | Crull et al. | |
| 2007/0204011 A1* | 8/2007 | Shaver | H04N 21/4782 709/219 |
| 2007/0204308 A1 | 8/2007 | Nicholas et al. | |
| 2007/0214179 A1 | 9/2007 | Hoang | |
| 2007/0288308 A1 | 12/2007 | Chen et al. | |
| 2008/0034329 A1 | 2/2008 | Posner et al. | |
| 2008/0040475 A1 | 2/2008 | Bosworth et al. | |
| 2008/0066099 A1 | 3/2008 | Brodersen et al. | |
| 2008/0071688 A1 | 3/2008 | Corbett et al. | |
| 2008/0090513 A1 | 4/2008 | Collins et al. | |
| 2008/0114750 A1 | 5/2008 | Saxena et al. | |
| 2008/0201225 A1 | 8/2008 | Maharajh et al. | |
| 2008/0235216 A1 | 9/2008 | Ruttenberg | |
| 2009/0037355 A1 | 2/2009 | Brave et al. | |
| 2009/0089398 A1* | 4/2009 | Lambert | G06F 21/10 709/217 |
| 2009/0197681 A1 | 8/2009 | Krishnamoorthy et al. | |
| 2009/0199227 A1 | 8/2009 | Kennedy | |
| 2009/0217036 A1 | 8/2009 | Irwin et al. | |
| 2009/0240586 A1 | 9/2009 | Ramer et al. | |
| 2010/0058485 A1 | 3/2010 | Gonzalez | |
| 2010/0086283 A1 | 4/2010 | Ramachandran et al. | |
| 2010/0094866 A1 | 4/2010 | Cuttner et al. | |
| 2010/0094878 A1 | 4/2010 | Soroca et al. | |
| 2010/0106965 A1* | 4/2010 | Ross | H04L 9/3213 713/156 |
| 2010/0205628 A1 | 8/2010 | Davis et al. | |
| 2010/0263005 A1 | 10/2010 | White | |
| 2010/0281093 A1* | 11/2010 | Poder | H04L 67/1097 709/201 |
| 2011/0145719 A1 | 6/2011 | Chen et al. | |
| 2011/0219394 A1 | 9/2011 | Lueth et al. | |
| 2011/0246574 A1 | 10/2011 | Lento et al. | |
| 2011/0265113 A1 | 10/2011 | Apfel et al. | |
| 2011/0289084 A1 | 11/2011 | Fisher | |
| 2012/0089996 A1 | 4/2012 | Ramer et al. | |
| 2012/0131171 A1 | 5/2012 | Samuel et al. | |
| 2012/0136812 A1 | 5/2012 | Brdiczka | |
| 2016/0225059 A1* | 8/2016 | Chow | H04L 67/02 |

OTHER PUBLICATIONS

"Digital Rights Management and Watermarking of Multimedia Content for M-Commerce Applications"; Frank Hartung and Friedhelm Ramme, Ericsson Research; IEEE Communications Magazine—Nov. 2000 (Year: 2000).*

"Applying Digital Rights Management to Complex Content Management Systems"; Marcos C. d'Ornellas; 2008 11th IEEE International Conference on Computational Science and Engineering (Year: 2008).*

"An Access Control Protocol for Embedded Devices"; Martin Naedele; 2006 IEEE International Conference on Industrial Informatics (Year: 2006).*

Mystrands, Inc.; Mystrands Discovery for Windows; www.mystrands.com; 2006.

Pereira, Fernando, Vetro, Anthony, Sikora, Thomas; Multimedia Retrieval and Delivery; Essential Metadata Challenges and Standards; Proceedings of the IEEE, 96(4); pp. 721-744; 2008.

International Search Report and Written Opinion of the International Searching Authority; PCT/US2011/022865; dated Apr. 2011.

Written Opinion of the International Searching Authority; PCT/US2011/022871; 2012.

Digital Video Broadcasting; Content Protection and Copy Management; pp. 1-103; 2005.

Muhlbauer, Adam, Safavi-Naini, Reihaneh, Salim, Farzad, Sheppard, Nicholas, Surminen, Martin; Location Constraints in Digital Rights Management; Computer Communications, Elsevier Science Publishers, 31(6); pp. 1173-1180; 2008.

Written Opinion of the International Searching Authority; PCT/US2011/022876; 2012.

Subramanya, S.R., Yi, Byung; Utility Model for On-Demand Digital Content; Computer, IEEE Service Center, vol. 38, 6(1); pp. 95-98; 2005.

International Search Report and Written Opinion of the International Searching Authority; PCT/US2011/022902; dated Apr. 2011.

PR Newswire; Press Release; Mar. 12, 2011.

Spears, Joseph; GMANE Article, Beginner Questions on Clustering & M/R; Jul. 15, 2010.

Spears, Joseph; GMANE Article, Recommending Items for Anonymous Users; Apr. 19, 2010.

(56) References Cited

OTHER PUBLICATIONS

International Search Report and Written Opinion of the International Searching Authority; PCT/US2012/047520; dated Dec. 2012.
International Search Report and Written Opinion of the International Searching Authority; PCT/US2011/022877; dated Oct. 2011.
Chinese Application No. 201180017413.5, Decision on Rejection, dated Aug. 2, 2016.
Na, Li, Al-Jun, Li; Research of Precision Advertising Based on Neural Network; Computer Knowledge and Technology, 6(1); Aug. 7, 2008.

* cited by examiner

License Cross Sell

License Definition | Territories

Select a Source License

Purchase — Purchase this film for $20
Rental — Rent this film for $4

Select the Cross-Sell Film and License

Video Title
Rental — Rent this film for $4
Play Once — Watch this film once for $3

Price
Currency: USD ($)
Start Date
End Date
☑ Active

Submit
Cancel

IndiePlaya™
*Where My Movies Play™*

Welcome back, advertiser!
Want to Logout? Click Here

Account Manage
Catalog Reports Ad Campaigns

[Search] Advanced Search Search Tips

- ▶ Browse
- ▼ Genre
  - All Genres
- ▲ Title
- ▲ Rating
- ▲ Activity
- ▲ Release Date
- ▲ Favorites

Ad Details

Which video are you promoting?
[video111 ▼]

How many times should your ad be shown?
[100,000 ▼]

What keywords would you like to attach to your ad?

New Keyword

[Add Keyword To List]    [Remove Selected Keyword From List]

Campaign Dates
12/29/2009    When should your ad be shown?
              When should this ad expire? (leave blank for 'never')

Demographic Restrictions

[No Age Limit ▼]    What is the minimum age of a user that should be shown your ad?
[No Age Limit ▼]    What is the maximum age of a user that should bbe shown your ad?

Male
Female              What genders should your ad be shown to?
Unauthenticated Users United States
Afghanistan
Aland Islands
Albania             Which Countries should your ad be shown in?
Algeria
American Samoa
Andorra
Angola
Anguilla
Anarctica

[Submit]  [Reset]

About Us  Contact  Feeds  Help  Careers  Press  Privacy Policy  Terms of Services © 2000-2010 IndiePlaya, Inc. All rights reserved. IndiePlaya and the IndiePlaya logo are trademarks or registered trademarks of IndiePlaya, Inc. in the U.S. and/or other countries. All other trademarks and logos are the property of their

IndiePlaya™
*Where My Movies Play™*

Welcome back, advertiser!
Want to Logout? Click Here

Account  Manage
Catalog  Reports  Ad Campaigns

[Search]  Advanced Search  Search Tips

▼ Browse
▼ Genre
  *All Genres*
▲ Title
▲ Rating
▲ Activity
▲ Release Date
▲ Favorites

Ad Details

You are promoting
*video11*

Your ad will be shown up to 100.00 times

You will use the following keywords to promote your ad:
*fds*

Cost

Placing this ad will have a total cost of USD 25.00.

Campaign Dates

Your ad will be shown on 12/29/2009
Your ad will be shown until it has been seen 100,000 times

Demographic Restrictions

Your ad will be seen by users of any age.
Your ad may be seen by the following groups:
*Woman*
*Men*
Users who have not stated *their gender*
Your ad may be seen by users in 246 countries. Click for details

[Confirm]  [Cancel]

About Us    Contact    Feeds    Help    Careers    Press    Privacy Policy    Terms of Services © 2006-2010 IndiePlaya, Inc. All rights reserved. IndiePlaya and the IndiePlaya logo are trademarks or registered trademarks of IndiePlaya, Inc. in the U.S. and/or other countries. All other trademarks and logos are the property of their

FIG. 24D indiePlaya™
*Where My Movies Play*™

2450 →

Welcome back, advertiser1
Want to Logout? Click Here

Account Manage
Catalog Reports Ad Campaigns

[Search] Advanced Search Search Tips

- Browse
  - Genre
    All Genres
  - Title
  - Rating
  - Activity
  - Release Date
  - Favorites

Ad Details

You are promoting
video241
You currently have 244 remaining times to show your ad.

[100,000 ▼]  How many more times should your ad be shown?

Update Campaign dates

[12/29/2009 ▼]  When should your ad first be shown?
When should this ad expire? (leave blank for 'never')

Update Demographic Restrictions

[No Age Limit ▼]  What is the minimum age of a user that should be shown your ad?
[No Age Limit ▼]  What is the maximum age of a user that should be shown your ad?

Male
Female
Unauthenticated Users

[Renew] [Reset]  What genders should your ad be shown to?

About Us  Contact  Feeds  Help  Careers  Press  Privacy Policy  Terms of Services © 2000-2010, indiePlaya, Inc. All rights reserved. IndiePlaya and the IndiePlaya logo are trademarks or registered trademarks of IndiePlaya, Inc. in the U.S. and/or other countries. All other trademarks and logos are the property of their

FIG. 24E indiePlaya™
*Where My Movies Play™*

Welcome back, consumer0
Want to Logout? Click Here

Account  Settings  Activity  Profile

[Search] Advanced Search  Search Tips

Account Activity

2601 ◁ My Active Rentals

| Title | Purchase Date | Price | |
|---|---|---|---|
| | | Start Time | |
| | Ratings | Start Time | |
| | Genres | | |
| video52 | 7/31/09 11:47 PM | 5.08 | |
| | 167 | 140 | |
| | 1224 | 1224 | |
| | US:R | | |
| | MU | | |

Dec 18, 2009 1:22 PM

▷ My Viewing History
▷ My Purchases
▷ My Download History

▽ Browse
 ▽ Genre
  All Genres
  Action
  Adventure
  Animated
  Biography
  Classic
  Comedy
  Crime
  Cult
  Documentary
  Drama
  Family
  Fantasy
  Historical
  Horror
  Kids
  LGBT
  Musical
  Mystery
  Romance
  Science Fiction
  Sports
  Suspense
  Spy
  Thriller
  War
  Western
 ◁ Title
 ◁ Rating
 ◁ Activity
 ◁ Release Date
 ◁ Favorites About Us  Contact  Feeds  Help  Careers  Press  Privacy Policy  Terms of Services © 2000-2010 IndiePlaya, Inc. All rights reserved. IndiePlaya logo and the IndiePlaya logo are trademarks or registered trademarks of IndiePlaya, Inc. in the U.S. and/or other countries. All other trademarks and logos are the property of their

2600

FIG. 26 indiePlaya™
*Where My Movies Play™*

Account Settings | Activity | Profile

Welcome back, consumer0
Want to Logout? Click Here

🔍 [Search] Advanced Search  Search Tips

Account Activity

▽ Browse
▽ Genre
  All Genres — 2701
  Action
  Adventure
  Animated
  Biography
  Classic
  Comedy
  Crime
  Cult
  Documentary
  Drama
  Family
  Fantasy
  Historical
  Horror
  Kids
  LGBT
  Musical
  Mystery
  Romance
  Science Fiction
  Sports
  Suspense
  Spy
  Thriller
  War
  Western
△ Title
△ Rating
△ Activity
△ Release Date
△ Favorites ▽ My Active Rentals
△ My Viewing History Report Start Date 9/19/09 🗓

| Title | Start Time | End Time | Total Time |
|---|---|---|---|
|  | Ratings |  |  |
|  | Genres |  |  |
| video32 | 10/25/09 12:03 AM | 10/25/09 1:55 AM | 01:52:00 |
|  | US.G |  |  |
|  | Hi |  |  |
| video49 | 9/21/09 12:03 AM | 9/21/09 2:02 AM | 01:59:00 |
|  | US.PG-13 |  |  |
|  | LG |  |  |

Dec 18, 2009 1:22 PM

▽ My Purchases
▽ My Download History

About Us  Contact  Feeds  Help  Careers  Press  Privacy Policy  Terms of Services © 2000-2010 IndiePlaya, Inc. All rights reserved. IndiePlaya and the IndiePlaya logo are trademarks or registered trademarks of IndiePlaya, Inc. in the U.S. and/or other countries. All other trademarks and logos are the property of their

FIG. 27 indiePlaya™
*Where My Movies Play™*

Account   Settings   Activity   Profile

Welcome back, consumer0
Want to Logout? Click Here

[Search]   Advanced Search   Search Tips

Account Activity

▽ Browse
▽ Genre
  All Genres
  Action
  Adventure — 2801
  Animated
  Biography
  Classic
  Comedy
  Crime
  Cult
  Documentary
  Drama
  Family
  Fantasy
  Historical
  Horror
  Kids
  LGBT
  Musical
  Mystery
  Romance
  Science Fiction
  Sports
  Suspense
  Spy
  Thriller
  War
  Western
△ Title
△ Rating
△ Activity
△ Release Date
△ Favorites ▽ My Active Rentals
▽ My Viewing History
△ My Purchases Report Start Date 9/19/09

| Title | Purchase Date | Price | Purchase Type |
|---|---|---|---|
| | Ratings | | |
| | Genres | | |
| video195 | 11/23/09 11:41 PM | $5.12 | Purchase |
| | US:PG-13 | | |
| | FN | | |
| | | Times Watched | Times Downloaded |
| | | 0 | 0 |

Dec 18, 2009 1:22 PM

▽ My Download History

About Us   Contact   Feeds   Help   Careers   Press   Privacy Policy   Terms of Services © 2000-2010 IndiePlaya, Inc. All rights reserved. IndiePlaya and the IndiePlaya logo are trademarks or registered trademarks of IndiePlaya, Inc. in the U.S. and/or other countries. All other trademarks and logos are the property of their

2600 →

FIG. 28 indiePlaya™
*Where My Movies Play ™*

Account Settings | Activity | Profile

🔍 [Search] Advanced Search   Search Tips

Account Activity

▽ My Active Rentals

▽ My Viewing History

△ My Purchases

2901 —— ▽ My Download History

Report Start Date 9/19/09  🗓

| Title | Download Date |
|---|---|
| | Ratings |
| | Genres |

Dec 18, 2009 1:22 PM

Browse
- ▽ Genre
  - All Genres
  - Action
  - Adventure
  - Animated
  - Biography
  - Classic
  - Comedy
  - Crime
  - Cult
  - Documentary
  - Drama
  - Family
  - Fantasy
  - Historical
  - Horror
  - Kids
  - LGBT
  - Musical
  - Mystery
  - Romance
  - Science Fiction
  - Sports
  - Suspense
  - Spy
  - Thriller
  - War
  - Western
- △ Title
- △ Rating
- △ Activity
- △ Release Date
- △ Favorites Welcome back, consumer0
Want to Logout? Click Here About Us   Contact   Feeds   Help   Careers   Press   Privacy Policy   Terms of Services © 2000-2010 indiePlaya, Inc. All rights reserved. indiePlaya logo are trademarks or registered trademarks of indiePlaya, Inc. in the U.S. and/or other countries. All other trademarks and logos are the property of their

SYSTEMS AND METHODS FOR CONTROLLING MEDIA CONTENT ACCESS PARAMETERS

CROSS-REFERENCE TO RELATED APPLICATIONS

This application is a continuation application of U.S. patent application Ser. No. 12/697,145, filed Jan. 29, 2010, entitled "Systems and Methods Enabling Marketing and Distribution of Media Content By Content Creators and Content Providers," which is incorporated herein by reference in its entirety.

TECHNICAL FIELD

The present disclosure relates generally to systems and methods for marketing and distributing media content, including motion pictures, television programming, online games, music, and other media content.

BACKGROUND

Content creators (e.g., filmmakers, television producers, recording artists, online game developers, etc.) are significantly limited in their ability to develop and execute content-related strategies such as processing, marketing, promotion, management, packaging, merchandising, fulfillment, delivery, distribution, licensing, and enforcement of their own content and content-related data. Effective mastering of such efforts is typically beyond the capabilities of content creators because such efforts typically require marketing and distribution resources that are unavailable to the content creators. Because of this limitation, content creators often seek to enter into content-related agreements in which the content creators relinquish control with respect to some or all rights in the content (e.g., a licensing agreement with a film distributor granting various territory or media rights).

One drawback with traditional content-related agreements (e.g., in the entertainment industry) is that they are rarely available to content creators (e.g., independent filmmakers, television producers, or game developers). In other words, often only the most well-known content creators are able to secure a content-related agreement (e.g., a distribution agreement, assignment, or license) with a third party content provider (e.g., a distributor, subdistributor, sales agent, buyer, aggregator, publisher, network, broadcaster, syndicator, assignee, or licensee). Moreover, even when a content creator is able to secure a content-related agreement, the terms are often very one-sided favoring the content provider. Thus, these content-related agreements are often unfairly restrictive to the content creator, limiting additional marketing or distribution of content for a set amount of time (e.g., until costs advanced or expended pursuant to the agreement are fully recouped).

Additionally, often such agreements (i) do not contain any provisions that impose a duty on the content provider to actively market or promote the content creator's content, and/or (ii) the content creator does not have sufficient leverage over the content provider to enforce a provision requiring active marketing and/or promotion of the content. As a result, these agreements can be highly disadvantageous to a content creator for many reasons. For example, over the term of such an agreement, the value of the content is often diminished while the content creator awaits the expiration of the agreement. Moreover, any failure of the content provider to actively market or promote the content can postpone or preclude any potential revenue that may be derived from the content. This can prolong the time it takes for the content creator to recoup the costs associated with creating the content, and in some instances, preclude such recoupment altogether. This can create a cash flow burden on the content creator. Additionally, the terms of such agreements rarely require the content distributor, subdistributor, assignee, or licensee to keep the content creator informed of the success or progress of any content-related strategies.

Thus, what is needed in the art are systems and methods for empowering content creators to market and distribute their own content without entering into onerous one-sided agreements with content providers, such as distributors, subdistributors, assignees, or licensees.

SUMMARY

Embodiments of the present invention provide systems and methods enabling marketing and distribution of motion pictures, television programming, online games, music, and other media content by content creators (e.g., initial copyright owners; "authors," as defined under U.S. copyright law; and those acquiring ownership of media content, such as assignees). Among other things, the systems and methods enable content creators to efficiently market and distribute their content to a target audience based upon reports. These reports can contain historical information regarding purchases (e.g., of similar media content produced by other content creators) by one or more demographic groups. Specifically, information in reports can enable a content creator to devise and execute a content marketing and distribution strategy at low cost, and without the need to relinquish control of the content. The content creator may periodically receive updated reports, and revise one or more marketing or distribution strategies (e.g., based upon the updated reports, the initial reports, or a combination of initial and updated reports). Because the content creator retains his full rights in and to the media content, he may market and distribute the content for any desired length of time and to any desired number of geographic territories. Additionally, the content creator may update his marketing and distribution strategies as frequently as appropriate.

Thus, the systems and methods described herein can be used to facilitate creation, execution, and revision of marketing and distribution strategies for media content by the content creator. Marketing and distribution strategies can be for any type of media content, including media content in digital form that is distributable over a network. In one specific example, the media content is a motion picture or other audiovisual work.

Under one aspect, systems and methods enabling marketing and distribution of motion pictures and other media content by content creators may include providing a platform by which a plurality of content providers can market and distribute media content to users. Information about activity of the users on the platform may be obtained in relation to the item of media content or in relation to media content related to the item of media content. A request may be received for an activity report comprising information related to a user demographic or a media content characteristic. Responsive to the activity report request, the activity report may be provided to the content provider.

As another example, a method of distributing an item of media content associated with a content provider may include providing a platform by which a plurality of content providers can market and distribute media content to users and obtaining, using the platform, information about activity of the users on the platform in relation to the item of media content or in relation to media content related to the item of media content. Systems and methods may further include receiving at the platform a request, by a content provider in the plurality of content providers, for an activity report comprising information related to a license characteristic for media content and responsive to the activity report request, providing, using the platform, the activity report to the content provider.

As a further example, a method of distributing an item of media content associated with a content provider, using a platform by which a first plurality of users can market and distribute media content to a second plurality of users, wherein the platform comprises one or more programmed computers that, individually or collectively, may be suitably programmed to (A) obtain information about activity of the second plurality of users over the Internet or a computer network, (B) receive, at the platform, a first request for an activity report about user activity with respect to media content having a particular characteristic, wherein the first request is received over the Internet or the computer network from the content creator and wherein the media content includes media that was not created by the content creator, and (C) provide, responsive to the first request, the activity report to the content creator over the Internet or the computer network.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 4 shows an exemplary interface for use by a content creator.

FIG. 6 shows an exemplary interface for adding or editing content using a control within the catalog manager.

FIG. 7 shows another example of an interface for adding or editing content using a control within the catalog manager.

FIG. 8 shows another example of an interface for adding or editing content using a control within the catalog manager.

FIG. 10 shows another example of an interface for adding or editing content using a control within the catalog manager.

FIG. 11 shows another example of an interface for adding or editing content using a control within the catalog manager.

FIG. 13 shows an exemplary interface for creating offers using a control within the catalog manager.

FIG. 16 shows an example of an interface for use when interacting with one or more licensing packages.

FIG. 18 shows an exemplary up-sell interface for creating an up-sell option using a control within the catalog manager.

FIG. 19 shows an exemplary interface for use when interacting with one or more up-sell licensing packages.

FIGS. 20, 20A-20B show an exemplary cross-sell interface for creating a cross-sell option using a control within the catalog manager.

FIG. 21 shows an example of an interface for use when interacting with one or more cross-sell licensing packages.

FIG. 22 shows an example of an indirect interface for creating an insider offer using a control within the catalog manager.

FIG. 23 shows an example of an interface for use when interacting with one or more pitch licensing packages.

FIGS. 24A-G show exemplary interfaces for interacting with content to create, renew, generate, and/or display content-related advertisements.

FIG. 26 shows an example of an interface for viewing account activity.

FIG. 27 also shows an example of an interface for viewing account activity.

FIG. 28 also shows an example of an interface for viewing account activity.

FIG. 29 also shows an example of an interface for viewing account activity.

FIG. 30 shows an example of an interface for use by a user when interacting with the system.

FIG. 35 shows an example of an expanded interface for use by a user when interacting with the system.

FIG. 35A shows an exemplary interface including a licensing package upgrade option.

FIG. 36 shows an exemplary interface including an additional "reviews" control.

FIG. 37 shows an example of an interface displaying review data in an expanded viewing area.

FIG. 38 shows an example of an interface that includes an additional "tags" control.

FIG. 39 shows an example of an interface displaying tag data in an expanded viewing area.

FIG. 40 shows an example of an interface including an exemplary activity report.

FIG. 41 shows an example of an interface including another exemplary activity report.

FIG. 43 shows an example of an interface including another exemplary activity report.

FIG. 44 shows an example of an interface including another exemplary activity report.

FIG. 45 shows an example of an interface including another exemplary activity report.

FIG. 46 shows an example of an interface including a pie chart graphic interpretation of content.

FIG. 48 shows an example of an interface including a bar chart graphic interpretation of content.

FIG. 49 shows an example of an interface including a bar chart graphic interpretation of content.

Like reference numbers and designations in the various drawings indicate like elements.

DETAILED DESCRIPTION

Embodiments of the present invention provide a fundamental shift in the way business can be done with respect to media marketing and distribution. Specifically, the systems and methods provided herein enable a content creator (e.g., a filmmaker, musician, or artist) to leverage information compiled about similar media content (e.g., media content created by other content creators) in order to develop and execute "do it yourself" or "do it with others" strategies for marketing and distributing their own content. This information can be compiled, for example, by a platform that both the particular content creator, and other content creators, can use to market and distribute their content to users. As the users use such a platform, the platform can collect information about the users (e.g., their demographics) and user activity (e.g., with respect to each item of content marketed or distributed on the platform). Such information can be compiled into reports for use by content creators in developing and executing one or more strategies for marketing and distributing their own content.

For example, if upon reviewing a report, a content creator determines that first-person horror films are particularly popular with 18-24 year-old males, then the content creator can develop a strategy for marketing primarily to that demographic. In some implementations, the platform can periodically provide updated reports to the content creator, who can adapt the marketing strategy to more efficiently market the content (e.g., based upon new information in the reports and upon the success of the initial marketing strategy). In contrast, as noted above, content creators have traditionally been limited in the amount and types of user purchase information they can feasibly obtain about similar types of media content. As such, they have previously been limited to using conventional methods of marketing and distributing content, which typically require the content creator to relinquish rights in the content to a third party. Relinquishing rights to content limits the content creator's ability to control the marketing and distribution of that content in the future.

Figure 1A:
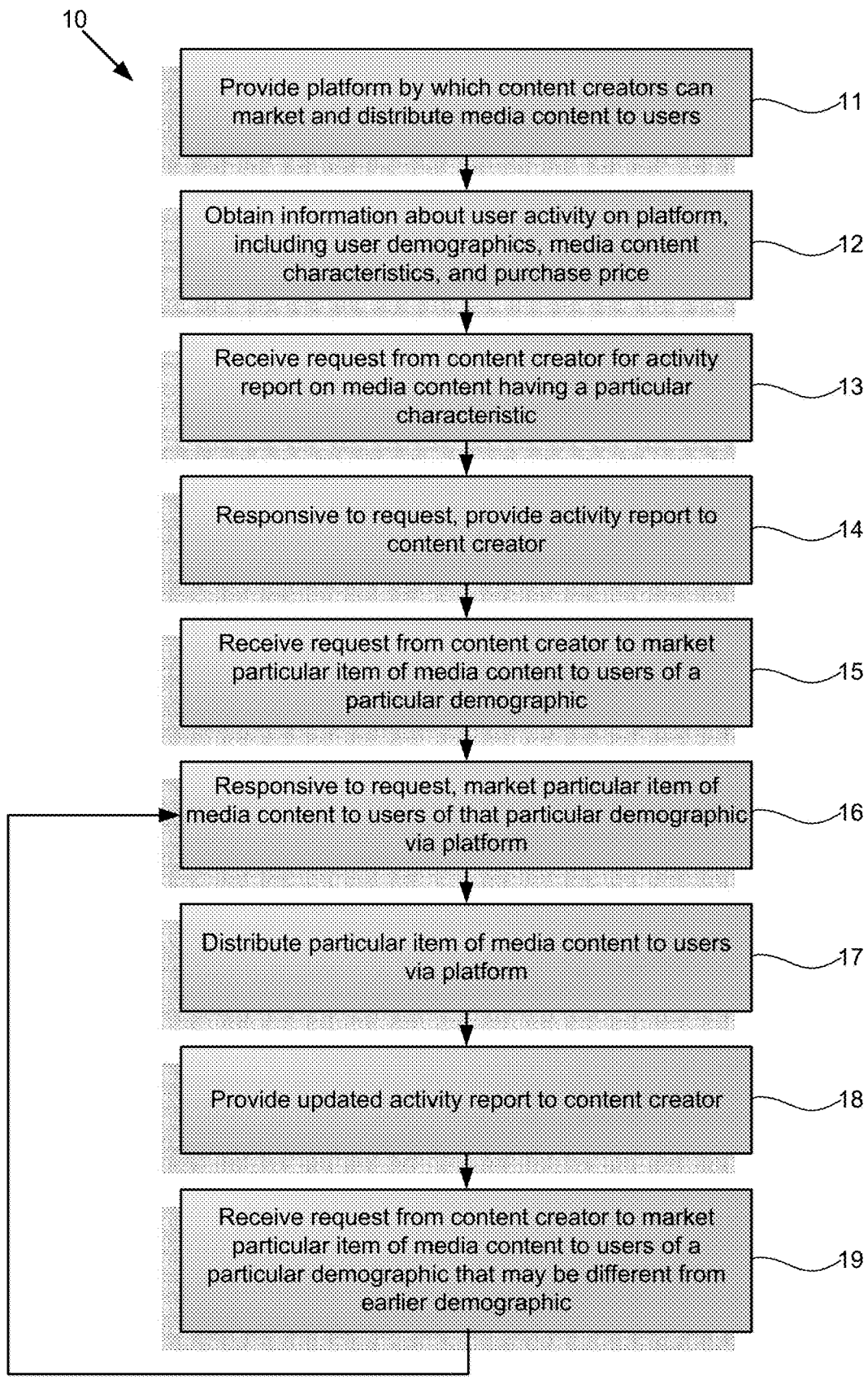
FIG. 1A is a flow chart of an exemplary method of facilitating the marketing and distribution of a particular item of media content by the creator of that media content.

FIG. 1A is a flow chart of an exemplary method 10 of facilitating the marketing and distribution of a particular item of media content by the creator of that media content. The item of media content can be any original work of authorship fixed in any tangible medium of expression, now known or later developed, from which the item of media content can be perceived, reproduced, or otherwise communicated, either directly or with the aid of a machine or a device. That is, the item of media content is the subject matter of a copyright, and the content creator is a human who is the initial (original) owner of that copyright by virtue of having created the work. It should be understood that some original works of authorship may have been jointly created, in which case each joint creator is an initial (original) owner of the copyright of the work, and is considered to be a content creator. In other circumstances, an original work may have been "made for hire," e.g., made under the direction of another human or of an employer; the human or employer who directed the work is considered to be the author of the work for the purposes of copyright law, and is considered to be the initial (original) owner of the copyright for the purposes of this application. In either circumstance, if a content creator has the right to market and distribute the item of media content, he may do so using the systems and methods described herein.

In some circumstances, the content creator may develop and execute a marketing and distribution strategy collaboratively with one or more other persons or entities; in such a circumstance, each member of the collaborative team may be considered to be an agent of the content creator, and can equally use the systems and methods described herein. Examples of such collaborators may, for example, include actors in a motion picture, or audience members.

In many of the embodiments described herein, the item of media content is a digital work of authorship, embodied in a computer-readable medium, that can be distributed to a user's computer over a network, and that can be experienced by the user via one or more output devices connected to the user's computer. For example, the digital work of authorship can be a motion picture or other audiovisual work stored on a remote server, that can be distributed to the user's computer via a network, and that can be displayed on a display device connected to the user's computer and/or audibly projected with audio speakers connected to the user's computer. Or, for example, the digital work of authorship can be a sound recording that similarly can be distributed to the user's computer via a network, and that can be audibly projected with audio speakers connected to the user's computer. Other types of digital works of authorship that can be distributed include literary works (e.g., "digital books") and pictorial or graphic works (e.g., digital images). However, it should be understood that the systems and methods described herein can be used to facilitate marketing and distribution of any original work of authorship, including those fixed in a tangible medium of expression other than a computer-readable memory. As used herein, an item of media content is fixed in any tangible medium of expression when a copy of the media content is made that is sufficiently permanent or stable to permit the media content to be perceived, reproduced, or otherwise communicated for a period of more than transitory duration.

Referring to FIG. 1A, method 10 includes providing a platform by which content creators can market and distribute media content to users (11). A platform can include any suitable system or method by which media content can be marketed and distributed. Additionally, platform information can include any information corresponding to use of the media content (e.g., activity and demographics of users using a platform corresponding to particular media content). In many of the embodiments described herein, a platform includes a computer architecture having a server and a client that communicate over a network, for example as described further below with respect to FIG. 1C. However, it should be understood that any suitable platform can be used, including those based upon technologies other than computer architecture.

Method 10 also includes obtaining information about user activity on the platform (12). Such information can include, for example, user demographics (e.g., ages, geographical locations, ethnicities, genders). Such information can also include, for example, the characteristics of the media content with which each of the users interact, such as the type of media content (e.g., video, audio, graphic, or literary work), the quality of the media content (e.g., high definition, low definition), the rating of the media content (e.g., "PG" or "R"), the genre of the media content (e.g., horror, drama), the way in which the user interacted with the media content (e.g., clicked on an advertisement for the media content, purchased a license to the media content, or purchased the media content outright), and/or the price, if any, that the user paid for the particular interaction with the media content.

In embodiments in which the platform includes a server-client computer architecture, the server may include modules for marketing and distributing media content to users, collecting information about the users and the media content with which they interact, and storing the collected information in a computer-readable medium, such as a database. As used herein, the term "server" is used merely to distinguish devices that provide content from those devices that receive content (e.g., clients). In fact, in many instances, there may be little or no difference between the architecture of the serving devices and the client devices, with the exception that, typically, the server devices provide content and the client devices receive content. Moreover, it will be appreciated by those of skill in the art that the server may run serving software (e.g., Apache), whereas the client devices typically do not. Moreover, it will be appreciated that the networking methods disclosed herein are not limited to client-server implementations. The examples of such architectures is merely given to provide an example of a way to implement the inventive methods. One of skill in the art, based on the present disclosure, will appreciated that other embodiments that do not make use of a client-server architecture are possible and all such implementations are within the scope of the present disclosure.

Method 10 further includes receiving a request from a content creator for an activity report on media content having a particular characteristic (13). For example, the content creator may have created a particular item of media content, such as a motion picture, that the content creator categorizes within a particular genre. Additionally, the content creator may want to market to a demographic most likely to pay a particular (e.g., the highest) fee to receive distribution of the media content. Moreover, the content creator may want to learn more about user activity corresponding to other media content, created by other media creators, within the particular genre in which he believes his content can be best categorized. Thus, the content creator can submit a request for an activity report to the platform, and about media content having the particular characteristic of interest (genre being only one example of such a characteristic). In embodiments in which the platform includes a server-client computer architecture, the client may include a module for constructing such a request and transmitting the request to the server over a network.

Method 10 further includes, responsive to the content creator's request, providing an activity report to the content creator (14). For example, the activity report can be dynamically constructed based upon a particular request of the content creator. Alternatively, the activity report can be prepared ahead of time, (e.g., on a predetermined basis), stored, and subsequently retrieved from persistent storage and provided to the content creator responsive to a request. In embodiments in which the platform includes a server-client architecture, the server may include a module for receiving such a request, for obtaining the activity report responsive to the request, and for providing the activity report to the client over the network.

Method 10 further includes receiving a request from the content creator to market his particular item of media content (e.g., to users of a particular demographic (15) or known interest). For example, upon reviewing the activity report, the content creator may conclude that an item of media content could be most effectively marketed to males aged 18-22. As such, the content creator can construct a request to market the item of media content to users of that particular demographic (e.g., using the platform). Or, for example, upon viewing the activity report, the content creator may conclude that because of varying user preferences, two packages of the item of media content should be made available to users (e.g., both a limited-time license and a purchase option). Thus, in this example, a content creator could conclude that both a first price for the license and a second, higher price for a purchase option could be made available to users. Note that the content creator can request the platform to market any number or type of packages of media content to any number or type of user demographic, and at any price. Examples of client-based interfaces by which the content creator can construct suitable marketing requests are provided further below.

Method 10 further includes, responsive to the request, marketing a particular item of media content to users of a particular demographic using the platform (16). For example, as described above, the platform is configured so as to monitor user demographics as they interact with media content on the system. Based on such monitoring, the platform can, for example, display an advertisement for the item of media content to a user that the platform has identified as being within the particular demographic.

Method 10 further includes distributing the particular item of media content to users using the platform (17). For example, the users can purchase an item or a license to an item, and can download the item over the network (e.g., onto a computer for viewing and/or listening). Additionally, even if not marketed to them, users outside a particular targeted demographic can purchase any item. Thus, in some instances, users outside the particular targeted demographic can be interested in the item, while users within the particular targeted demographic are not interested in the item. For example, the tastes of users within a particular targeted demographic can change; or, for example, the content creator may have erroneously categorized the item of media content to be part of a particular genre when in fact it is more appropriately categorized as part of another genre. Thus, user tastes are highly variable and not always possible to predict, even given accurate historical information about user activity with respect to particular types of content.

Method 10 also includes providing an updated activity report to the content creator (18). The report includes information about user activity corresponding to media content having a particular characteristic, which may be the same or different than the characteristic about which the report was provided in step 14, that has occurred between steps 14 and 18 (e.g., includes more recent information than that in the report of step 14). Such a report can be provided on a one-time basis, responsive to a second request from the content creator (not shown). Alternatively, such a report can be automatically provided to the content creator on a periodic basis, for example responsive to a request by the content creator in step 13 to automatically and periodically provide updated activity reports with a predetermined frequency and for a predetermined amount of time. In embodiments in which the platform includes a server-client architecture, the server may include instructions, embodied in a computer-readable medium, to periodically generate such a report(s).

Method 10 further includes receiving a request from the content creator to market the particular item of media content to users of a particular demographic that may be different from the earlier demographic (e.g., may be different from those defined in step 15) (19). For example, after viewing the updated activity report and considering the user activity generated by his own initial marketing/distribution strategy (e.g., the number and/or type of distribution instances during step 17), the content creator may conclude that modifying his initial strategy may result in improved distribution of his content.

Method 10 includes, responsive to the request of step 19, marketing the particular item of media content to users of that particular demographic via the platform (16) and distributing the particular item of media content to users via the platform (17) (e.g., as described above). Method 10 can further include providing one or more additional updated activity reports to the content creator (18), for example on a periodic basis, as discussed above. Method 10 can further include receiving one or more additional requests (e.g., from a content creator) to market a particular item of media content to users of a particular demographic (e.g., other than a demographic to which the content was previously marketed). Note, however, that the systems and methods described herein do not require that the content creator receive an updated report before revising his marketing/distribution strategy (e.g., before submitting a request to the platform to market the item of media content to users of another particular demographic). Because the content creator retains full rights in the media content, he can revise, update, or modify his marketing and distribution strategies as frequently as desired, and for as long a time period as desired. In comparison, signing an agreement with a content distributor, for example, often requires a content creator to effectively relinquish some or all of the rights in an item of media content, in addition to control over marketing and distribution of the media content.

It will be appreciated that loop 16-19 may be repeated any number of times necessary to achieve the distribution goals of the content creator. Moreover, it will be appreciated that several concurrent instances of loop 16-19 can occur at any given time. For example, one iteration of loop 16-19 may be directed to a first demographic, where this first demographics is then altered or defined (e.g., first demographic prime), at step 19 of the loop. Additionally, another concurrent iteration of loop 16-19 may be directed to a second demographic, where this second demographics is then altered or defined at step 19 of the loop (e.g., first demographic prime). In other words, at step 15 of the method depicted in FIG. 1A, a content creator can choose two or more different demographics (e.g., two different campaigns), where the two or more demographics have some or no overlap with each other and where the user can simultaneously refine, add or drop selected demographics using separate marketing campaigns.

Figure 1B:
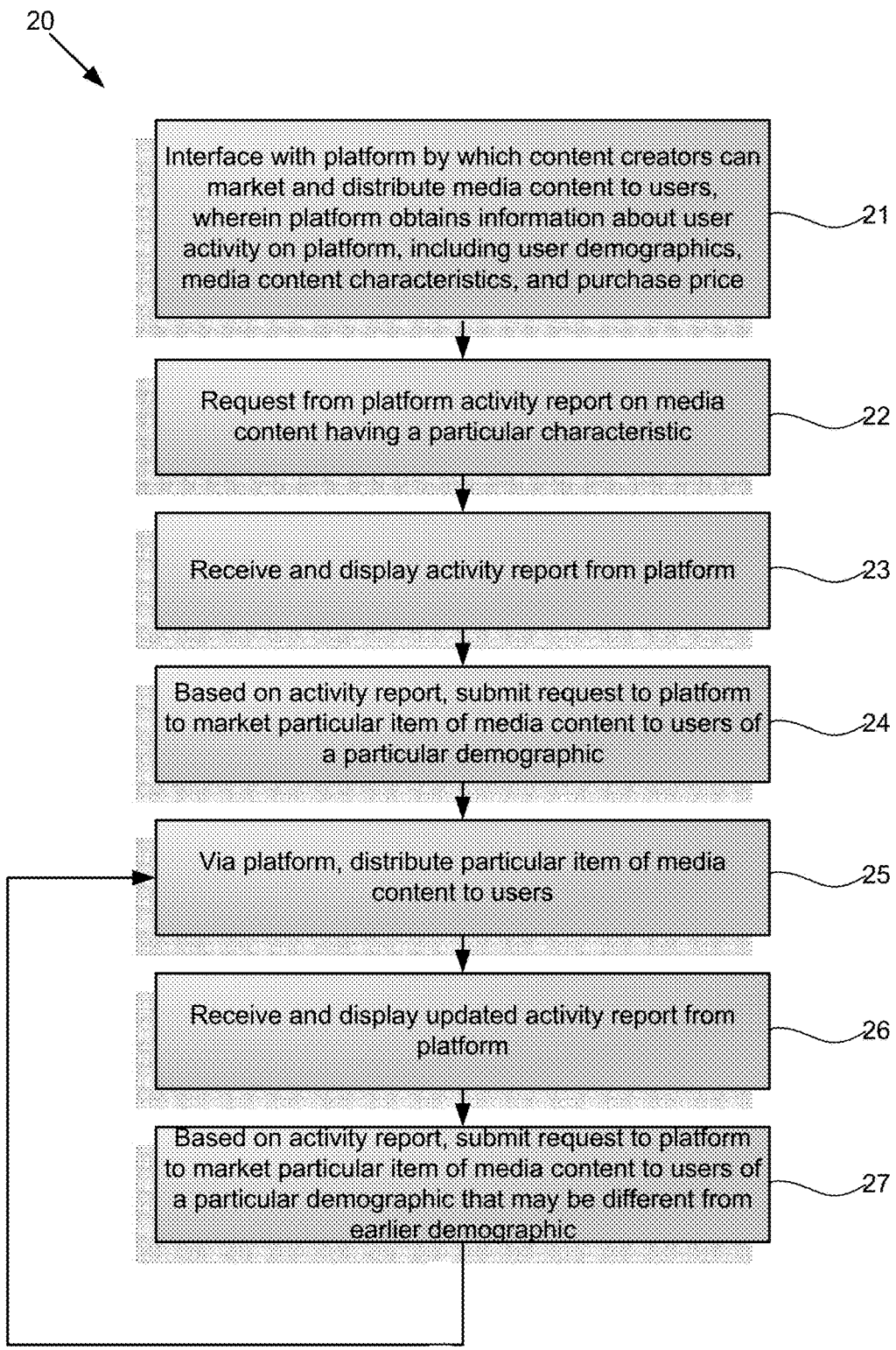
FIG. 1B is a flow chart of steps in an exemplary method of marketing and distributing a particular item of media content by a content creator.

FIG. 1B is a flow chart of steps in an exemplary method 20 for marketing and distributing an item of media content using a platform. Note that while method 10 of FIG. 1A can be considered to represent a platform perspective corresponding to interactions between the platform and the content creator, method 20 of FIG. 1B can be considered to represent a content creator perspective corresponding to interactions between the content creator and the platform.

Method 20 includes interfacing with a platform by which content creators can market and distribute media content to users (21). The platform obtains information about user activity on the platform, (e.g., user demographics, characteristics of the media content with which the users interact, and the purchase price, if any, the users pay for instances of distribution of the content). In implementations utilizing a server-client computer architecture, the content provider may interface with the server computer via a client computer.

Method 20 further includes requesting from the platform, an activity report about media content having a particular characteristic (22). For example, as noted above, a content creator can consider a particular item of media content to belong to (e.g., to be categorizes within), a particular genre. Thus, the content creator may desire to learn more about historical user activity with respect to other items of media content belonging to that particular genre. As such, the content creator can use any appropriate interface to construct and submit the request to the platform. In one illustrative example, the content creator can use a graphic user interface on a client computer to construct a request, which the client can then submit to the platform using a network.

Method 20 further includes receiving and displaying the activity report from the platform, (23). For example, if the content creator is using a client computer, the client computer may receive the activity report using a network, store the activity report in a computer-readable medium in the computer (e.g., a hard drive or a cache memory), and display the activity report to the content creator via an appropriate interface device, such as a display screen connected to the client computer.

Method 20 further includes submitting a request to the platform (e.g., based upon an activity report), to market a particular item of media content (e.g., to users of a particular demographic (24) or interest). As noted above, a content creator may, based upon the activity report, conclude that marketing the media content to users of a particular demographic would be a successful marketing strategy. The request may be directed to any desired number or type of packaging of the media content, to any desired number or type of user demographics, and at any desired price(s).

Method 20 further includes distributing the particular item of media content to users via the platform (25). For example, as described in greater detail below, users can interface with the platform so as to view information about different available items of media content (including that of the content creator), to view advertisements that the platform may display to them, and to pay money in exchange for a distribution of the media content (e.g., a license to experience the media content for a limited amount of time or a limited number of viewings/listenings, or a "purchase" of the media content enabling them to experience the content for an unlimited amount of time). Such a user interaction may, for example, be based upon a server-client computer architecture in which the user interfaces with the platform (e.g., the server) using a client computer over a network.

Method 20 further includes receiving and displaying an updated activity report from the platform (26). As discussed above, the platform can provide such an updated activity report on an as-requested basis, or automatically, on a predetermined periodic basis (e.g., without human intervention).

Based on the updated activity report, the content creator can submit a request to the platform to market a particular item of media content to users of a particular demographic that may be different from the earlier demographic (e.g., different from the demographic defined in step 24 (27)). For example, based on the activity report received and displayed in step 23 and/or personal experience with marketing/distributing the item of media content, the content creator may conclude that a modified version of the initial marketing/distribution strategy may be more successful. Based upon this request, the platform can market the item of media content to that demographic, as discussed above. Then, using the platform, the content creator can distribute the particular item of media content to users (25). As noted above, the content creator can receive one or more additional updated activity reports, and can revise marketing/distribution strategies as frequently as desired, for any desired duration of time, based on such reports and/or based on personal experiences in marketing and distributing the item of media content. Because full rights in the item of media content are retained by the content creator, marketing and distribution strategies are limited only by personal resources, risk aversion, and imagination.

Figure 1C:
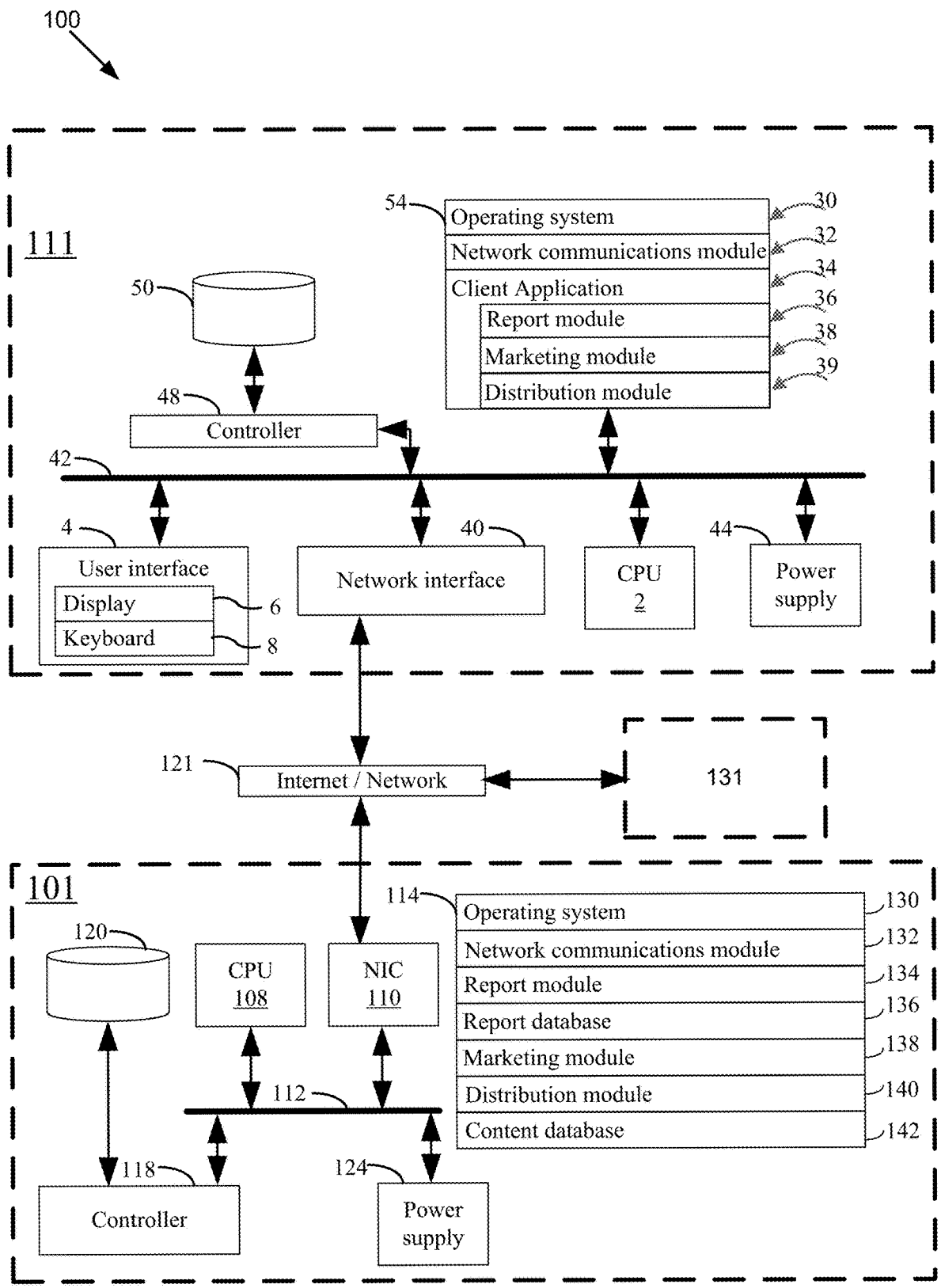
FIG. 1C schematically illustrates an exemplary system for facilitating a content creator's marketing and distribution of a particular item of media content.
Figure 1D:
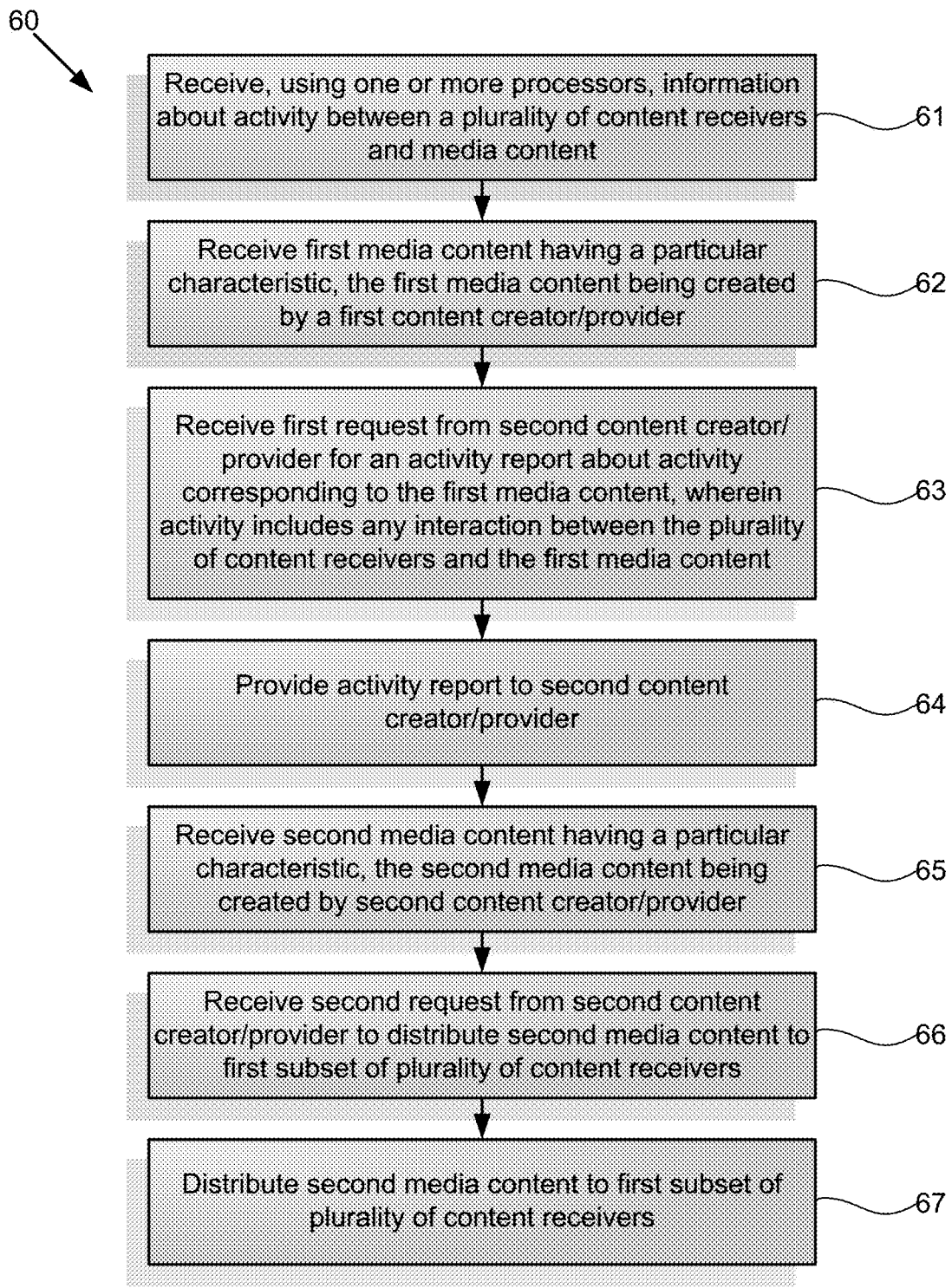
FIG. 1D depicts a process of distributing second media content to a first subset of a plurality of content receivers.

Now that an overview of the novel systems and methods for facilitating the marketing and distribution of media content (e.g., motion pictures), by content creators have been disclosed, a more detailed description of one exemplary system in accordance with a first embodiment of the present disclosure is described in conjunction with FIG. 1C. As such, FIG. 1C illustrates an exemplary server-client computer architecture 100 in accordance with the present disclosure. It should be noted, however, that the systems and methods described herein are not limited to computer-based implementations, such as that of FIG. 1C.

The architecture illustrated in FIG. 1C includes a server 101 and a client device 111 that are configured to communicate with one another via the Internet or other network 121. Of course, other architectures are possible, for example, the server 101 can in fact comprise several servers. Moreover, typically, there are hundreds, thousands, or even hundreds of thousands of client devices 111 or more in communication with the server 101 via the network 121. The exemplary topology shown in FIG. 1C merely serves to describe the features of the first embodiment of the present disclosure in a manner that will be readily understood to one of skill in the art. Further, it will be appreciated that the present disclosure is not limited to client-server implementations and, in fact, embodiments that do not have such implementations are specifically encompassed within the scope of the present disclosure.

The server 101 will typically have one or more processing units (CPUs) 10, a network or other communications interface (NIC) 110, a memory 114, one or more magnetic disk storage and/or persistent devices 120 optionally accessed by one or more controllers 118, one or more communication busses 112 for interconnecting the aforementioned components, and a power supply 124 for powering the aforementioned components. Data in memory 114 can be seamlessly shared with non-volatile memory 120 using known computing techniques such as caching. Memory 114 and/or memory 120 can include mass storage that is remotely located with respect to the central processing unit(s) 108. In other words, some data stored in memory 114 and/or memory 120 may in fact be hosted on computers that are external to the server 101 but that can be electronically accessed by the server 101 over an Internet, intranet, or other form of network or electronic cable (illustrated as element 121) using network interface 110.

Memory 114 preferably stores:

an operating system 130 that includes procedures for handling various basic system services and for performing hardware dependent tasks;

a network communications module 132 that is used for connecting the server 101 to various client computers such as client devices 111 and possibly to other servers or computers (such as user computers, not shown) via one or more communication networks, such as the Internet, other wide area networks, local area networks (e.g., a local wireless network can connect the client devices 111 to the server 101), metropolitan area networks, and so on;

a report module 134 that collects information about user activity with respect to media content on the platform for use in generating activity reports, that stores such information in report database 136, that receives requests from client device 111 for activity reports via network 121 and appropriate hardware there between, and generates activity reports responsive to such requests, and that transmits such activity reports to client device 111 via network 121 and appropriate hardware there between;

a marketing module 138 that receives requests from client device 111 to market a particular item of media content to users of a particular demographic, generates suitable marketing campaigns responsive to such requests, and distributes such marketing campaigns to user computers (not shown) via network 121;

a distribution module 140 that receives user requests for distribution of items of media content via network 121, that distributes such items of media content to user computers via network 121 responsive to such requests and in accordance with digital rights management constraints defined by the content creator, and that receives payment from users in exchange for such distribution via network 121; and a database of media content 142, e.g., containing a plurality of items of media content created by a plurality of content creators who digitally transmitted the items of media content to server 101 via network 121 for distribution to users. Database 142 need not necessarily be co-located with the remainder of server 101.

Note that report module 134, report database 136, marketing module 138, and distribution module 140 can be considered to form a "content management system." As described in greater detail below, such a content management system may have additional functionalities and components, such as a catalog. Report database 136 and/or content database 142 can store raw or derived content-related data (e.g., metadata) for use in determining actions to be taken (e.g., based on particular analysis or constraints). Examples of report database 136 and/or content database 142 include relational database management systems (RDBMS), or a multi-dimensional database (MDDB), such as an Online Analytical Processing (OLAP) database. In one embodiment, report database 136 and content database 142 constitute a single database.

The server 101 is connected via Internet/network 121 to one or more client devices 111 and to one or more user computers (not shown). FIG. 1C illustrates the connection to only one such client device 111. It is possible for the client device 111 or user computers (not shown) to be a personal computer (e.g., desktop or laptop computer) or any form of mobile computing device (e.g., an iPhone, BlackBerry, and the like).

In typical embodiments, a client device 111 comprises:
one or more processing units (CPUs) 2;
a network or other communications interface 40;
a memory 54;
optionally, one or more magnetic disk storage and/or persistent storage devices 50 accessed by one or more optional controllers 48;
a user interface 4, the user interface 4 including a display 6 and a keyboard or keypad 8;
one or more communication busses 42 for interconnecting the aforementioned components; and
a power supply 44 for powering the aforementioned components, which power supply can be, for example, batteries.

In some embodiments, data in memory 54 can be seamlessly shared with optional non-volatile memory 20 using known computing techniques such as caching. In some embodiments the client device 111 does not have a magnetic disk storage device. For instance, in some embodiments, the client device 111 is a portable handheld computing device, e.g., a laptop computer, a personal digital assistant, a cellular telephone, a Blackberry, or an iPhone, and the network interface 40 communicates with the Internet/network 121 by wireless means.

The memory 54 preferably stores:
an operating system 30 that includes procedures for handling various basic system services and for performing hardware dependent tasks;
a network communication module 32 that is used for connecting client device 111 to other computers such as server 101, in some embodiments the network communication module 32 includes an optional web browser, such as Microsoft Internet Explorer versions 6.0 or later, Firefox 2.x, Firefox 3.x, AOL 9, Opera 9.5 or later, Safari 3.x, Chrome 2.0 or higher, and, in some embodiments, the optional web browser includes a module such as a FLASH player;
a client application 34 that interfaces with server 101 and includes the following three modules:
a report module 36 that generates an interface for display on display 6 that a content creator can use to generate a request for an activity report, that sends such a request to server 101 via network 121, that receives the requested activity report from server 101 via network 121, and that processes the received report so that the report is displayed on display 6 for the content creator to view;
a marketing module 38 that generates an interface for display on display 6 that a content creator can use to generate a request for a particular marketing campaign, e.g., to request that a particular item of media content be marketed to users of a particular demographic, and that the content creator can use to pay for such a marketing campaign, and that sends such a request to server 101 via network 121; and
a distribution module 39 that generates an interface for display on display 6 that a content creator can use to monitor user activity with respect to a particular item of media content that he created and made available for distribution via server 101 (e.g., had added to content database 142 and/or defined a marketing campaign for). Such information may, for example, be provided to distribution module by report module 134 in server 101.

Note that users can interact with server 101 in any of a variety of suitable ways. For example, as described below, the users may interact directly with server 101 via a web page-like interface. Alternatively, the content creator may post a "fan page," advertisement, or other information about an item of media content on a website e.g., a social networking website, such as FaceBook or MySpace. If the users want to obtain even information about the item, they can click on a designated link on the posted page or ad, which link will take the user to a web page that interfaces with server 101. Or, alternatively, the users may the users may interact with server 101 via a dedicated website created by the content creator that is "powered by" server 101. That is, server 101 can market and distribute media content to users via content creator-defined interfaces.

Figure 2:
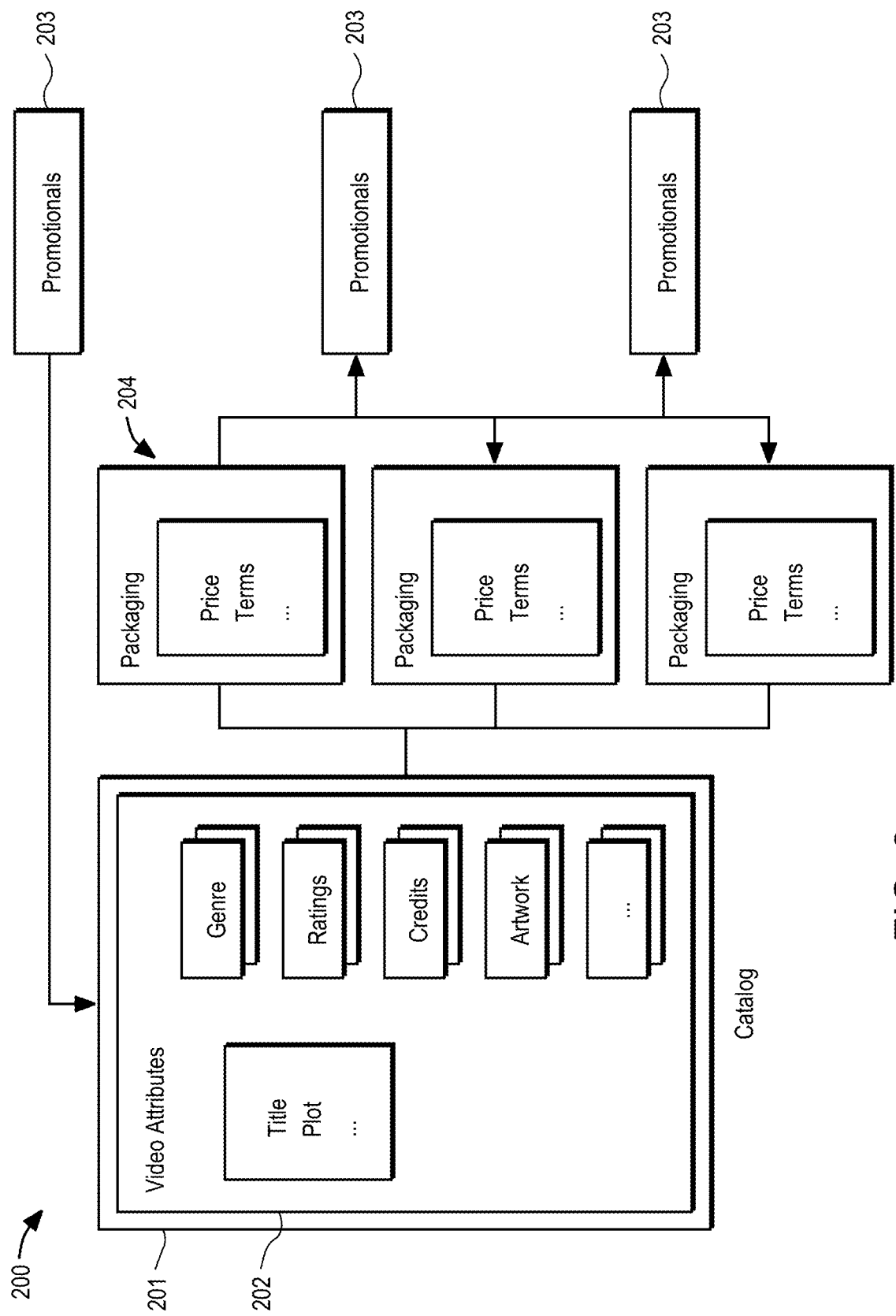
FIG. 2 shows an exemplary display of certain components within a content management system.

FIG. 2 shows an example display 200 of certain components within a platform for marketing and distributing media content. As noted above, in one non-limiting example, the platform is a server computer that interfaces with one or more client devices. However other implementations can be used. In some implementations, the platform can include a catalog 201. The catalog can include static elements corresponding to aspects of the content that remain constant (e.g., or unchanging) in the platform. For example, a catalog can include static elements corresponding to aspects of multimedia content, such as video (e.g., film) content 202. In this example, video content 202 can include certain video attributes (e.g., title, plot, genre, ratings, credits, artwork, etc.). In other examples, a catalog can include static elements corresponding to other types of multimedia content such as game content, audio content, e-books, software, electronic photos, and electronic artwork. Content can be added or deleted from the catalog, thus the catalog can be dynamic. The content within the catalog (e.g., the plot of a movie within the catalog), is editable but does not generally change and thus the content can be static. Thus, catalog data can be a globally constant description (e.g., of defined structured data fields), that includes individual references corresponding to the content of each object (e.g., a video) individually. The catalog 201 can be stored, for example, in content database 142 of server 101 illustrated in FIG. 1C.

In some implementations, the platform can include one or more promotional functionalities 203. For example, a promotional functionality 203 can include a limited ability to promote (market) content without the ability to sell the content. In this example, a content creator can promote content prior to the content being available to a user (e.g., for purchase). In another example, a third party (meaning someone other than a content provider or recipients of content from the content provide) can create promotions (e.g., as an influencer), for a larger audience. Additionally, a third party can receive a commission for promoting content without having a license to sell the content. This aspect will be discussed in greater detail with respect to FIGS. 22-24 below. The promotional functionality 203 can be, for example, part of marketing module 138 of server 101 illustrated in FIG. 1C.

In some implementations, a promotional functionality 203 can include an ability to up-sell content or properties of such content (e.g., the grant of a license to the content, the expansion of the terms of the license to the content, an expansion of the quality, resolution or other property of the content). In an example of such implementations, when a user exhibits an interest in paying a first amount for a limited use license to use content for a predefined time period, the content creator can dynamically create and offer the user another license option to use the same content at a second amount and for a greater period of time. For example, when a user selects a content rental option or rents content (e.g., a video) for $5.00, the content creator (e.g., the filmmaker), is notified or otherwise made aware (e.g., by requesting a report). Once aware, the content creator can dynamically create and offer a content purchase option (e.g., reduce a purchase price from $15.00 to $11.00) to that user. This aspect will be discussed in greater detail with respect to FIGS. 18-19, below.

In some implementations, promotional functionality 203 can include an ability to cross-sell content. The cross-sell option can allow the content creator the ability to familiarize the user with more content (e.g., content the user may not otherwise be aware of).

For example, when a user exhibits an interest in learning about content, the content creator can dynamically create a reference to related content. In this example, when a user selects a page on which content is hosted, the content creator is notified or otherwise made aware. Once aware, the content creator can dynamically create a reference to related content (e.g., if you like A, you may be interested in B).

In another example, when a user exhibits an interest in licensing content, the content creator can dynamically create and offer the user another license option for similar content. In this example, when a user selects a content rental or purchase option corresponding to first content (e.g., a video), the content creator is notified or otherwise made aware. Once aware, the content creator can dynamically create and offer a content purchase option for similar second content (e.g., if you like A, you can buy B for $3.00).

In yet another example, when a user exhibits an interest in licensing content, the content creator can dynamically create and offer the user an additional license for similar content. In this example, when a user selects a web page or panel on which content is hosted, the content creator is notified or otherwise made aware. Once aware, the content creator can dynamically create and offer a content purchase option for the content on the current web page or panel as well as one or more additional purchase options for the similar content (e.g., if you like A, you can buy A and B together for $10.00). These cross-sell aspects will be discussed in greater detail with respect to FIGS. 20, 20A, 20B, and 21 below.

In some implementations, using the catalog 201, one or more licensing options (e.g., licensing packages 204), can be dynamically generated by a content creator using the system. In other implementations, using the catalog 201 and the promotional functionality 203, one or more licensing options (e.g., licensing packages 204), can be dynamically generated by a content creator using the system. Licensing packages 204 can include the price and terms of a licensing agreement between a content creator and a user. A user can be concurrently presented with one or more licensing options. In exemplary instances in which the content is a film, licensing options can include, but are not limited to, a "high definition" ("HD") option (e.g., a "Blu-Ray" quality option), an option that defines the terms of a rental agreement, an option that defines the terms of a purchase agreement, an option indicating whether the content is downloadable, or an option indicating whether the user has access to bonus content. The various licensing packages 204 can be, for example, part of marketing module 138 of server 101 of FIG. 1C.

Additionally, in some implementations, one or more additional licensing packages 204 can be dynamically generated and presented to the user based upon user interaction with the system. For example, as noted above, a content creator can dynamically offer the user an up-sell or a cross-sell based upon a user selection. In some implementations, when a user executes a first license package 204 (e.g., rents content), and accepts an offer to execute a second license package 204 (e.g., purchase the rented content), the first license can expire upon the execution (e.g., acceptance) of the second offer. In other implementations, when a user executes a first licensing package 204 (e.g., purchase of a standard definition version of a film), and accepts an offer to execute a second license package 204 (e.g., rent a high definition version of the film), the first license can run concurrently with the second offer. In still other implementations, when a user executes a first licensing package 204 (e.g., purchase of a standard definition version of a film), and accepts an offer to execute a second license package 204 (e.g., rent a high definition version of the film), the first license can be suspended for the duration of the second offer. For example, the first license can be selectively or automatically reinstated upon completion of the second offer.

Additionally, in some implementations, licensing packages 204 can be activated and deactivated. For example, a licensing package 204 can be activated or deactivated manually (e.g., by the content creator), automatically (e.g., by the system), or in accordance with one or more predefined settings (e.g., set by a content creator). Dynamic creation of licensing packages 204 will be discussed in greater detail with respect to FIGS. 18-24 below.

Figure 3:
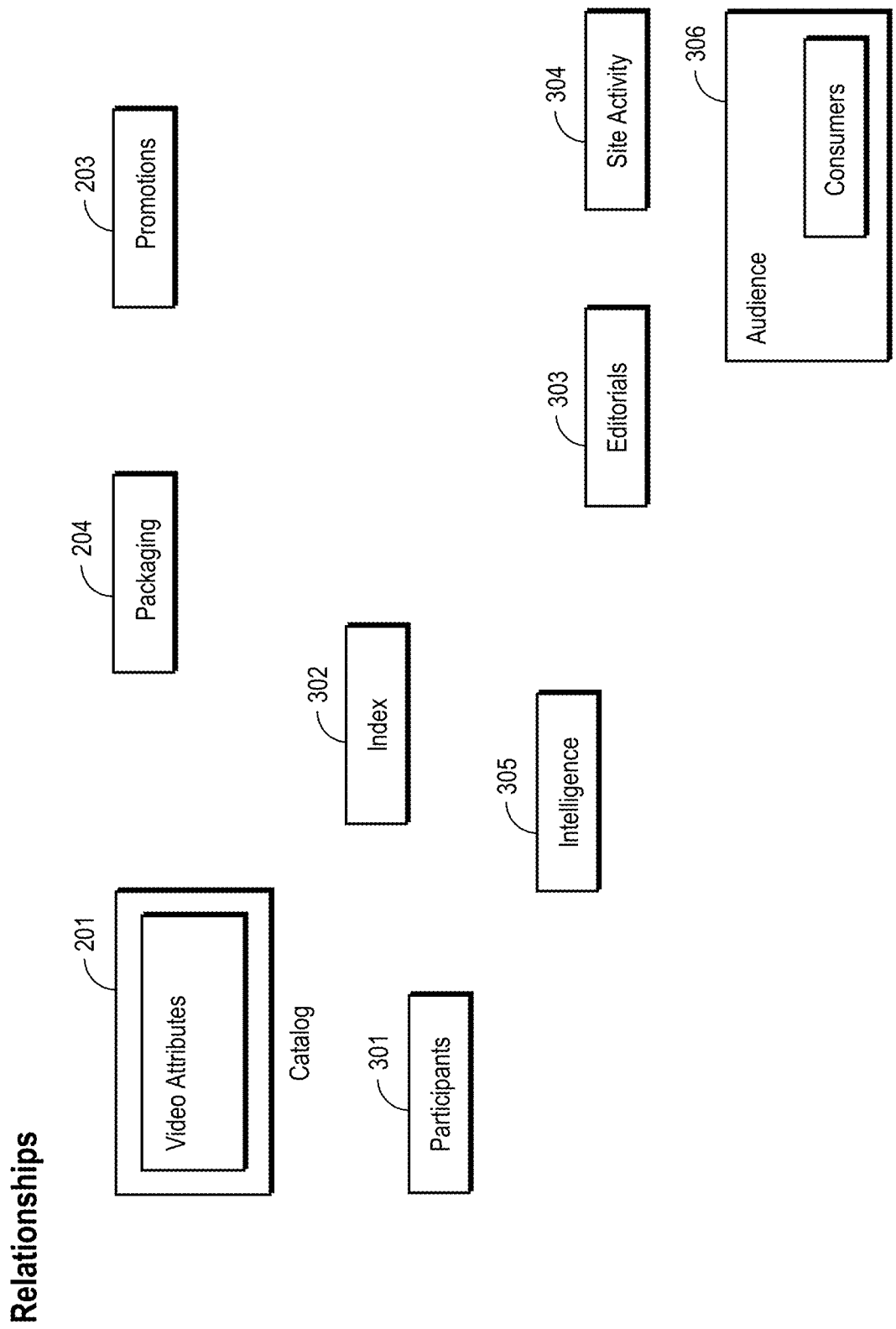
FIG. 3 shows an exemplary display of additional components within a content management system.

FIG. 3 shows an example display 300 of additional relationships within the platform, including the actors within the system. In addition to relationships between the catalog 201, the promotional functionality 203, and the licensing packages 204, in some implementations, there can be additional relationships. Additional relationships can exist among content creators (e.g., participants 301), and the users of content (e.g., audience 306). Relationships can be developed based upon interactions with one or more aspects of the platform, for example. For example, as noted above, using the catalog 201 and the promotional functionality 203, a participant 301 can offer one or more licensing packages 204 to an audience member 306 (e.g., a audience). In this example, participants 301 can include a content provider such as anyone offering a license for content (e.g., a filmmaker or a distributor), or anyone participating in the creation of the content (e.g., actors, writers, or directors).

In some implementations, a searchable index 302, which may for example be included in report module 134 illustrated in FIG. 1C, can facilitate site navigation and organization of raw (e.g., unprocessed) and derived (e.g., processed) data corresponding to user interaction with the platform. In some implementations, the index 302 can include a hierarchical arrangement of un-weighted attributes corresponding to content in the system. In other implementations, the index 302 can include a hierarchical arrangement of weighted attributes corresponding to content in the system. Additionally, attributes can be weighted differently according to a plurality of factors or words. For example, a content creator (e.g., a filmmaker), can determine that a particular word is of greater importance when searching the index. In this example, this term can be assigned a greater weight and thus it would appear higher up on a list of search results for that term.

Audience 306 can interact with the index 302 (e.g., to search and locate data). In some implementations, based upon audience 306 interaction with the index 302, static data from the catalog 201 and one or more licensing packages 204 can be presented to audience 306. In some implementations, site activity 304 (e.g., audience interaction with a website), can be indexed 302 and stored for later analysis. In these implementations, audience interaction can include all activity up to and including a purchase. Thus, even if a purchase is not made, data related to audience interaction with content on the website can be indexed and used for later analysis. In these implementations, audience interaction can include all activity following a purchase. Thus, post purchase data related to audience interaction with content on the website can also be indexed and used for later analysis.

In some implementations, audience 306 can provide feedback to the system using an editorial functionality 303, which in some non-limiting embodiments may be a part of report database 136 of server 101 illustrated in FIG. 1C. For example, audience 306 can critique content (e.g., write a review), or rate content. In another example, audience 306 can participate in a conversation or on-line dialog about the content. In this example, audience 306 can participate in a chat room dialog with one or more participants 301. In yet another example, an audience member 306 can generate a review that can be posted or displayed (e.g., on a social network website), where the audience member 306 and one or more other users can participate in a dialog about the content.

In some implementations, site activity 304 and editorial information 303 are combined to generate intelligence 305 that can be used to generate new promotional functionalities 203 and new licensing packages 204. In some implementations, new promotional functionalities 203 and new licensing packages 204 can be based on intelligence 305 and generated manually (e.g., by a participant 301). In some implementations, new promotional functionalities 203 can be generated automatically (e.g., by the system), based upon prior participant 301 or audience 306 interactions with the system or based on one or more predefined settings. In one non-limiting embodiment, intelligence 305 is generated by report module 134 of server 101 illustrated in FIG. 1C.

In some implementations, intelligence 305 can include raw (e.g., unprocessed) and/or derived (e.g., processed) data. Intelligence 305 can be dynamic (e.g., the return of content by a dissatisfied audience can automatically change the intelligence 305). In some implementations, intelligence 305 can be processed and statistics can be automatically generated (e.g., in real-time) based upon website activity (e.g., audience 306 interaction). Generated statistics can be used (e.g., by the system) to generate one or more reports (e.g., based upon audience 306 interaction). For example, reports can be used to examine account histories and make recommendations (e.g., for a single account or for a group of related accounts). Reports will be discussed in greater detail below with respect to FIGS. 40-49. In some implementations, generated statistics can be compared to one or more pre-defined benchmarks or thresholds to determine whether promotional functionalities 203 and licensing packages 204 need to be adjusted. Adjustments to promotional functionalities 203 and licensing packages 204 can allow a participant 301 to define and refine efficient ways to target new and existing audience members 306 based upon system intelligence 305.

In the present system, a globally constant description of static catalog data 201 allows a content creator to organize data in accordance with user interest and user preference with respect to content interaction. Additionally, other data corresponding to the distribution and management of content (e.g., content price and related terms of restriction), can be defined dynamically (e.g., in accordance with intelligence 305). This decoupling facilitates data aggregation, cross-content recommendations, and the dynamic (e.g., "on-the-fly") creation and distribution of licensing packages (e.g., in real-time). For instance, all users can benefit from the ability to interact with universal editorial information 303 while concurrently having individualized licensing packages 204 available (e.g., customized on an individual user basis).

Figure 4:
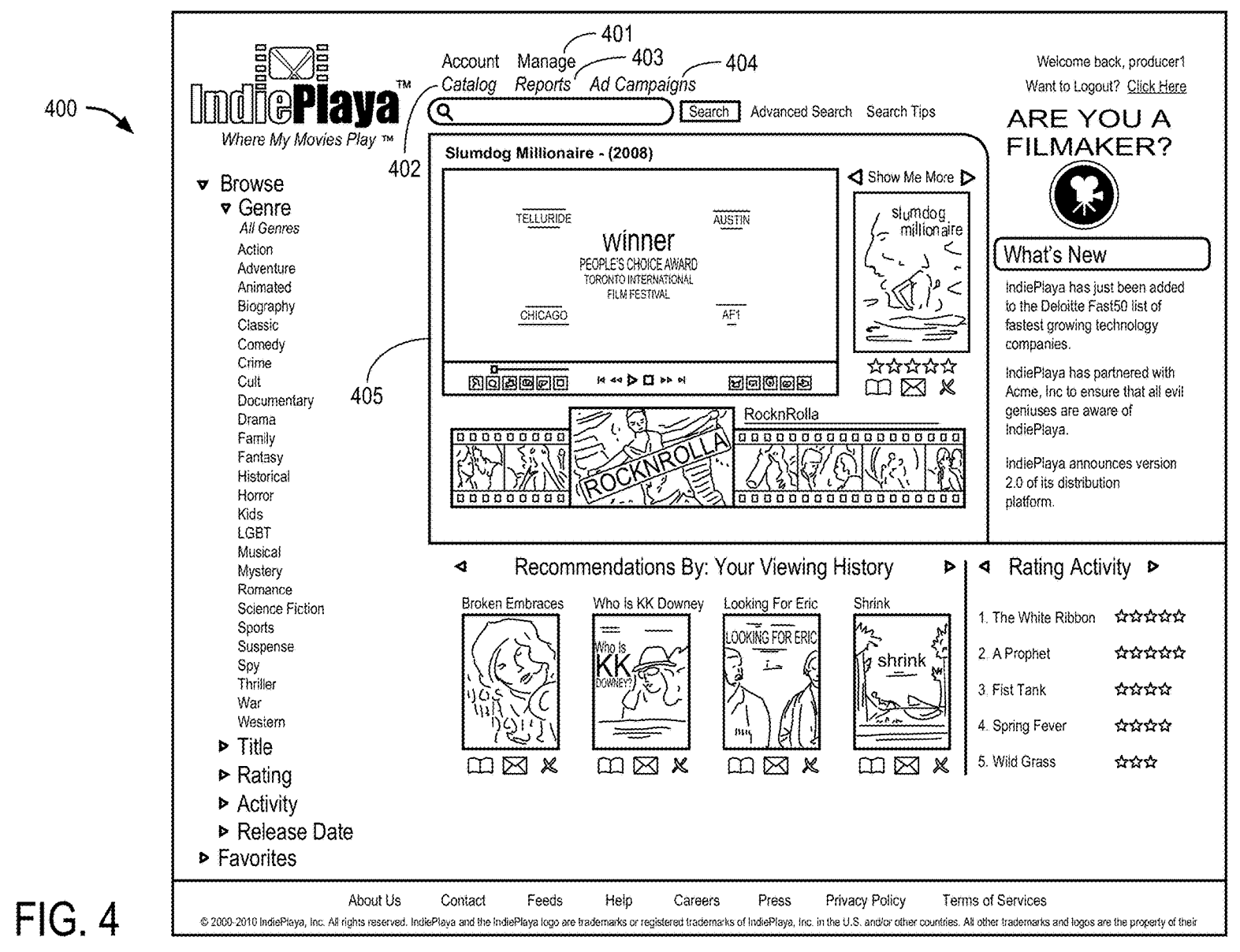

FIG. 4 shows an exemplary interface 400 for use by a content creator (e.g., a participant). Using the interface 400, the content creator can manage content. For example, content interface 400 can include one or more controls for managing 401 content. Controls for managing content can include, but are not limited to, a catalog control 402, a reports control 403, and an ad campaign control 404. Additionally, interface 400 can include a viewing area 405 (e.g., a window), for interacting (e.g., viewing) with content.

Figure 5:
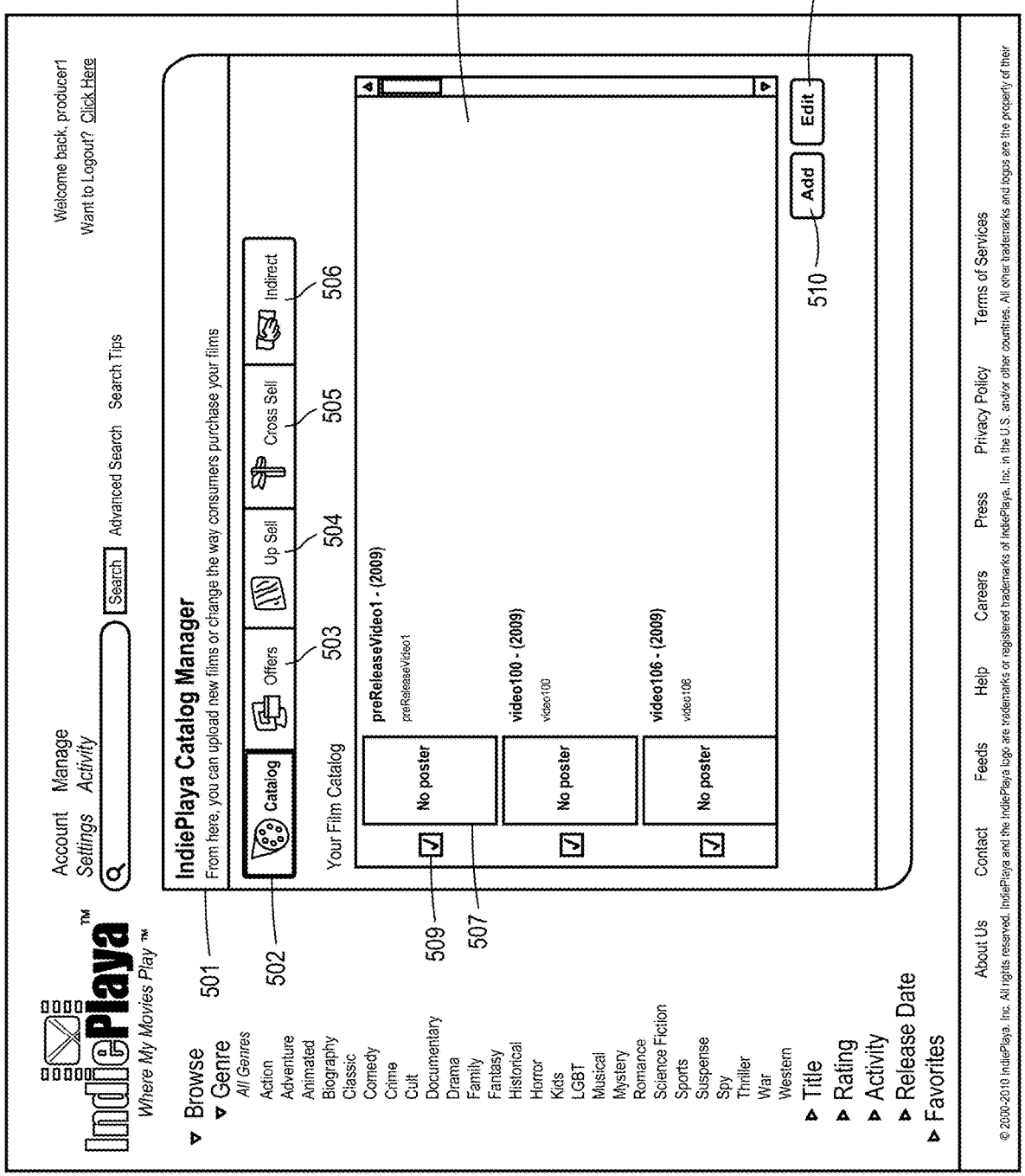
FIG. 5 shows an exemplary interface for a catalog control.

FIG. 5 shows an exemplary interface 500 for a catalog control 402. Activating catalog control 402 can cause the system to generate catalog interface 500. In some implementations, catalog interface 500 can include catalog manager 501. In these implementations, catalog manager 501 can include one or more controls that can be used to interact with content in catalog 201. Exemplary controls can include any combination of film catalog control 502, offers control 503, up-sell control 504, cross-sell control 505, and indirect control 506. Activating the film catalog control 502 can cause the system to generate a list of content (e.g., film content) created by the content creator using the system (e.g., as recognized by a unique challenge such as a log-in username and password). The list can include any combination of a visual representation of the content 507, a textual description of the content 508, and a visual indication 509 (e.g., a checkbox) indicative of whether the content is active or inactive (e.g., a checked box can indicate active content and an unchecked box can indicate inactive content). In some implementations, using an add control 510, the content creator can add content to the system, and using the edit control 511, the content creator can edit content in the system.

Figure 6:
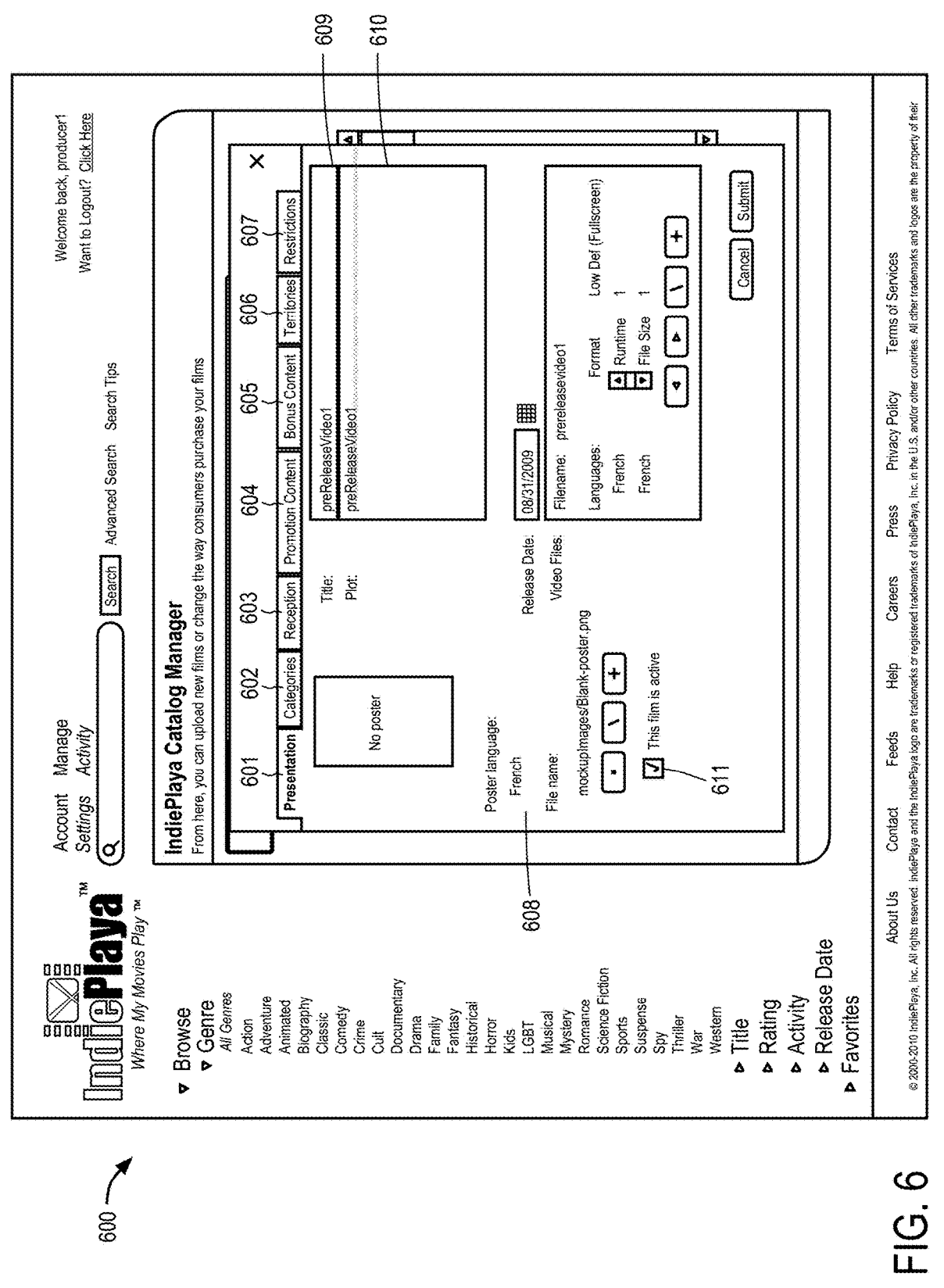

FIG. 6 shows an exemplary interface 600 for adding or editing content using a control (e.g., film catalog control 502), within catalog manager 501 (from FIG. 5). The interface 600 can include one or more controls for adding or editing content. For example, interface 600 can include any combination of presentation control 601, categories control 602, reception control 603, promotion content control 604, bonus content control 605, territories control 606, and restrictions control 607. Activating presentation control 601 can cause the system to generate presentation interface 608 including one or more areas for entering information about content. For example, presentation interface 608 can include title area 609 (e.g., for entering the title of film content) and plot area 610 (e.g., for entering text regarding the plot of film content). The presentation interface 608 can also include active control 611 corresponding to visual indication 509 of FIG. 5. Selecting active control 611 can be an indication that the content is active and de-selecting active control 611 can be an indication that the content is inactive. Additionally, selecting active control 611 can cause the system to check visual indication 509 for the content on interface 500 of FIG. 5 (e.g., indicating that the content is active).

Figure 7:
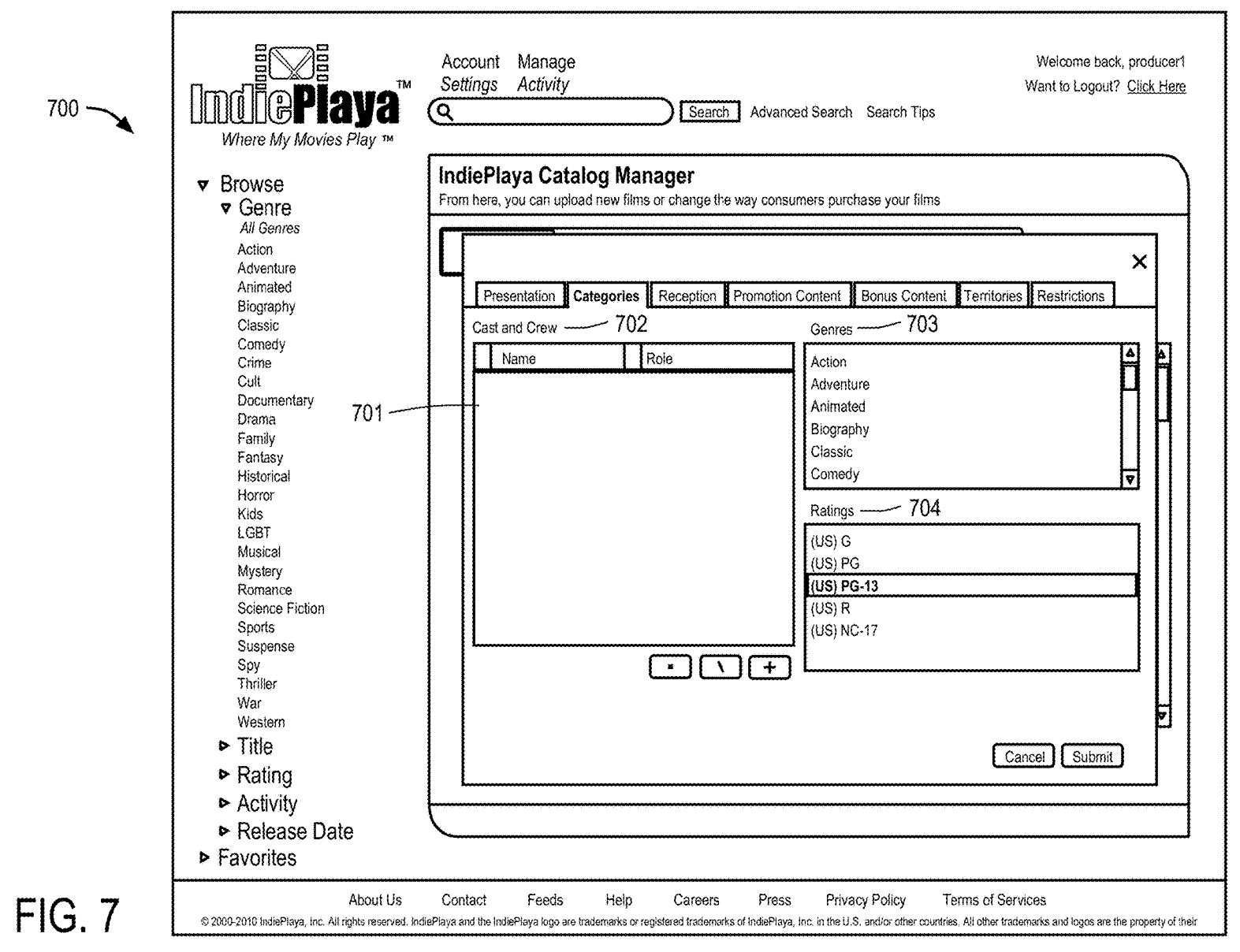

FIG. 7 shows another exemplary interface 700 for adding or editing content using a control (e.g., film catalog control 502), within catalog manager 501 (from FIG. 5). Activating the categories control 602 in FIG. 6, can cause the system to generate categories interface 701 including one or more areas for entering information about content. For example, categories interface 701 can include cast and crew area 702 (e.g., for entering information about the cast and crew of film content), genres area 703 (e.g., for entering information about the genre of film content), and ratings area 704 (e.g., for entering information about the rating of film content).

Figure 8:
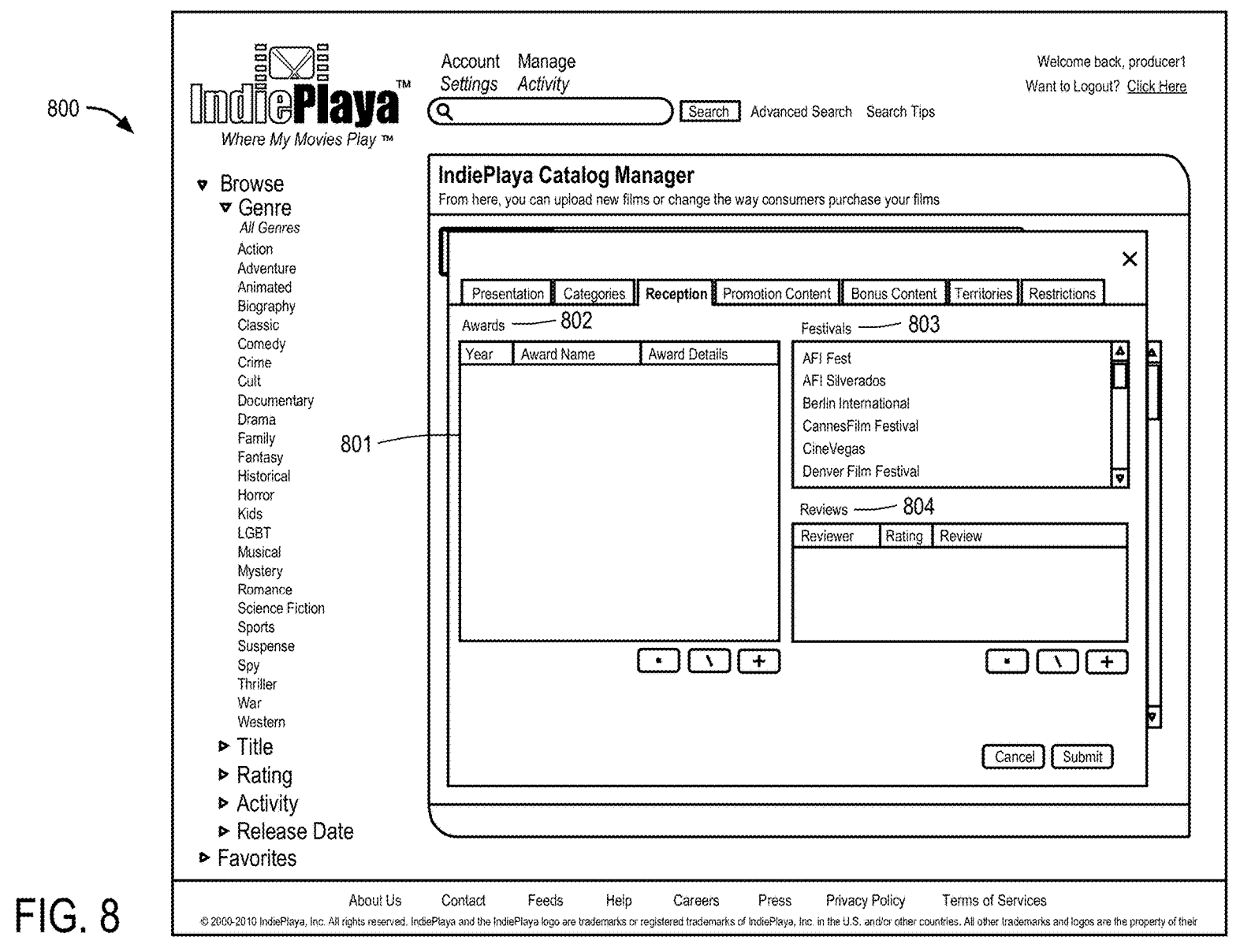

FIG. 8 shows another exemplary interface 800 for adding or editing content using a control (e.g., film catalog control 502), within catalog manager 501 (from FIG. 5). Activating reception control 603 in FIG. 6, can cause the system to generate reception interface 801 including one or more areas for entering information about content. For example, reception interface 801 can include any combination of awards area 802 (e.g., for entering information about awards given to film content), festivals area 803 (e.g., for entering information about festivals including film content), and reviews area 804 (e.g., for entering information about professional reviews of film content).

Figure 9:
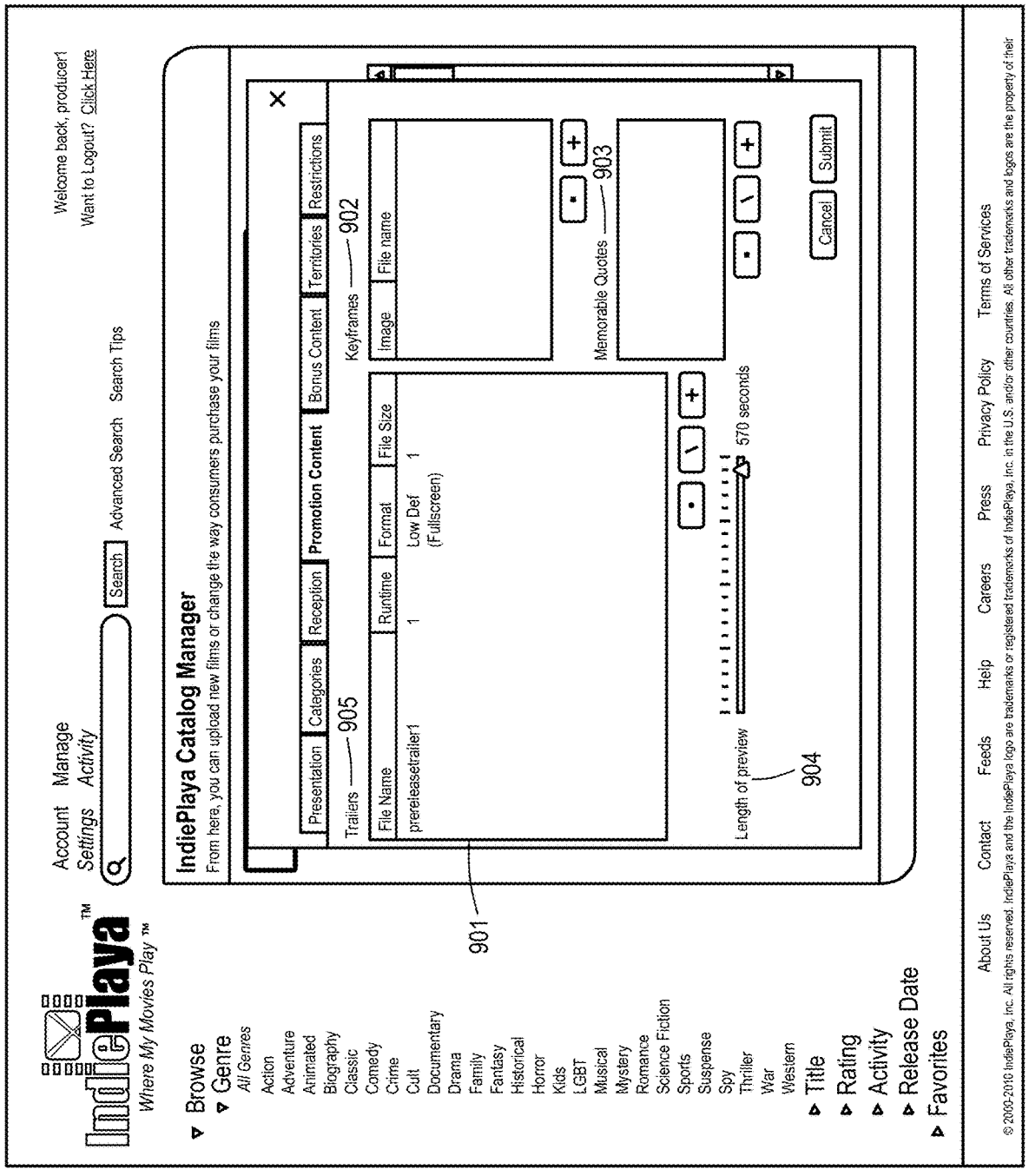
FIG. 9 shows another example of an interface for adding or editing content using a control within the catalog manager.

FIG. 9 shows another exemplary interface 900 for adding or editing content using a control (e.g., film catalog control 502), within catalog manager 501 (from FIG. 5). Activating promotion content control 604 in FIG. 6, can cause the system to generate promotion content interface 901 including one or more areas for entering information about content. For example, promotion content interface 901 can include any combination of trailers area 905 (e.g., for entering information about trailers of the film content), key frames area 902 (e.g., for entering information about still images or key frames from the film content), and memorable quotes area 903 (e.g., for entering information about memorable quotes within the film content). Promotion content interface 901 can also include length of preview control 904 (e.g., for setting a length of a preview of content).

Figure 10:
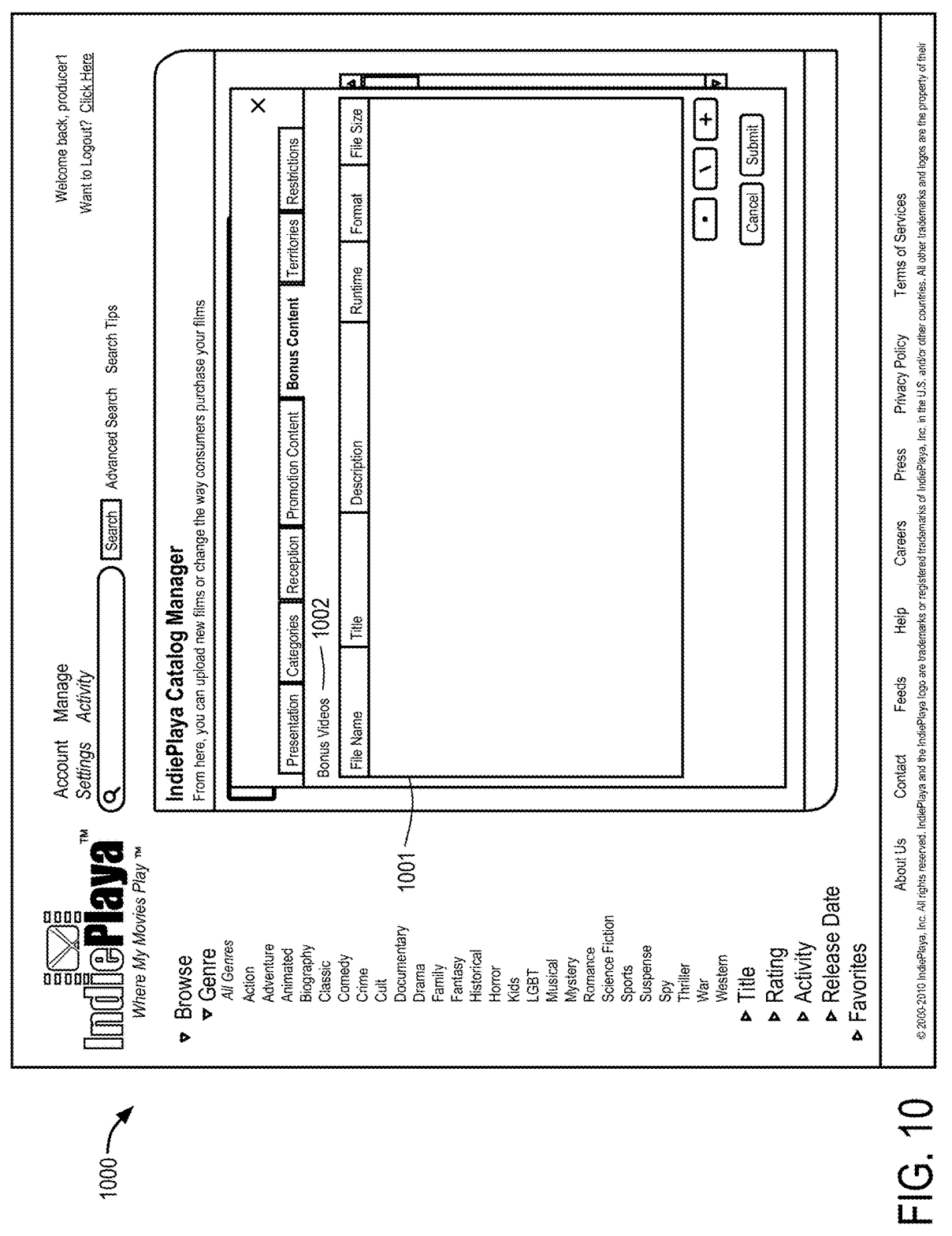

FIG. 10 shows another exemplary interface 1000 for adding or editing content using a control (e.g., the film catalog control 502), within catalog manager 501 (from FIG. 5). Activating bonus content control 605 in FIG. 6 can cause the system to generate bonus content interface 1001 including one or more areas for entering information about bonus content. For example, bonus content interface 1000 can include bonus videos area 905 (e.g., for entering information about bonus videos corresponding to or available with the film content). In some implementations, a content creator can make bonus content available dynamically as a licensing package. In these implementations, the bonus content licensing packages can run independent of or dependent upon any other licensing agreement (e.g., rental or purchase license). Additionally, a content provider can make bonus content available on the system dynamically, and at any time. Any bonus content made available on the system can be downloaded by a user at any time, once the user has purchased the corresponding bonus content licensing agreement.

Figure 11:
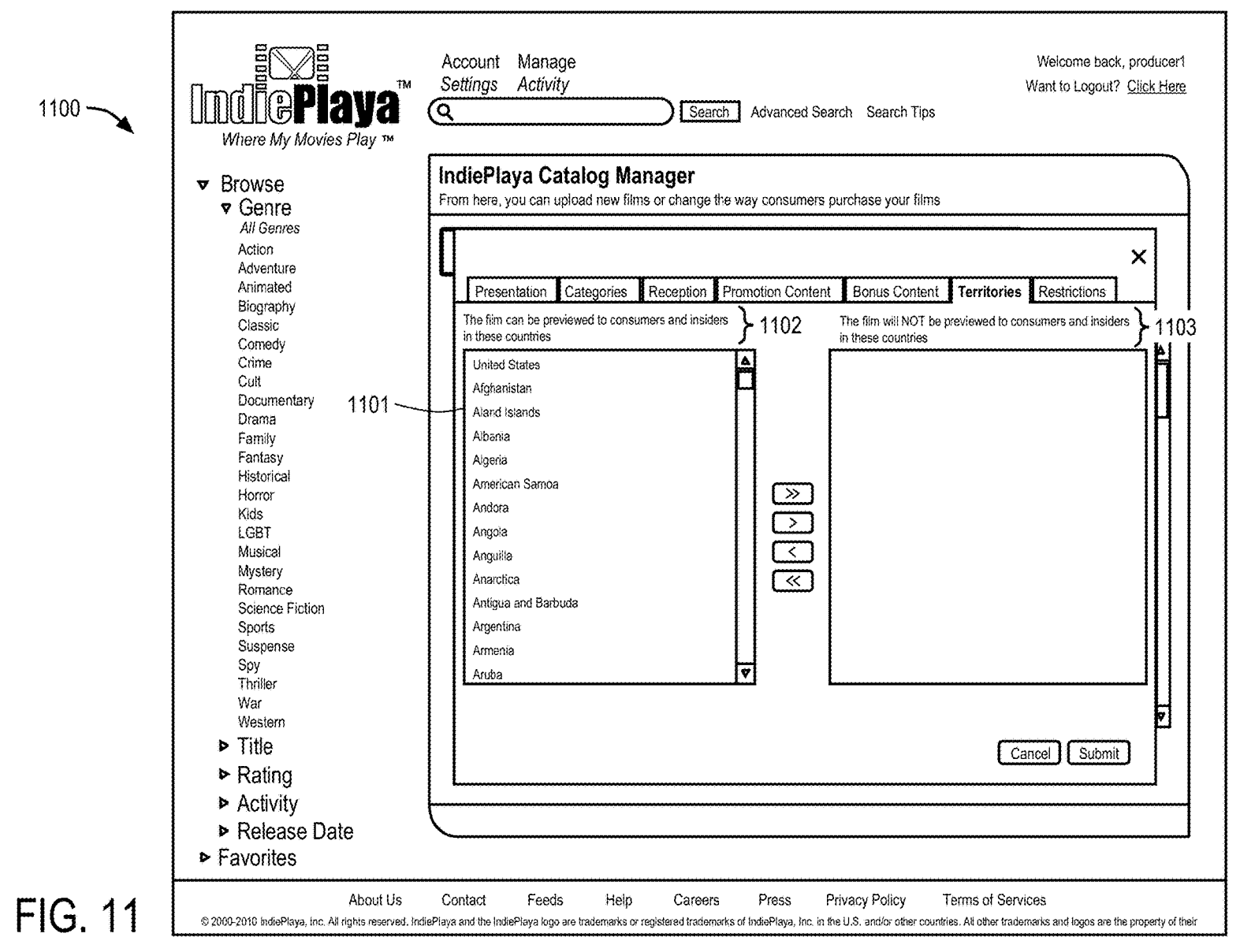

FIG. 11 shows another example interface 1100 for adding or editing content using a control (e.g., the film catalog control 502), within catalog manager 501 (from FIG. 5). Activating territories control 606 in FIG. 6, can cause the system to generate territories interface 1101 including one or more areas for entering information about content. For example, territories interface 1101 can include preview area 1102 for selecting one or more geographic regions (e.g., cities, states, towns, regions, countries, sets of countries, etc.) and/or Internet domains (e.g., predetermined sets of IP address, top level domains, country code top level domains, websites, ISPs, etc.) from which the content creator will allow users to preview the content (e.g., the film content). In the example depicted in FIG. 11, if the content creator would like to exclude any users within a particular country from being able to preview the content, the content creator can select that country (e.g., by highlighting the country and activating a select button). Once selected, the country will appear in no preview area 1103 and users in that country will not be permitted to preview the content.

In another example, the content creator can choose to not permit previews of the content in all countries except a select few. In this example, the content creator can select all the countries listed in preview area 1102 (e.g., by highlighting those countries and activating a select button). The list of countries will then appear in no preview area 1103. To select particular countries allowed to preview the content, the content creator would then select that country in no preview area 1103 (e.g., by highlighting the country and activating a select button). Once selected, the country will appear in preview area 1102 and users in that country will be permitted to preview the content. In some implementations, territories interface 1101 can assist a content creator in conforming to the terms of a geographically restrictive third-party licensing agreement.

Figure 12:
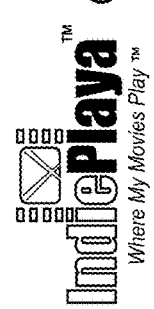
FIG. 12 shows another example of an interface for adding or editing content using a control within the catalog manager.
Figure 13:
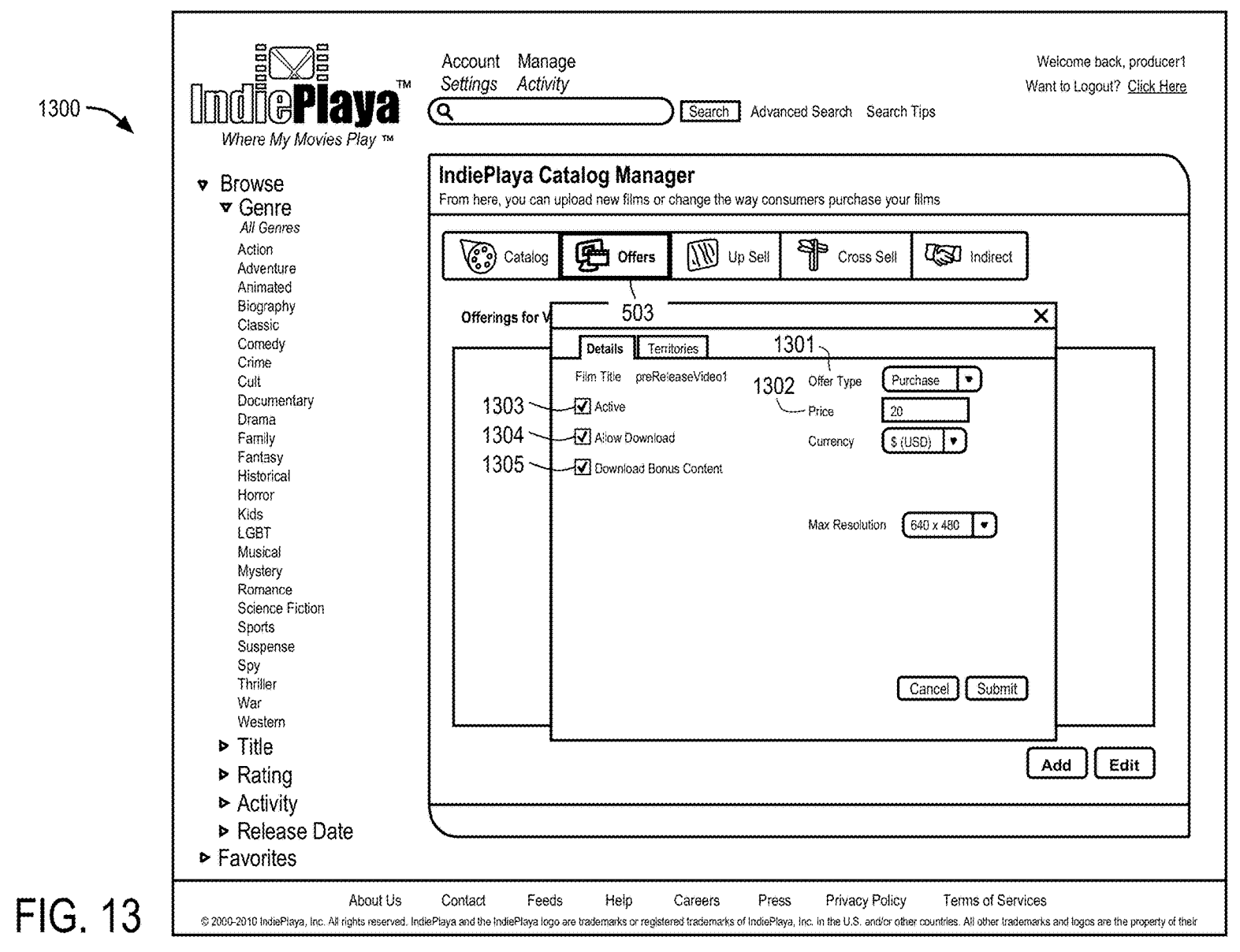

FIG. 12 shows another exemplary interface 1200 for adding or editing content using a control (e.g., the film catalog control 502), within catalog manager 501 (from FIG. 5). Activating restrictions control 607 in FIG. 6, can cause the system to generate restrictions interface 1201 including one or more areas for entering information about content. For example, restrictions interface 1200 can include manage profanities area 1202 used to restrict the type of language allowed in tags and reviews (e.g., submitted by audiences providing feedback to the system using editorial functionality 303). The manage profanities area 1202 can include any combination of tolerance to graphic language area 1203 (e.g., indicating a permitted level of tolerance), and types of language to restrict area 1204 (e.g., by subject matter FIG. 13 shows an exemplary interface 1300 for creating offers (e.g., licensing packages) using a control (e.g., the offers control 503), within catalog manager 501 (from FIG. 5). In some implementations, offers (e.g., licensing packages) can be dynamically created (e.g., by a content creator) at any time, and offered as a licensing option (e.g., to a user). In some implementations, interface 1300 can include one or more controls for defining a licensing package. For example, a licensing option can include the purchase of content (e.g., film content). In this example, using offer type control 1301, a content provider (e.g., a participant), can select a purchase option. Additionally, a content provider can set a price for the purchase option using the price control 1302. In some implementations, additional controls (e.g., checkboxes), can be used to set one or more parameters of a licensing package (e.g., whether a licensing package is active 1303, whether a content download will be allowed 1304, or whether bonus content can be downloaded 1305). Once all the terms of a licensing package have been determined, the licensing package can be generated and displayed.

Figure 14:
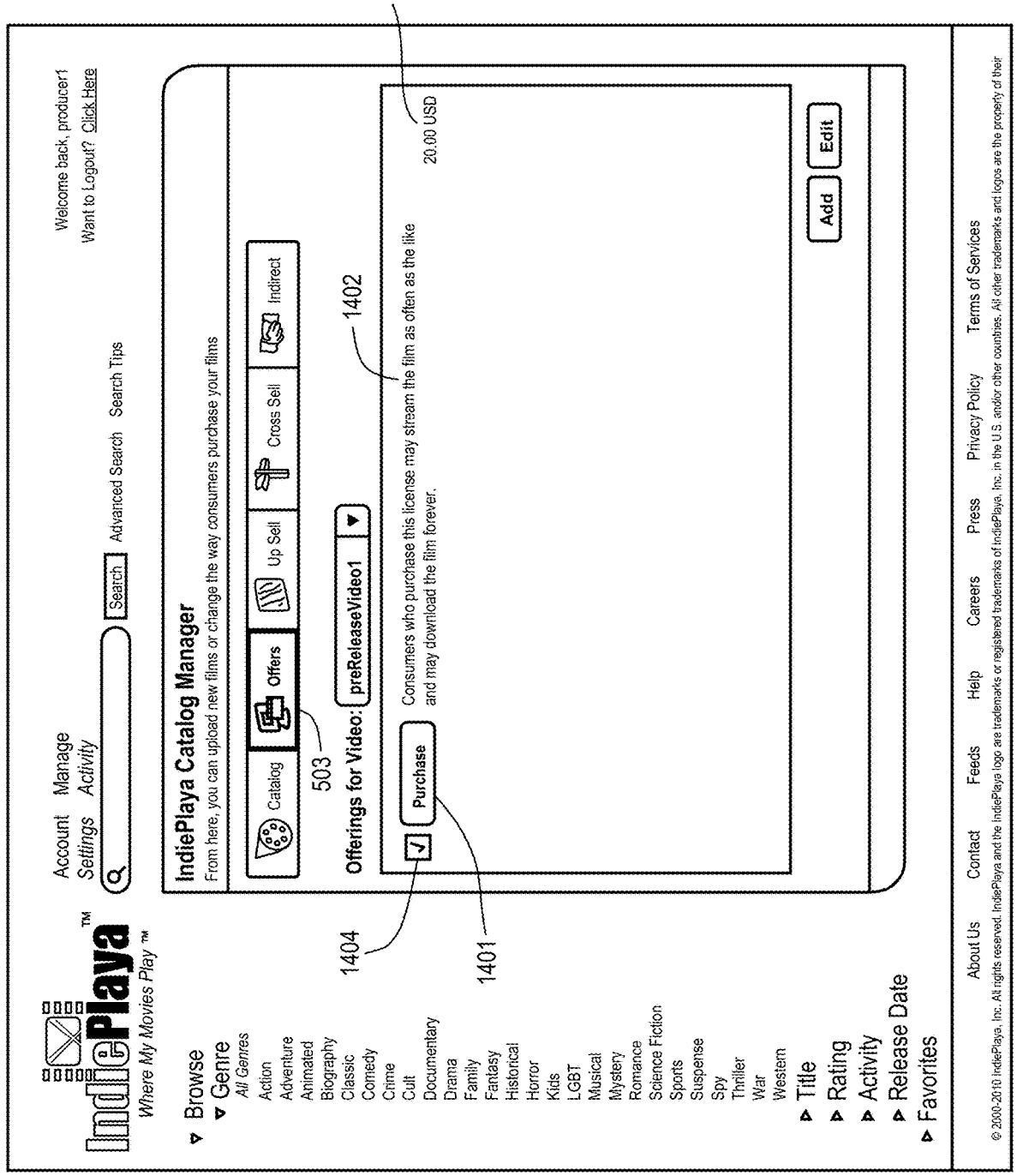
FIG. 14 shows an example of an interface for use when interacting with one or more licensing packages.

FIG. 14 shows an exemplary interface 1400 for use when interacting with one or more licensing packages. As noted above, once a licensing package has been generated, the licensing package can be displayed. In some implementations, the display for a purchase licensing package can include purchase button 1401. Activating purchase button 1401 allows the user (e.g., an audience), to purchase content associated with a purchase licensing package. In some implementations, additional information can be displayed (e.g., a description of the licensing package 1402, or a price of the licensing package 1403). Additionally, as noted above, selecting active control 1303 (from FIG. 13), can cause the system to check visual indication 1404 for the purchase licensing package on interface 1400 (e.g., indicating that the purchase licensing package is active).

Figure 15:
FIG. 15 shows an example of an interface for creating an offer.
Figure 16:
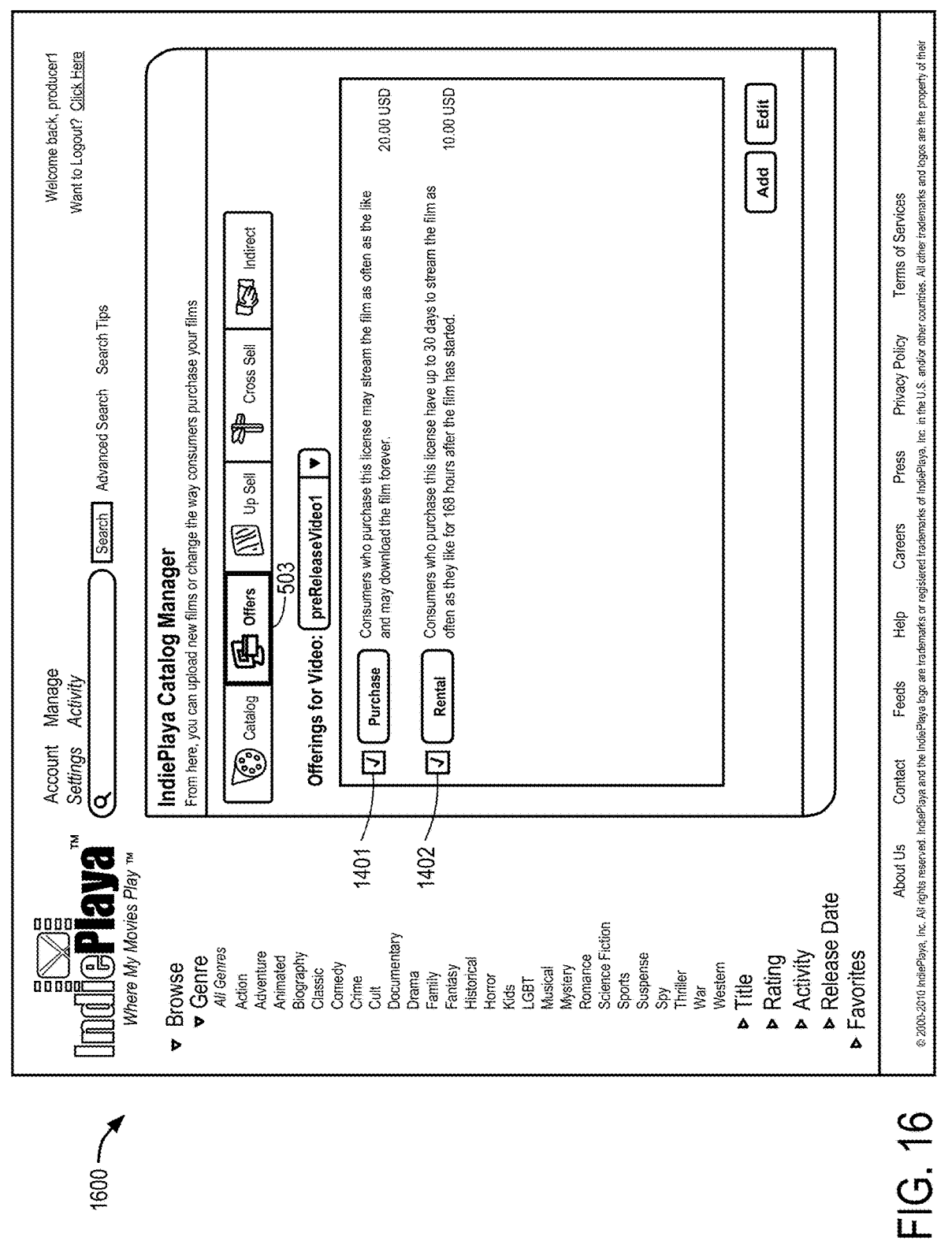
Figure 17:
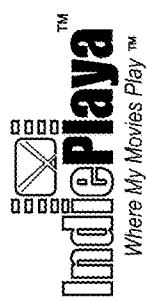
FIG. 17 shows another example of an interface for creating an offer.

In some implementations, the system can also generate a rental licensing package, in which a recipient of the content can play the content any number of times desired within a period of time defined by the license, and a play n-number of times licensing package, in which a recipient of the content can only play the content n number of times (e.g., once, twice, three times, etc.). FIG. 15 shows an exemplary interface 1500 for creating an offer (e.g., a rental licensing package). FIG. 16 shows an exemplary interface 1600 for use when interacting with one or more licensing packages. In some implementations, each licensing package can be displayed separately. In some implementations, activation of purchase button 1401 can be tied to rental button 1402 (e.g., selection of purchase button 1401 can deactivate the licensing package associated with a previously selected rental button 1402). In some implementations, each licensing package can be activated and deactivated separately. Thus, in these implementations, purchase button 1401 can be activated and deactivated separately and distinctly from rental button 1402 (e.g., activation of purchase button 1401 can have no effect upon the state of rental button 1402). FIG. 17 shows an exemplary interface 1700 for creating another offer (e.g., a play once licensing package). One of skill in the art will appreciate that the play once licensing offer in FIG. 17 is just one example of a n-number of times licensing package and that the present disclosure fully contemplates an n-number of times licensing package where n is any positive integer.

Figure 18:
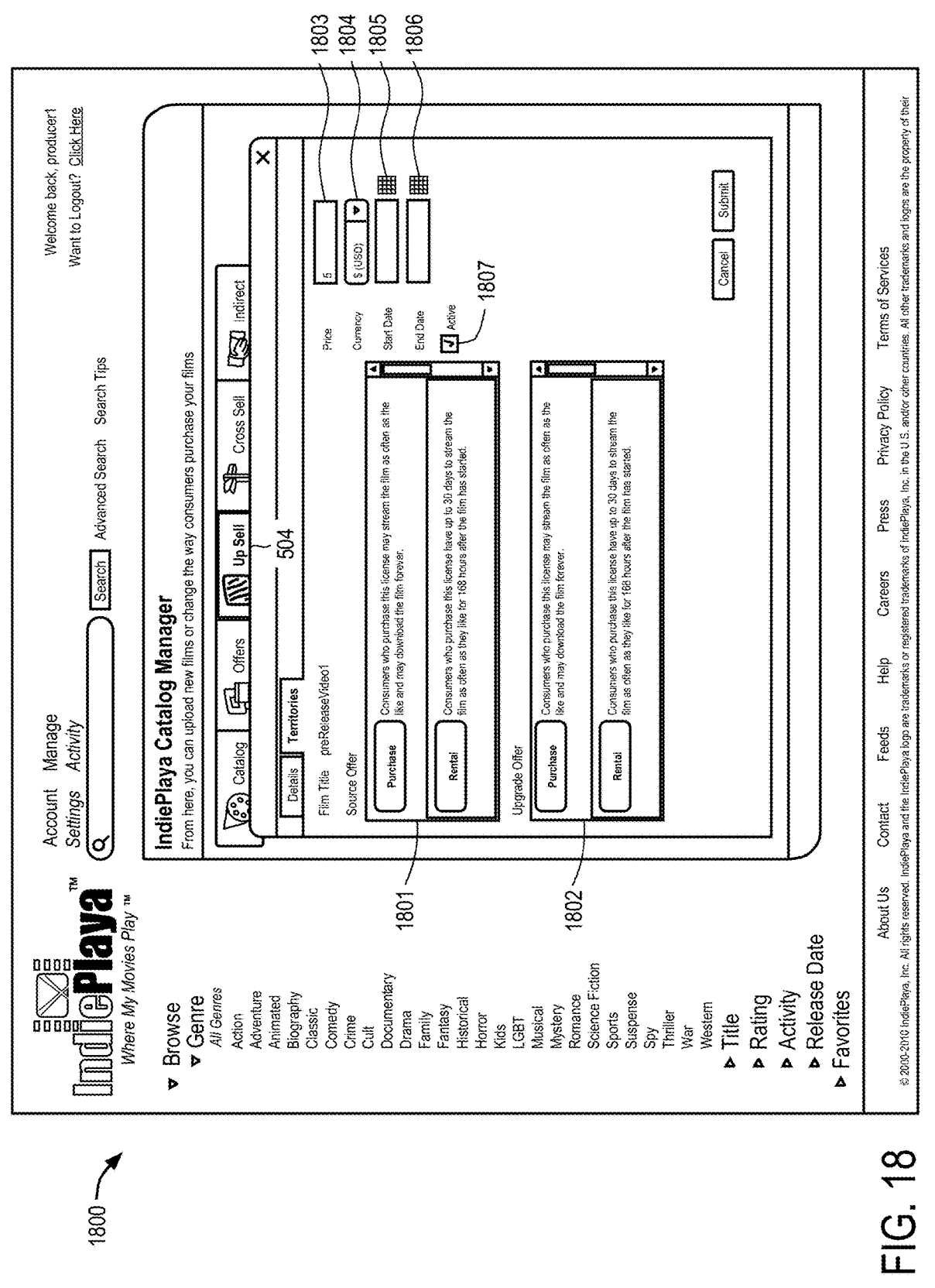

FIG. 18 shows an exemplary up-sell interface 1800 for creating an up-sell (e.g., an up-sell licensing package) using a control (e.g., the up-sell control 504), within catalog manager 501 (from FIG. 5). In some implementations, an up-sell (e.g., an up-sell licensing package) can be dynamically created (e.g., by a content creator) at any time, and offered as a licensing option (e.g., to a user). In some implementations, interface 1800 can include one or more controls for defining an up-sell licensing package. As noted above, an up-sell can include an ability to up-sell content (e.g., using a licensing package). In these implementations, when a user exhibits an interest in paying a first amount for a limited use license to use content for a predefined time period (e.g., a day), the content creator can dynamically create and offer the user another license option to use the same content at a second amount and for a different period of time (e.g., forever).

Referring to FIG. 18, a content creator can create an up-sell option for any content created and/or offered by the content creator (e.g., source content 1801) as well as an upgrade 1802 to any content created and/or offered by the content creator. Up-sell interface 1800 can include one or more areas for entering data corresponding to the up-sell. For example, up-sell interface 1800 can include any combination of price area 1803 (e.g., for setting an up-sell price), currency area 1804 (e.g., for setting a type of currency for the up-sell), start date 1805 (e.g., for setting a start date for the up-sell offer), end date 1806 (e.g., for setting an end date for the up-sell offer), and active control 1807 (e.g., for indicating whether the up-sell licensing package is active).

Figure 19:
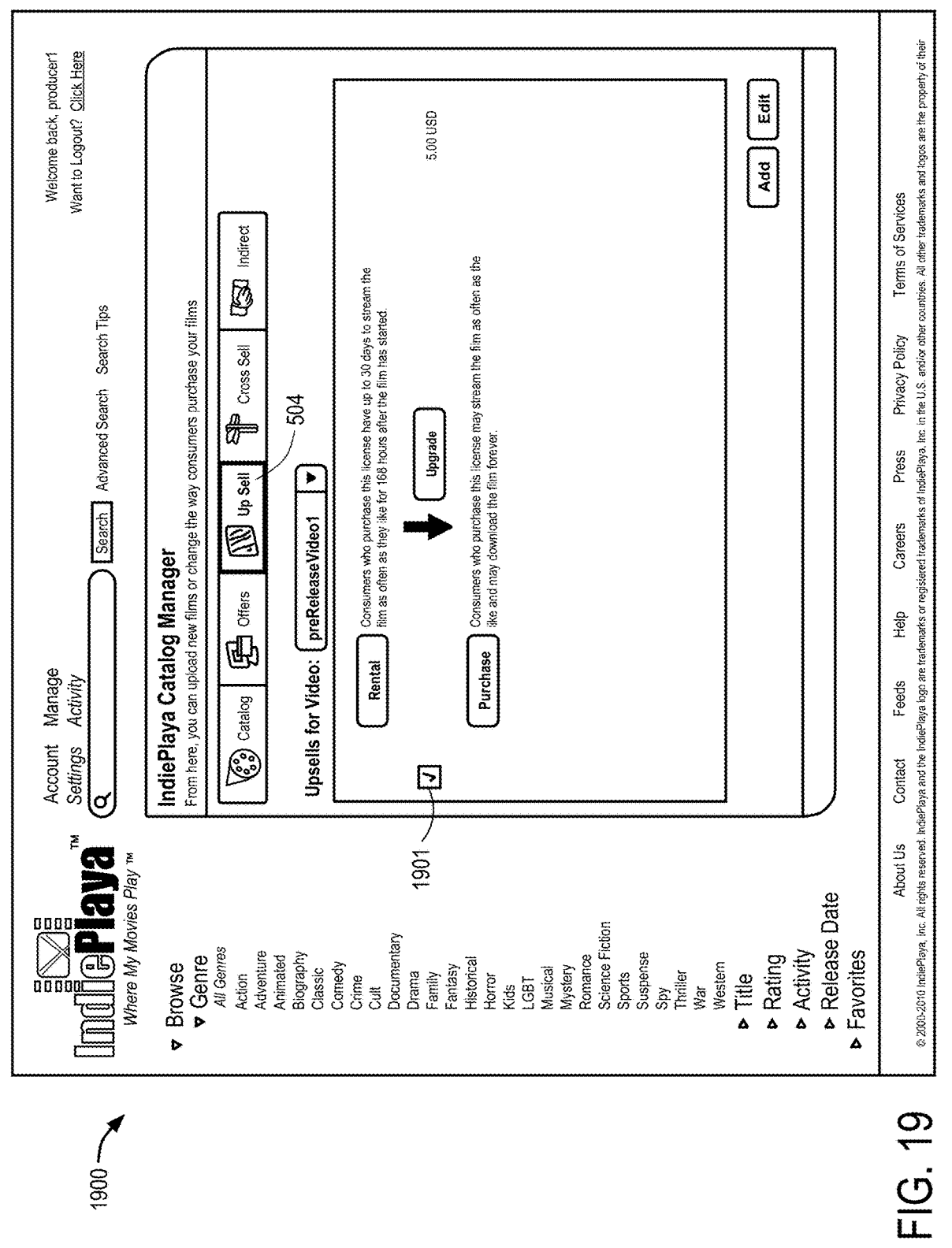

Once submitted, an up-sell licensing package can be displayed (e.g., to a user). FIG. 19 shows an exemplary interface 1900 for use when interacting with one or more up-sell licensing packages. As noted above, selecting active control 1807 can cause the system to check visual indication 1901 for the up-sell licensing package on interface 1900 (e.g., indicating that the up-sell licensing package is active).

Figure 20:
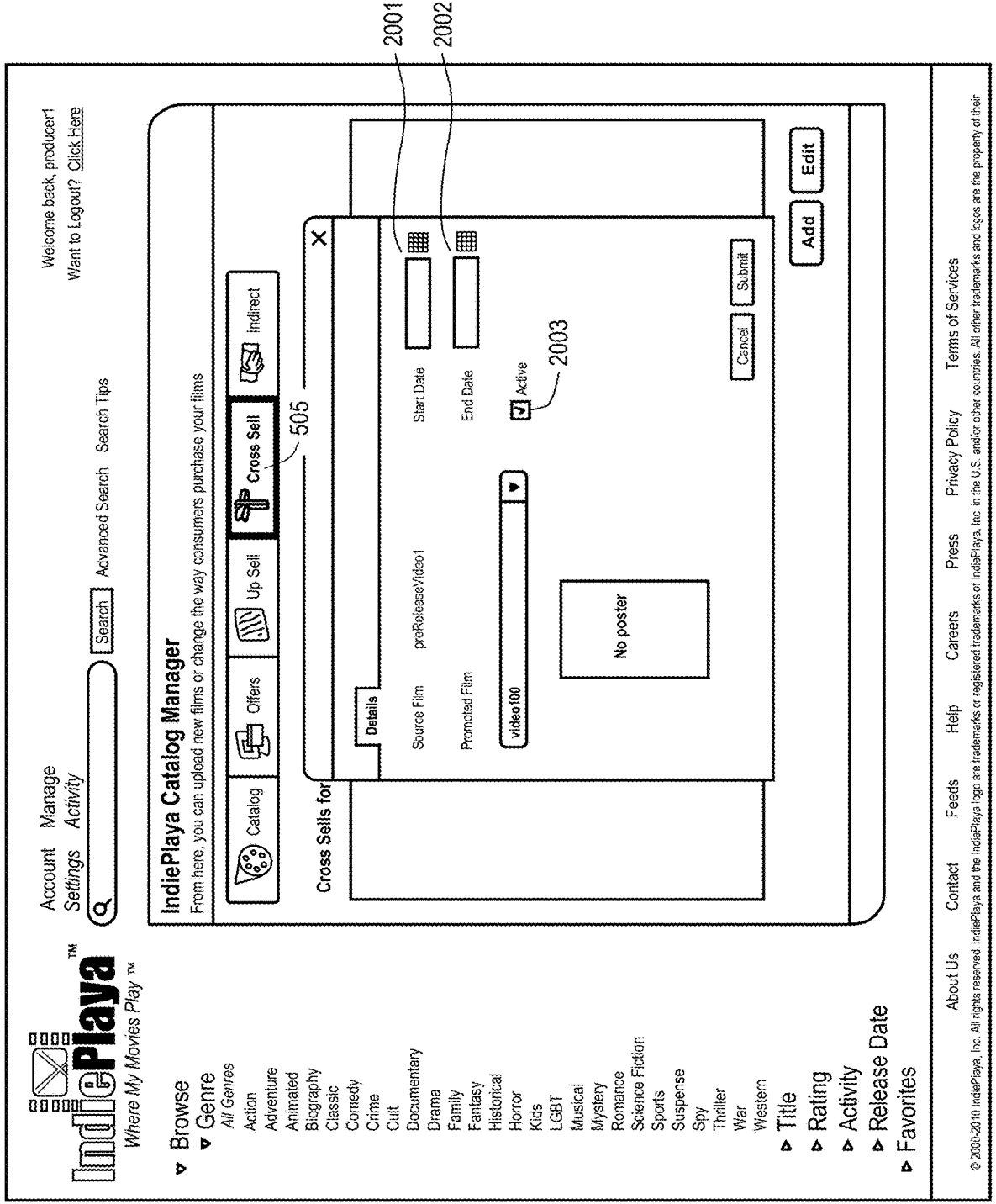

FIG. 20 shows an exemplary cross-sell interface 2000 for creating a cross-sell option (e.g., a cross-sell licensing package) using a control (e.g., cross-sell control 505) within catalog manager 501 (from FIG. 5). In some implementations, a cross-sell option (e.g., a cross-sell licensing package) can be dynamically created (e.g., by a content creator) at any time, and offered as a licensing option (e.g., to a user). In some implementations, interface 2000 can include one or more controls for defining a cross-sell licensing package. As noted above, a cross-sell can include an ability to cross-sell related or unrelated content (e.g., using a licensing package). For example, when a user exhibits an interest in licensing content, the content creator can dynamically create and offer the user another license option for similar content.

Referring to FIG. 20, a content creator can create a cross-sell option for any content. Cross-sell interface 2000 can include one or more areas for entering data corresponding to a cross-sell option. For example, cross-sell interface 2000 can include any combination of start date 2001 (e.g., for setting a start date for the cross-sell offer), end date 2002 (e.g., for setting an end date for the cross-sell offer), and active control 2003 (e.g., for indicating whether the cross-sell licensing package is active). Once submitted, a cross-sell licensing package can be displayed.

FIG. 20A shows an exemplary license cross-sell interface 2010 for creating a cross-sell option. Cross-sell interface 2010 can include one or more areas for entering data corresponding to a cross-sell option. For example, when a user exhibits an interest in licensing content, the content creator can dynamically create and offer the user another license option for similar content. In this example, when a user selects a content rental or purchase option corresponding to first content (e.g., a video), the content creator is notified or otherwise made aware. Once aware, the content creator can dynamically create and offer a content purchase option for similar second content (e.g., if you like A, you can buy B for $3.00).

Figure 20B:

FIG. 20B shows an exemplary bundle cross-sell interface 2020 for creating a cross-sell option. Cross-sell interface 2020 can include one or more areas for entering data corresponding to a cross-sell option. In yet another example, when a user exhibits an interest in licensing content, the content creator can dynamically create and offer the user an additional licensing bundle for similar content. In this example, when a user selects a page on which content is hosted, the content creator is notified or otherwise made aware. Once aware, the content creator can dynamically create and offer a content purchase option for the content on the current page as well as one or more additional purchase options for the similar content (e.g., if you like A, you can buy A and B together for $10.00), as part of a bundle of content.

Figure 21:
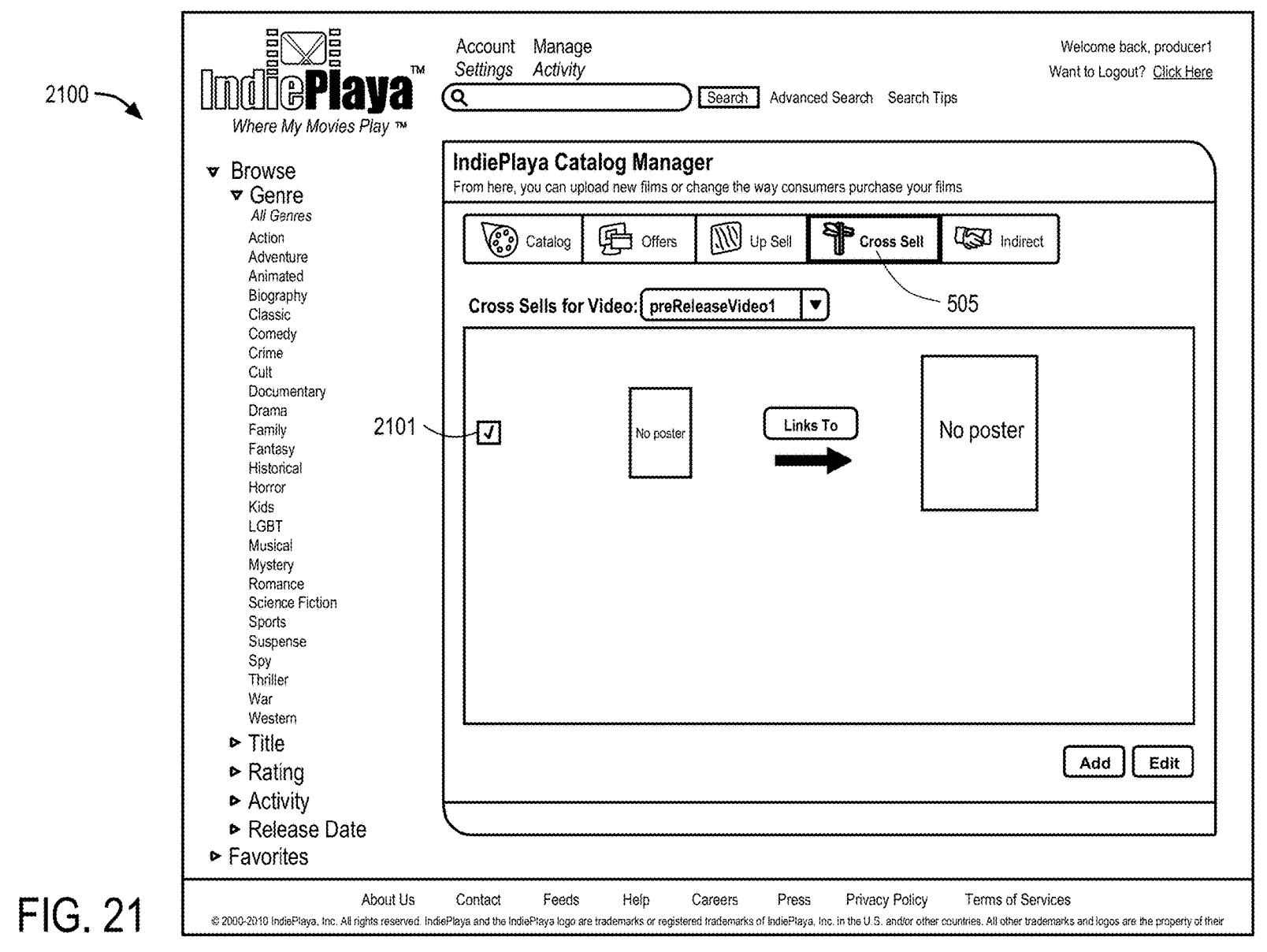

FIG. 21 shows an exemplary interface 2100 for use when interacting with one or more cross-sell licensing packages. As noted above, selecting active control 2003 can cause the system to check visual indication 2101 for the cross-sell licensing package on interface 2100 (e.g., indicating that the cross-sell licensing package is active).

Figure 22:
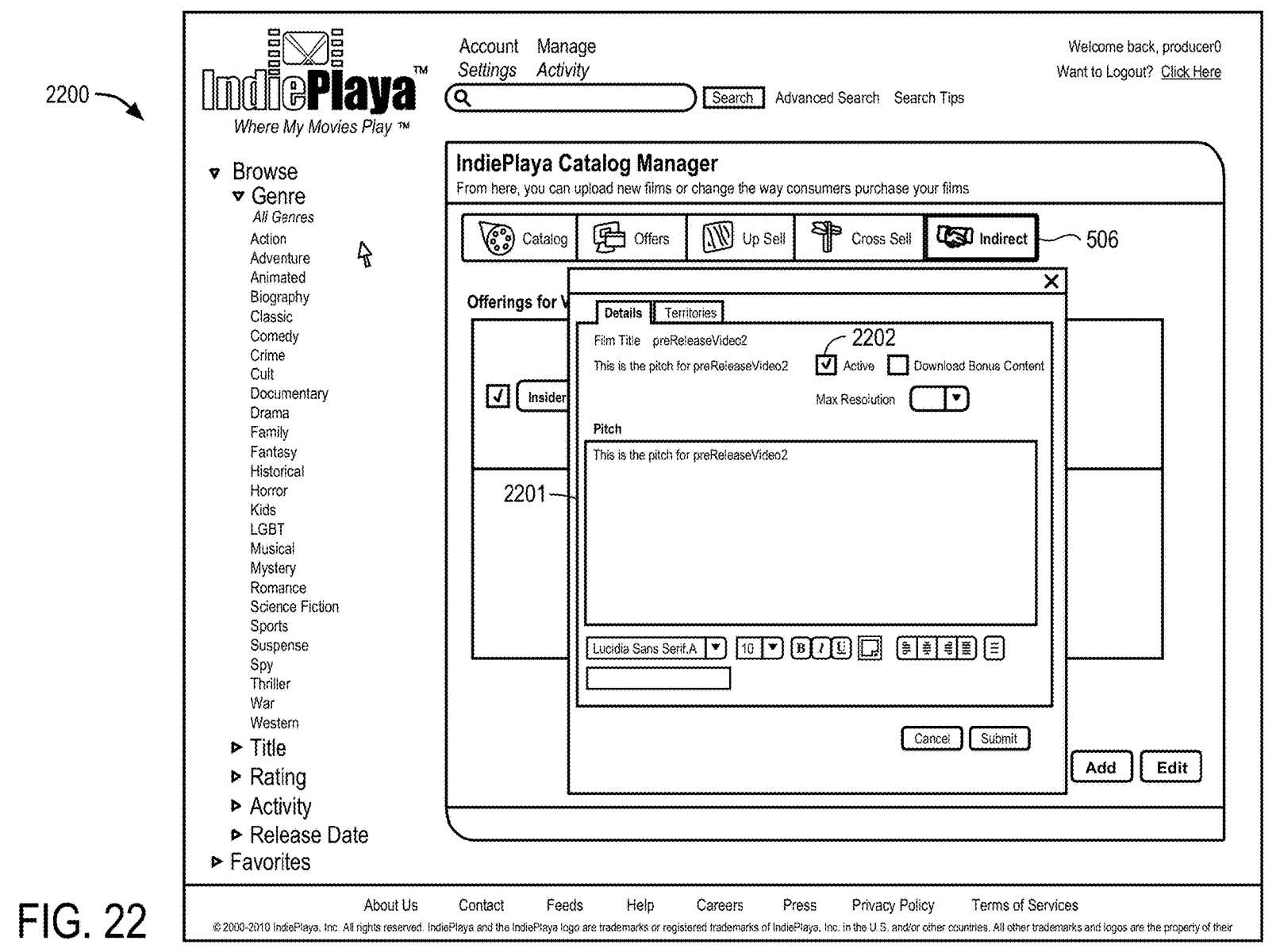

FIG. 22 shows an exemplary indirect interface 2000 for creating an insider offer (e.g., a pitch licensing package)

using a control (e.g., indirect control 506), within catalog manager 501 (from FIG. 5). In some implementations, an insider offer (e.g., a pitch licensing package), can be dynamically created at any time (e.g., by a content creator), and offered as a licensing option (e.g., to a third party user such as an industry insider). In some implementations, interface 2200 can include one or more controls for defining an insider offer (e.g., a limited ability to promote content without the ability to sell the content). A content creator can create an insider offer for any content. Insider interface 2200 can include one or more areas for entering data corresponding to an insider offer. For example, insider interface 2200 can include pitch area 2201 for indicating one or more terms of a pitch licensing package, and active control 2202 (e.g., for indicating whether the pitch licensing package is active). Once submitted, the pitch licensing package can be displayed.

Figure 23:
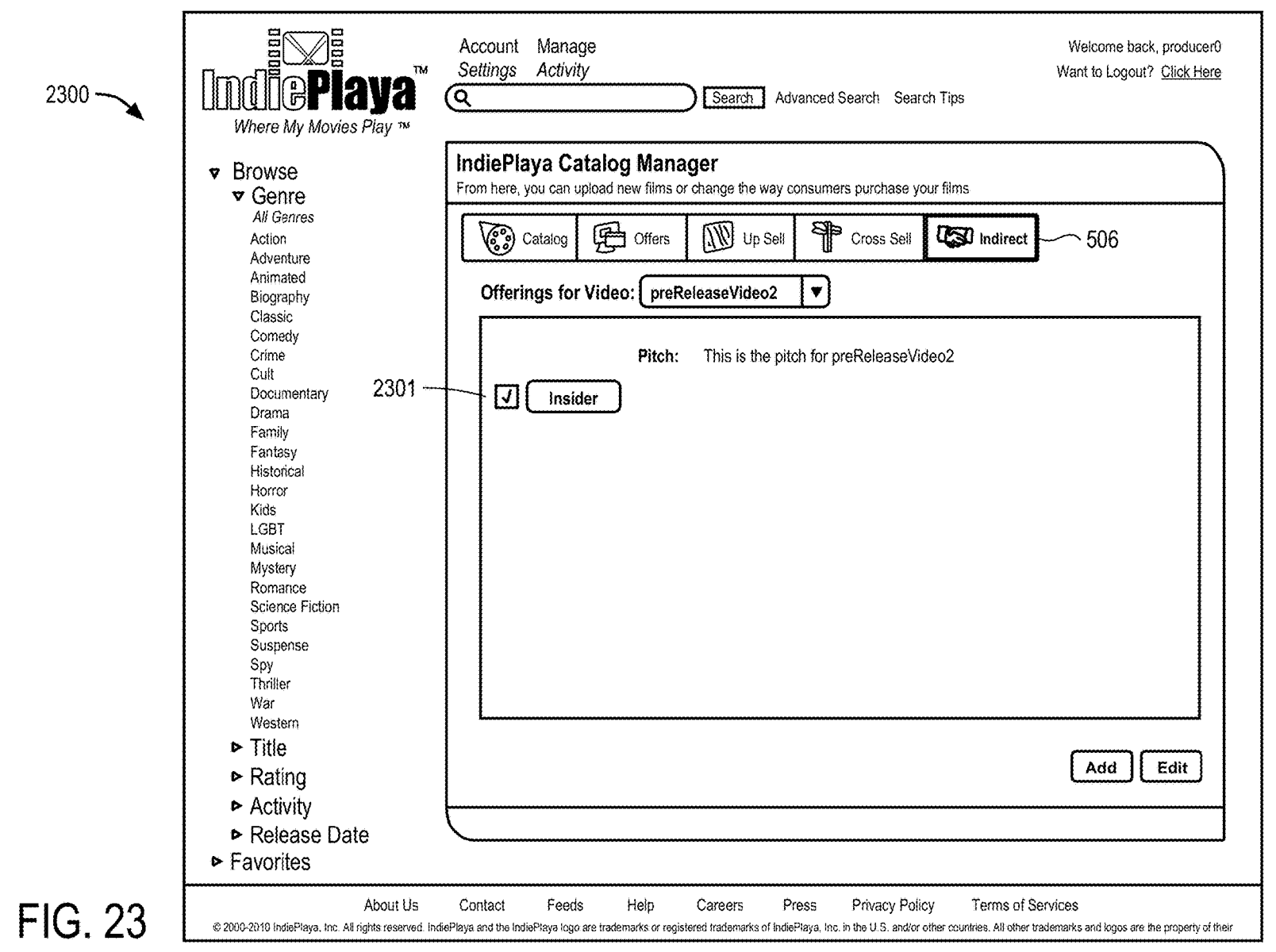

FIG. 23 shows an exemplary interface 2300 for use when interacting with one or more pitch licensing packages. As noted above, selecting the active control 2202 can cause the system to check the visual indication 2301 for the pitch licensing package on interface 2300 (e.g., indicating that the pitch licensing package is active). In some implementations, when a third party (e.g., an influencer or industry insider), indicates an interest in content (e.g., by selecting the content), the content creator can send the industry insider a pitch licensing package. In these implementations, the content creator can be notified of the insider interest (e.g., by the system), or discover the insider interest by monitoring the system (e.g., by generating one or more reports).

In some implementations, an influencer can be any third party who influences the awareness, perception, viewing behaviors, or purchasing behaviors of others within the influencer's community, locale, social network, peer group, colleagues, etc., to raise awareness, promote dialog or generate sales of content.

In some implementations, an insider can be any third party granted the right to perform one or more of the following functions with respect to content or content-related data: processing, marketing, promotion, management, packaging, merchandising, fulfillment, delivery, distribution, licensing, and enforcement of content or content-related data. In some implementations, an insider can be considered a content provider.

A content provider is any third party granted the right to market or distribute (including, without limitation, subdistribution, syndication, and licensing of) a content creator's content or content-related data. A content provider can include, but is not limited to, a distributor, subdistributor, producer's representative, sales agent, buyer, aggregator, publisher, network, broadcaster, syndicator, assignee, and licensee of content or content-related data. In some implementations, a content provider can perform any and all functions associated with the systems and methods provided herein.

It should be understood that any and all functions performed by a content creator can also be performed by a content provider.

Figure 24:
FIG. 24 shows an example of an interface for use by an industry insider.

In some implementations, an insider interest functionality allows the insider to limit the number of pitch licensing packages they receive (e.g., packages are only sent when interest is expressly indicated). Additionally, content creators are able to monitor insider interest. For example, when an insider indicates interest in content, the content creator can run a report to see whether additional different insider interest exists. If the report is indicative of additional different insider interest, the content creator can choose to negotiate with the insider. If the report is indicative of no additional insider interest, the content creator can choose to accept an insider offer without further negotiation. FIG. 24 shows an exemplary interface 2400 for use by an industry insider (e.g., a third party promoter or influencer). Using the interface 2400, an industry insider can indicate interest in, view, and express an interest in licensing content.

Figure 24A:
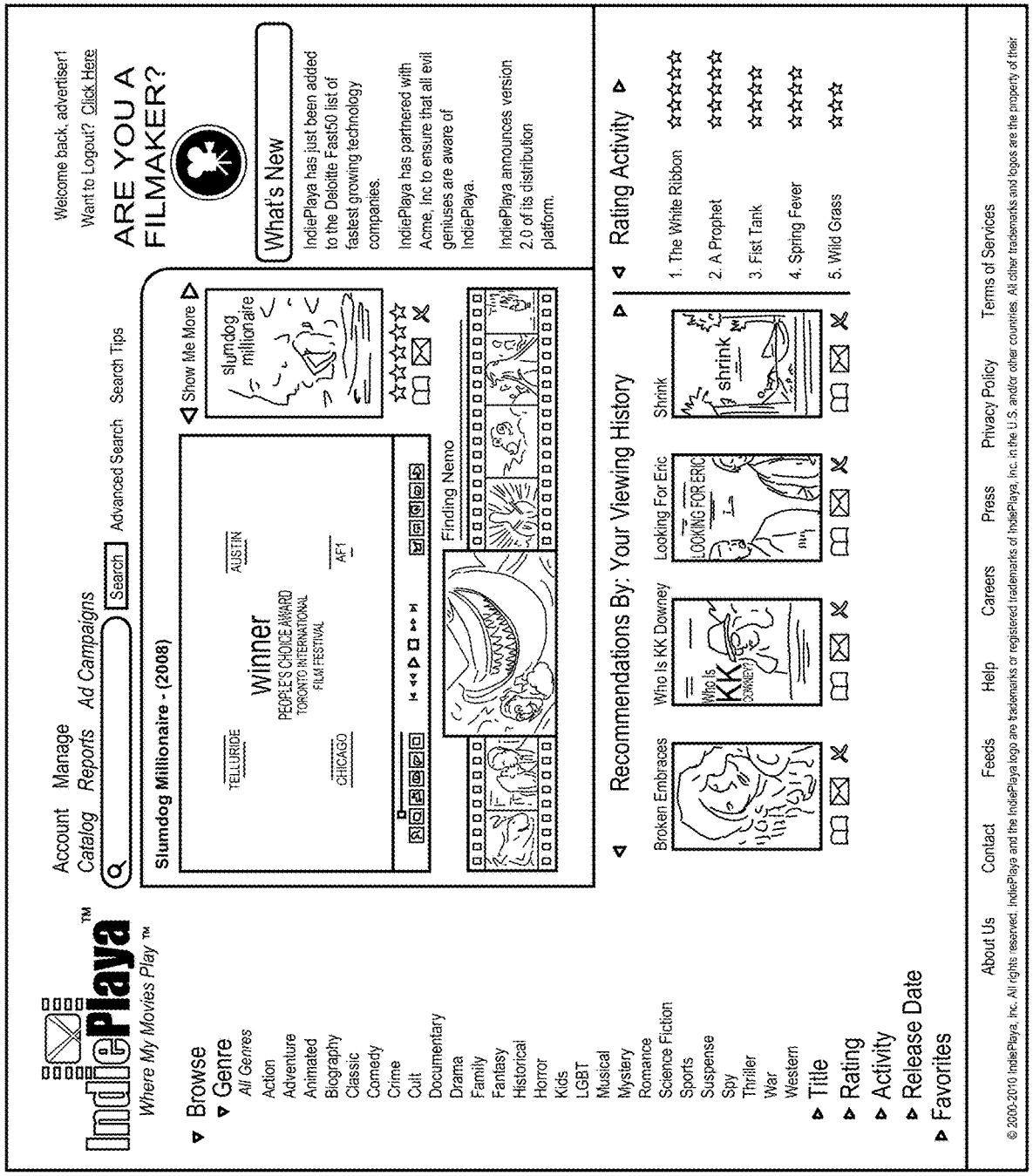
Figure 24B:
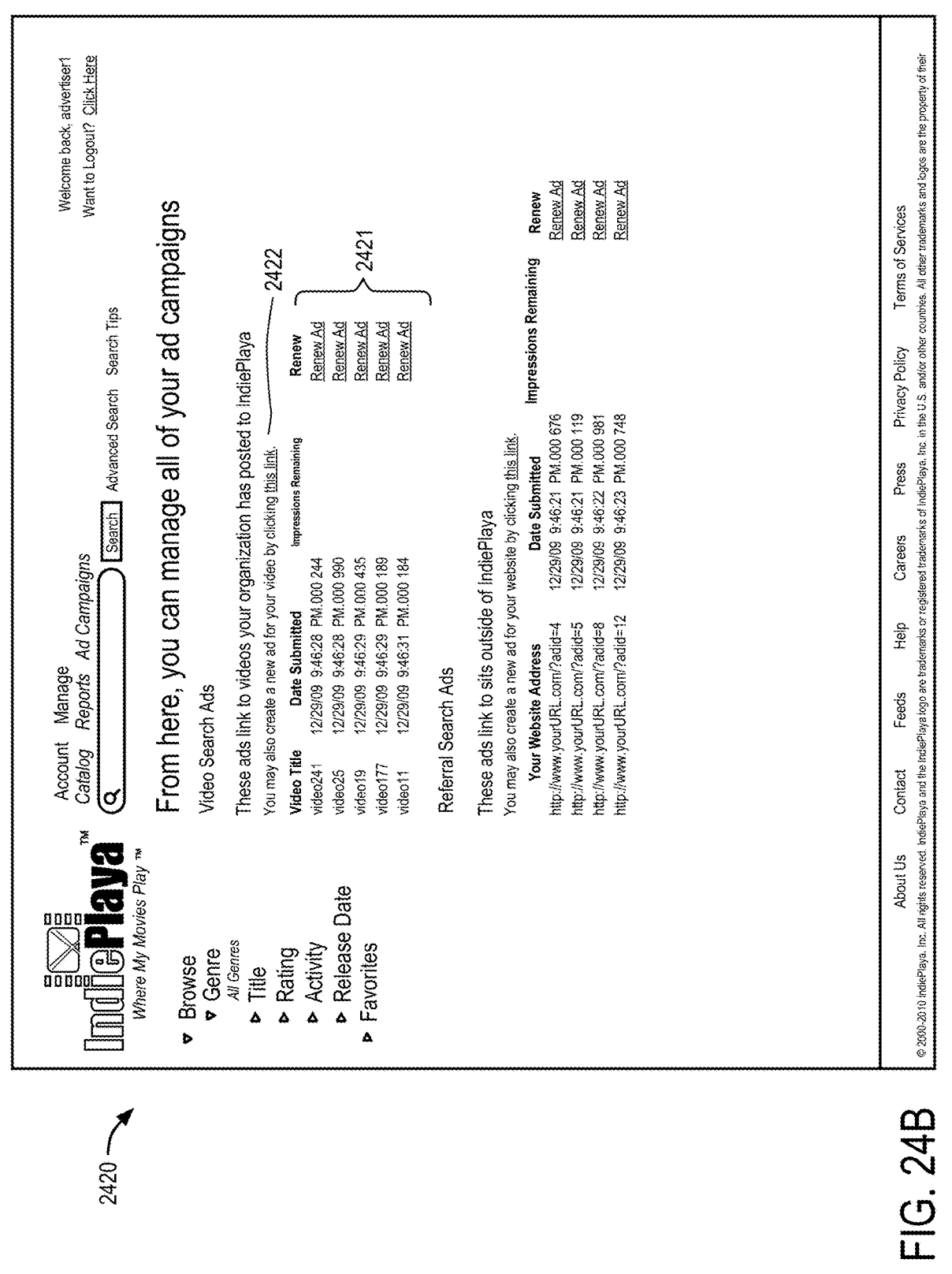

In some implementations, when a party (e.g., a content creator or a third party), indicates an interest in promoting content (e.g., using an ad campaign), the system can generate one or more content-related advertisements. FIGS. 24A-24G show exemplary interfaces for interacting with content to create, renew, generate, and/or display content-related advertisements. FIG. 24A shows example interface 2410 for use by a party (e.g., a content creator or a third party). FIG. 24B shows exemplary interface 2420 including a list of renewable content-related advertisements 2421 and a link 2422 to facilitate creation of new renewable content-related advertisements. FIG. 24C shows an exemplary interface 2430 including one or more areas for entering content-related data. Using exemplary interface 2430, a party (e.g., a content creator or a third party), can generate one or more content-related advertisements. FIG. 24D shows an example interface 2440 including a summary of a new content-related advertisement corresponding to the content-related data entered in FIG. 24C. Using example interface 2440, a party (e.g., a content creator or a third party), can confirm or cancel a new content-related advertisement. In some implementations, when a new content-related advertisement is confirmed, the system can generate a payment screen to facilitate payment.

Figure 24F:

FIG. 24E shows an exemplary interface 2450 including one or more areas for entering content-related data. Using example interface 2450, a party (e.g., a content creator or a third party), can renew one or more existing content-related advertisements. FIG. 24F shows an exemplary interface 2460 including a renewal summary of the content-related advertisement corresponding to the content-related data entered in FIG. 24E. Using exemplary interface 2460, a party (e.g., a content creator or a third party), can confirm or cancel the renewal of a content-related advertisement. In some implementations, when the renewal of a content-related advertisement is confirmed, the system can generate a payment screen to facilitate payment.

Figure 24G:
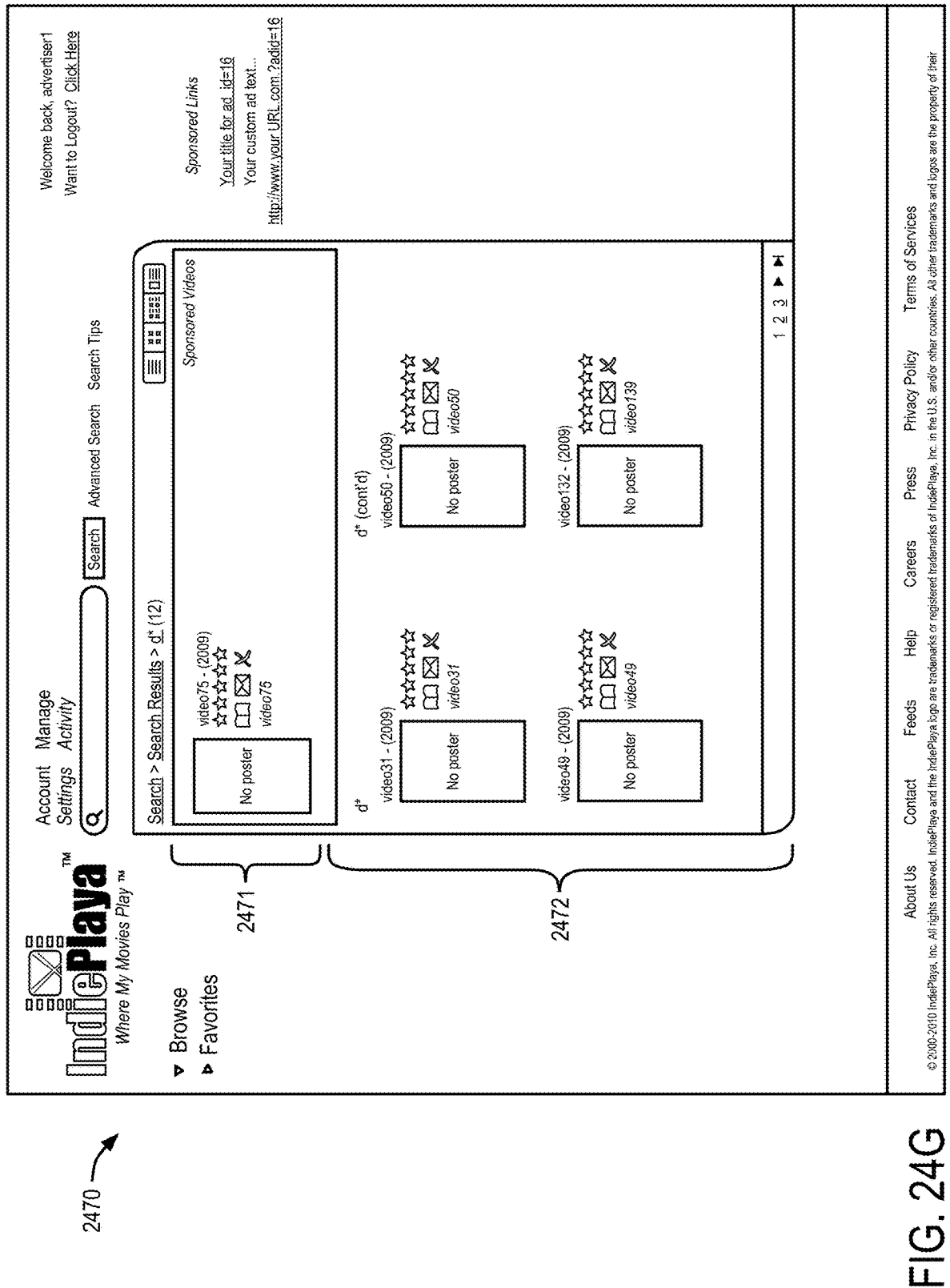

FIG. 24G shows an exemplary interface 2470 of search results (e.g., based upon a search that incorporates one or more advertisement keywords). Exemplary interface 2470 can be viewed by any user (e.g., audience member), using the system. Exemplary interface 2470 can include a graphical depiction of content 2471 (e.g., the promoted video content), corresponding to a content-related advertisement and one or more content-related advertisement keywords. Additionally, exemplary interface 2470 can also include a graphical depiction of search results 2472 (e.g., content that corresponds to the search that incorporates the one or more content-related advertisement keywords).

Figure 25:
FIG. 25 shows an example of an interface for setting and editing user account settings.

FIG. 25 shows an exemplary interface 2500 for setting and editing user (e.g., audience member) account settings. Interface 2500 can include one or more areas for entering user account information such as a unique challenge (e.g., user name and a password) and any other personal information requested or required by the system. Interface 2500 can also include an account preferences area 2501 for setting one or more user account preferences such as tolerance for strong language setting 2503, strong language classification filter 2504, and other account preference options 2505 (e.g., display unrated content, closed captioning, product and service updates, and profile creation). Additionally, interface 2500 can also include linked accounts area 2502 for indicating related accounts (e.g., social networking accounts), and facilitating connection to related accounts.

FIG. 26 shows an exemplary interface 2600 for viewing account activity (e.g., active rentals, viewing history, purchases, or download history). Interface 2600 can include expandable active rental area 2601 for viewing information corresponding to currently active rentals. FIG. 27 also shows exemplary interface 2600 for viewing account activity. Interface 2600 can also include an expandable viewing history area 2701 for viewing information corresponding to a user viewing history. FIG. 28 also shows exemplary interface 2600 for viewing account activity. Interface 2600 can also include an expandable my purchases area 2801 for viewing information corresponding to the user purchases. FIG. 29 also shows exemplary interface 2600 for viewing account activity. Interface 2600 can also include an expandable "my download" history area 2901 for viewing information corresponding to a user download history.

Figure 30:
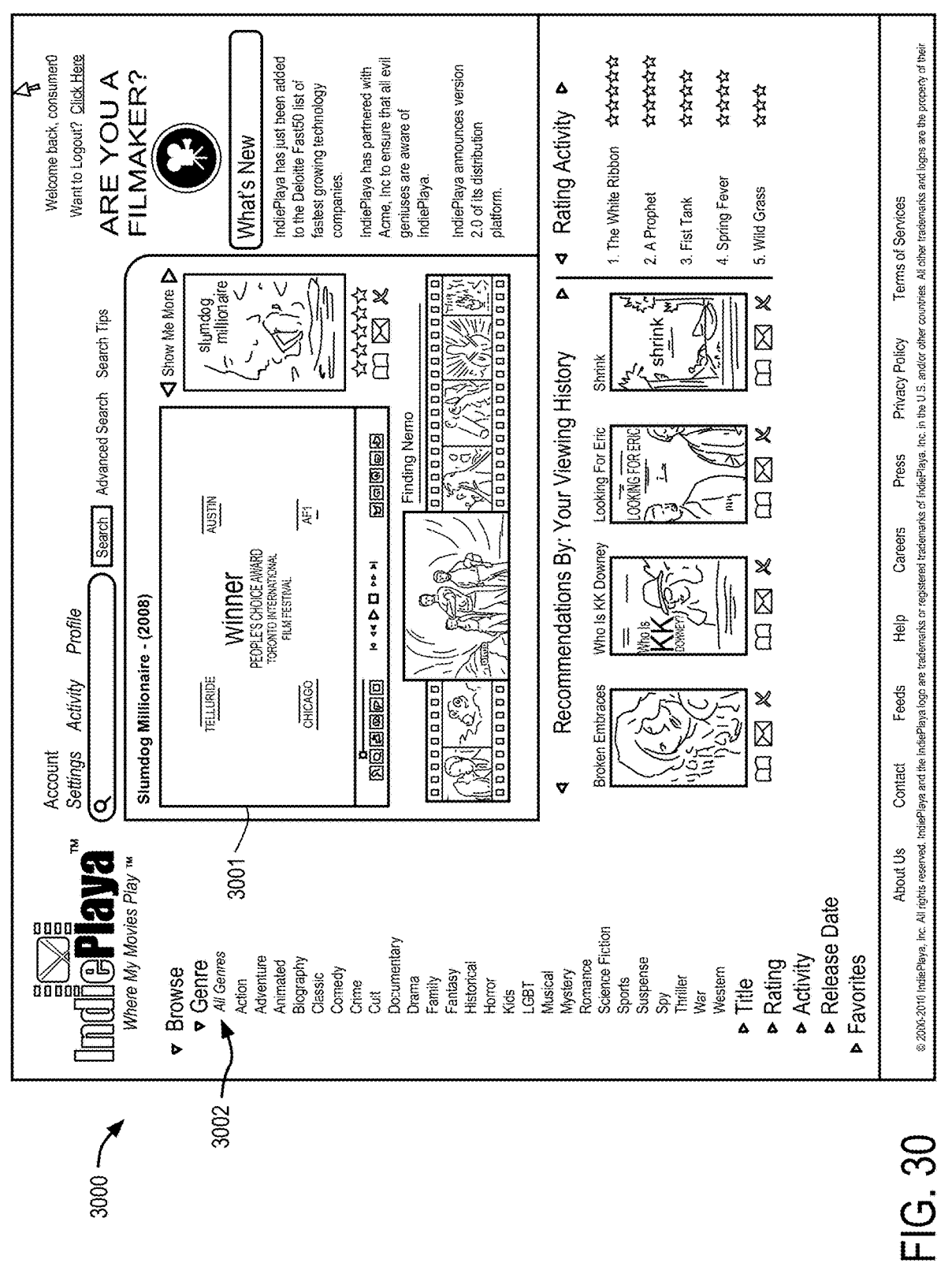

FIG. 30 shows an exemplary interface 3000 for use by a user (e.g., an audience member), when interacting with the system. Using the interface 3000, a user can interact with content. For example, interface 3000 can include a viewing area 3001 (e.g., a window), for interacting with (e.g., viewing), content. In some implementations, as noted above, content can be categorized statically (e.g., by the user) or dynamically (e.g., manually by the user or automatically by the system). In these implementations, a user can browse categorized content (e.g., by genre or by popularity).

Figure 31:
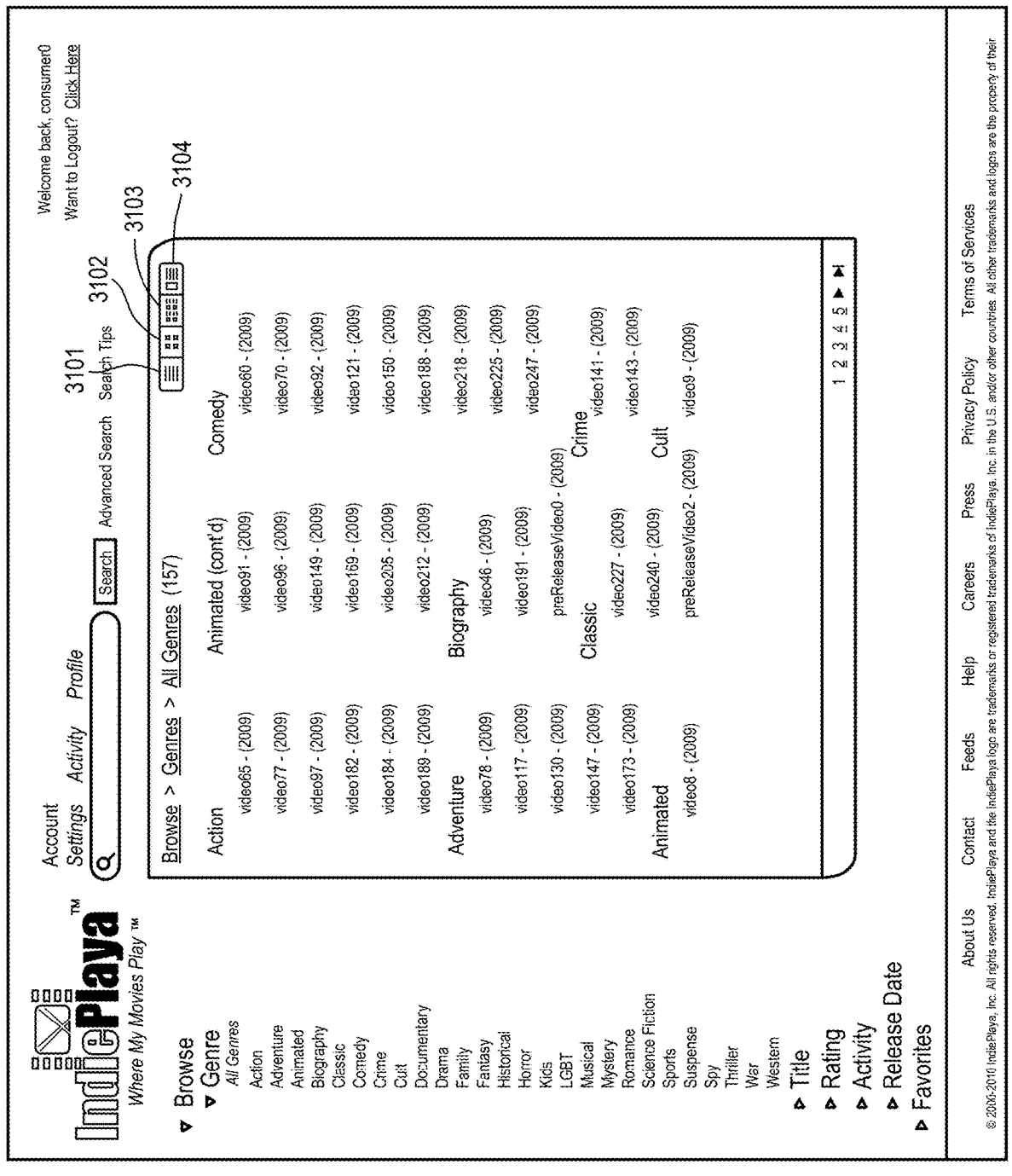
FIG. 31 shows an example of an interface for browsing content.
Figure 32:
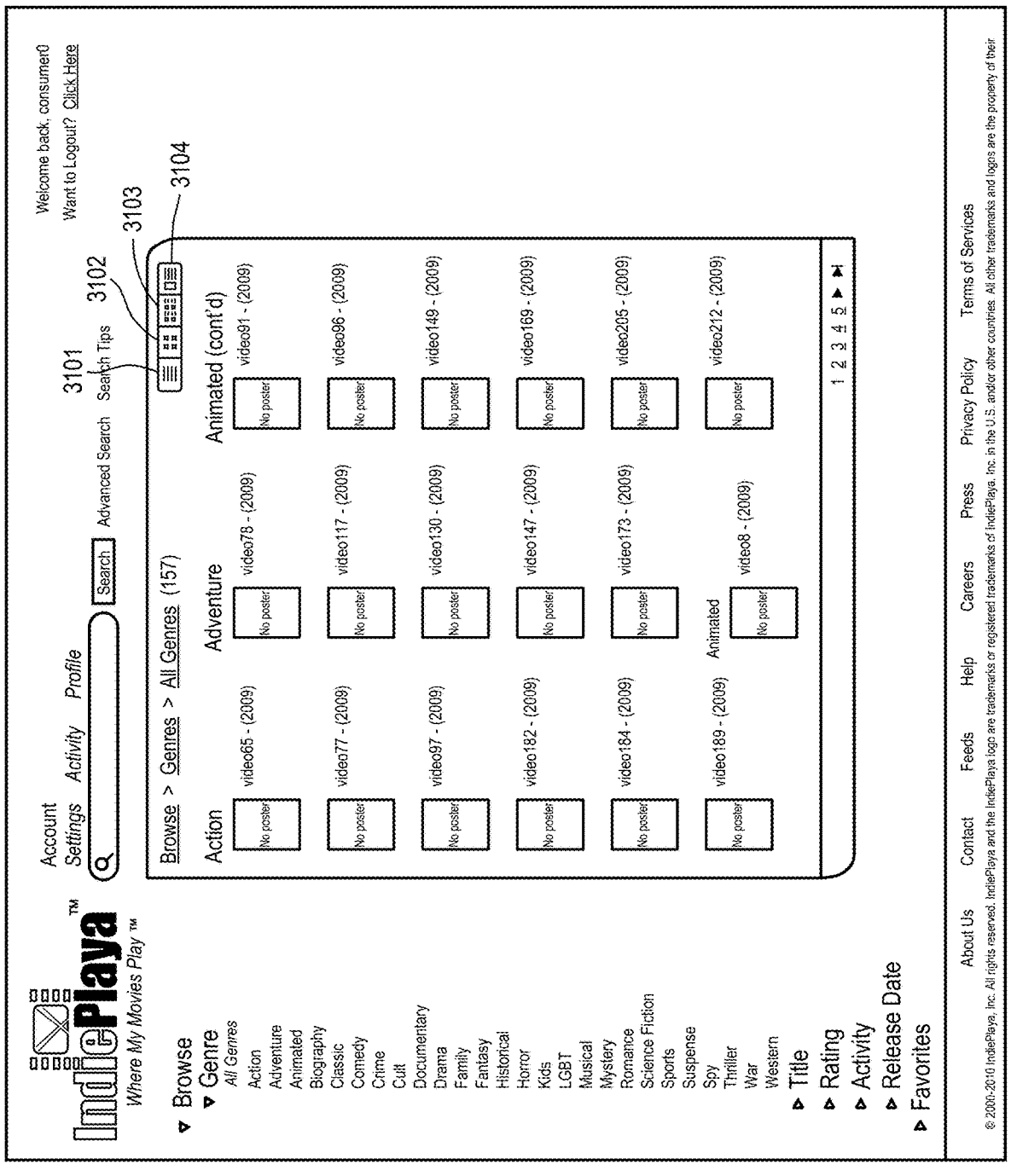
FIG. 32 shows an example of an interface including a depiction of content from the perspective associated with an example control.
Figure 33:
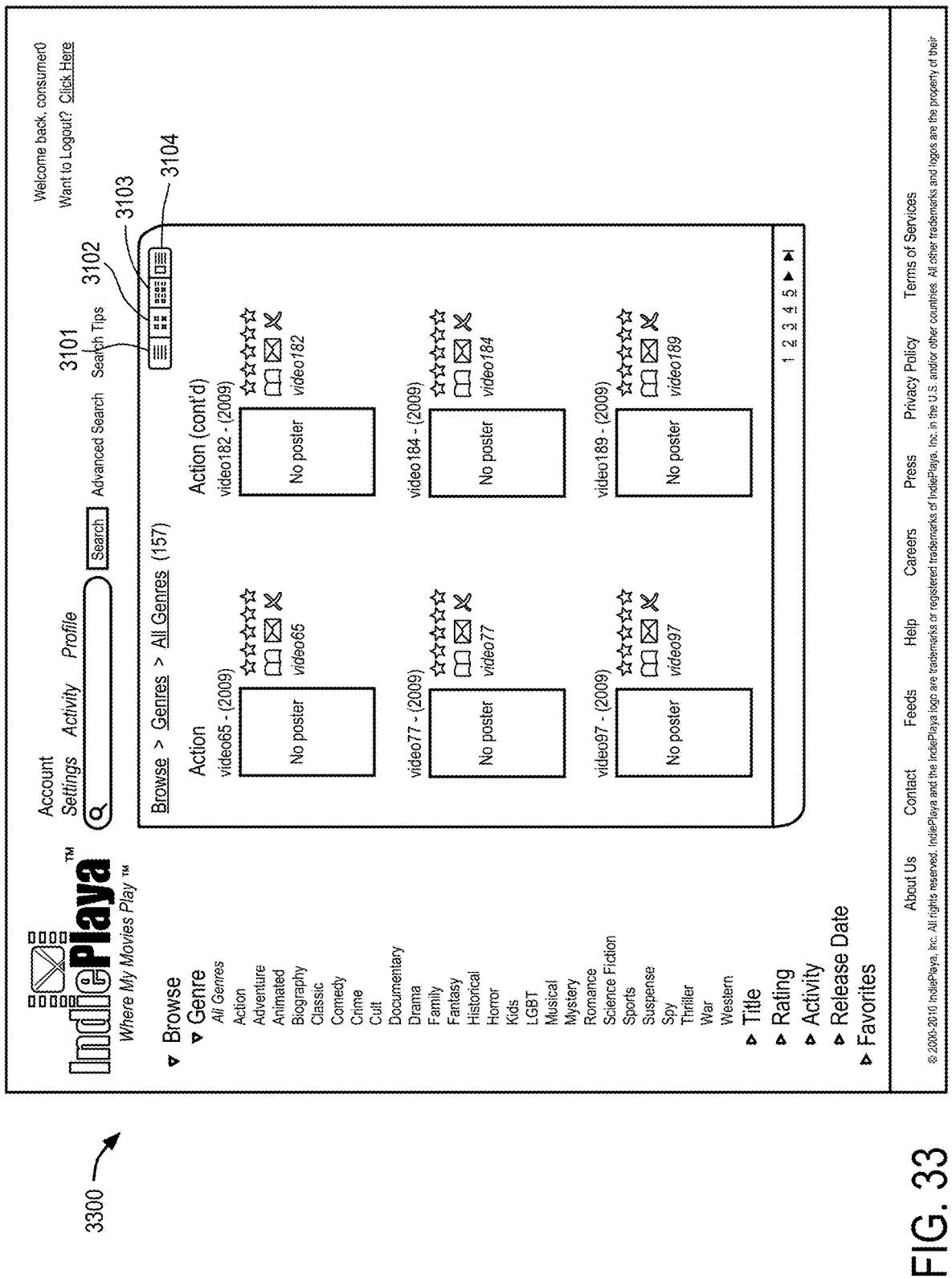
FIG. 33 shows an example of an interface including a depiction of content from the perspective associated with another example control.
Figure 34:
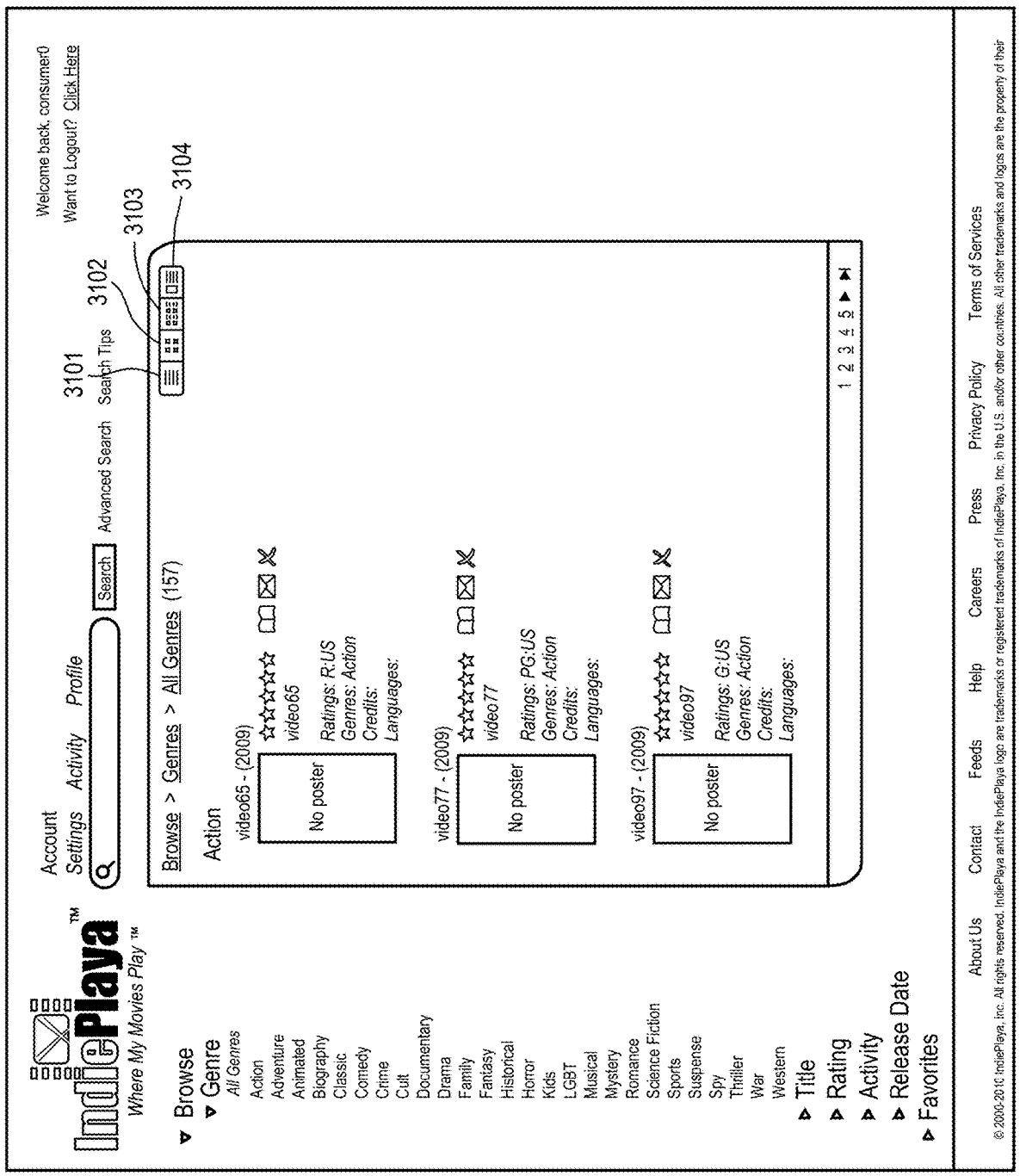
FIG. 34 shows an example of an interface including a depiction of content from the perspective associated with another example control.

FIGS. 31-34 show exemplary interfaces for browsing content. FIG. 31 shows an exemplary interface 3100 for browsing content. Interface 3100 can include one or more example controls 3101, 3102, 3103, and 3104 for changing content perspective (e.g., zooming in (drilling down) on content and zooming out (drilling up) on content). Interface 3100 includes a depiction of content from the perspective associated with example control 3101. Selecting another exemplary control can provide the user with a different perspective of the content. FIG. 32 shows an exemplary interface 3200 including a depiction of content from the perspective associated with example control 3102. FIG. 33 shows an exemplary interface 3300 including a depiction of content from the perspective associated with example control 3103. FIG. 34 shows an exemplary interface 3400 including a depiction of content from the perspective associated with example control 3104.

Figure 35:
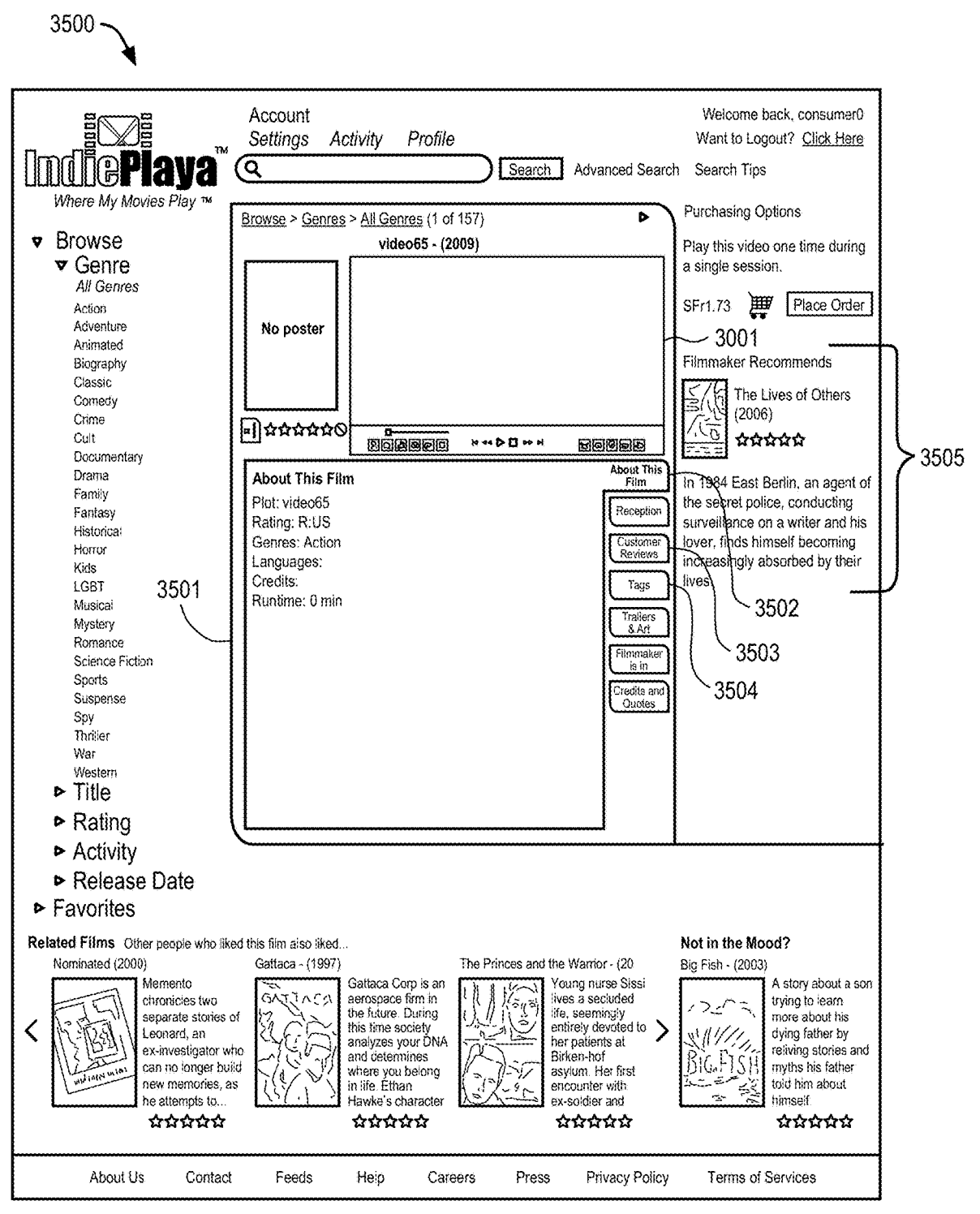
Figure 35A:
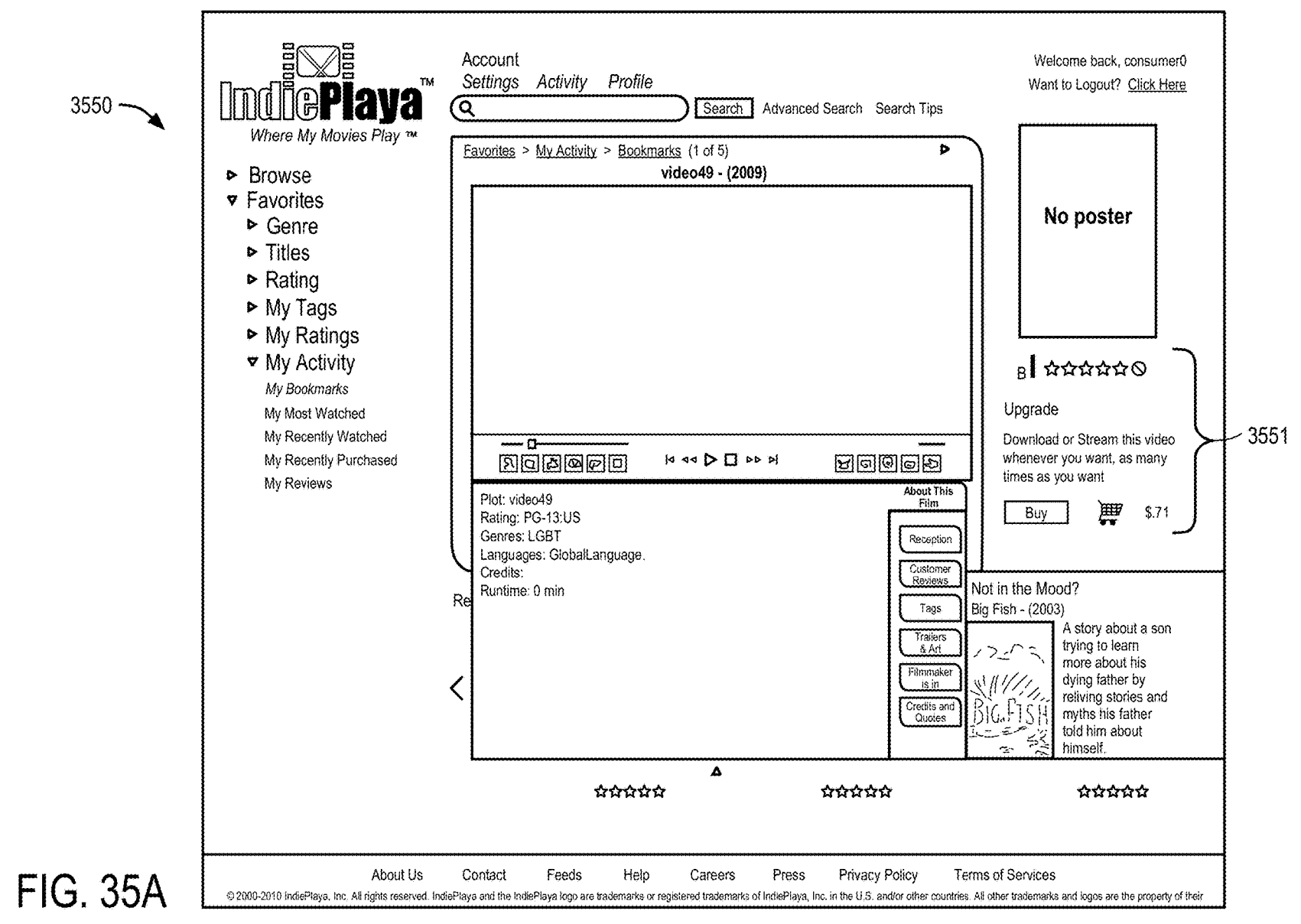

FIGS. 35-39 show exemplary interfaces for interacting with content. FIG. 35 shows an exemplary interface 3500 that is an expanded version of interface 3000 (shown in FIG. 30) for use by a user (e.g., an audience member) when interacting with the system. Specifically, interface 3000 (from FIG. 30) can be expanded into a fixed interface 3500 showing additional controls 3502, 3503, and 3504 that can be used to interact with content. For example, interacting with an "about this" control 3502 (e.g., an "about this film" control) can cause the system to generate and display data corresponding to content (e.g., content displayed in viewing area 3001) in expanded viewing area 3501. In some implementations, interface 3500 can also include one or more content recommendations 3505. In some implementations, one or more licensing packages noted above (e.g., an up-sell) can be manually (e.g., by a content creator) or dynamically (e.g., by the system) generated and displayed to a user. FIG. 35A shows an exemplary interface 3550 including a licensing package upgrade option 3551 (e.g., an unlimited content download for a purchase price of $71). Additionally, FIG. 35A includes a larger interface 3000 (from FIG. 30) and a dynamically expanded area that can contain catalog and editorial information that becomes available after a user has purchased content. In some implementations, selecting the licensing package 3551 can cause the system to end any other licensing package (e.g., a limited rental) corresponding to the same content.

Figure 36:
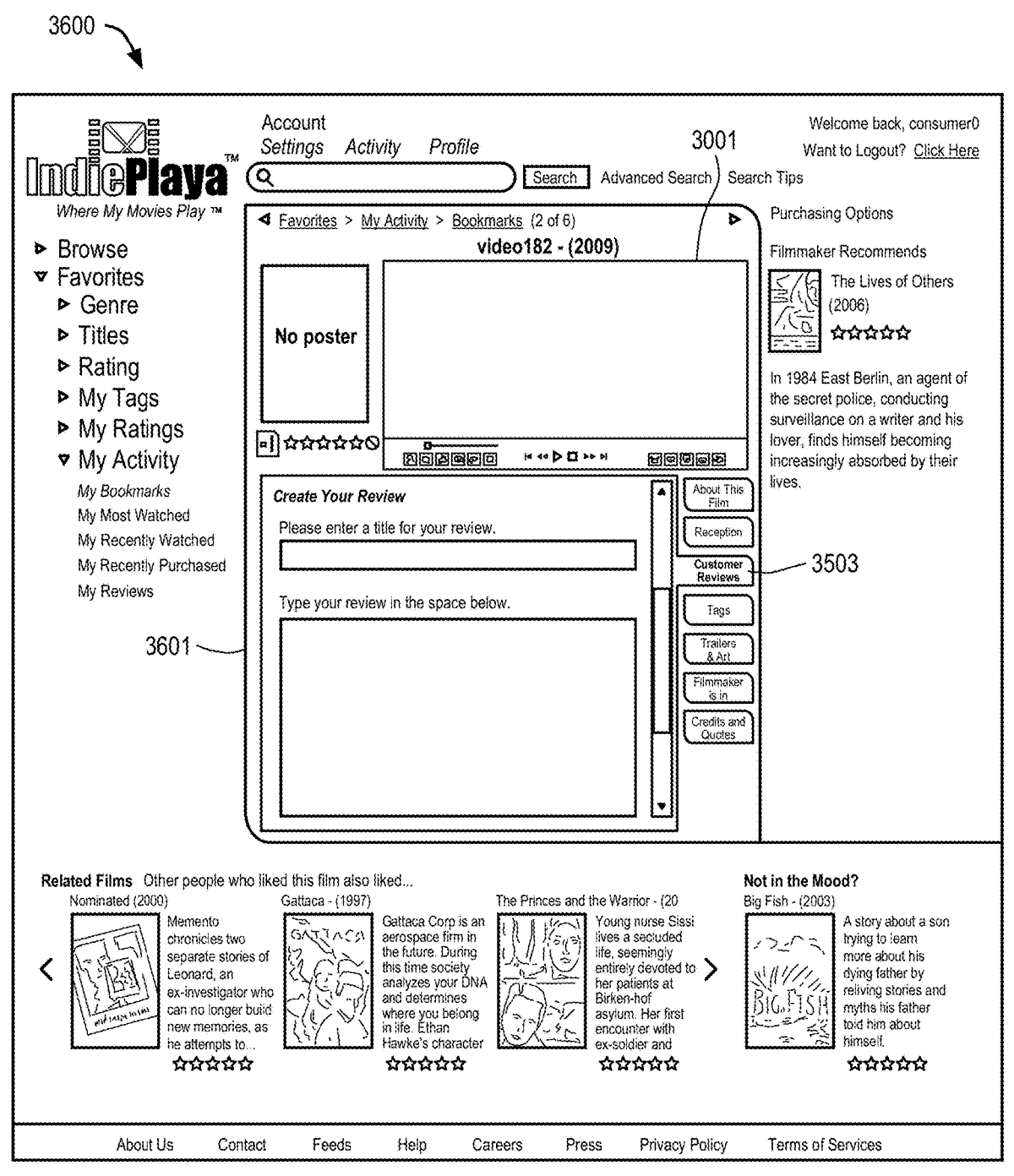
Figure 37:
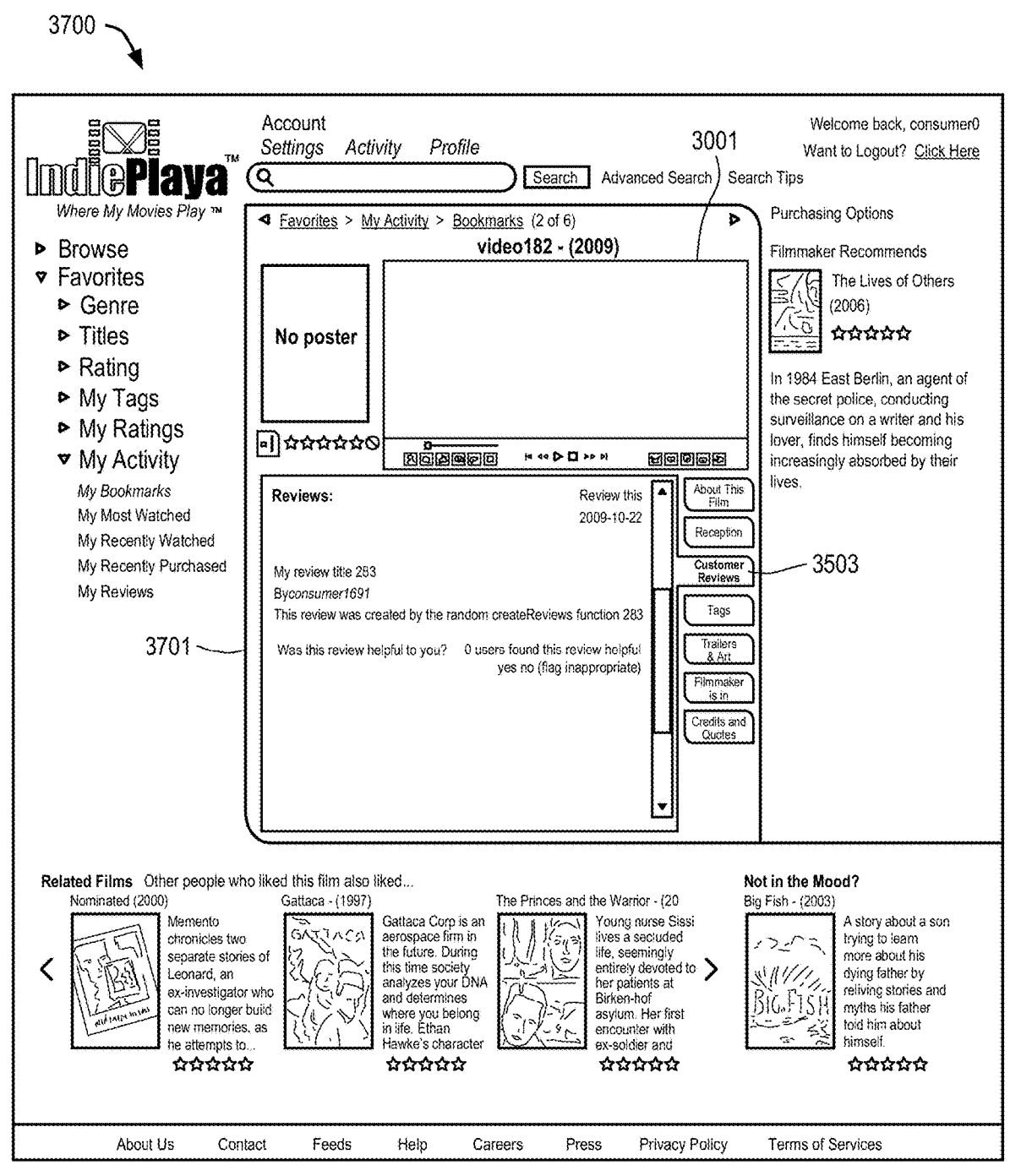

FIG. 36 shows an example interface 3600 including additional "reviews" control 3503 (e.g., a "customer reviews" control). Interacting with reviews control 3503 can cause the system to generate and display one or more areas in which a user (e.g., a customer) can enter data corresponding to a review of content (e.g., content displayed in viewing area 3001) in expanded viewing area 3601. Review data can be displayed (e.g., in accordance with manage profanities area 1202 noted in FIG. 12 above). For example, reviews can be edited automatically by the system to comply with graphic language area 1203, and types of language to restrict area 1204 in manage profanities area 1202 (e.g., noted above in FIG. 12). FIG. 37 shows an exemplary interface 3700 displaying review data in expanded viewing area 3701.

Figure 38:
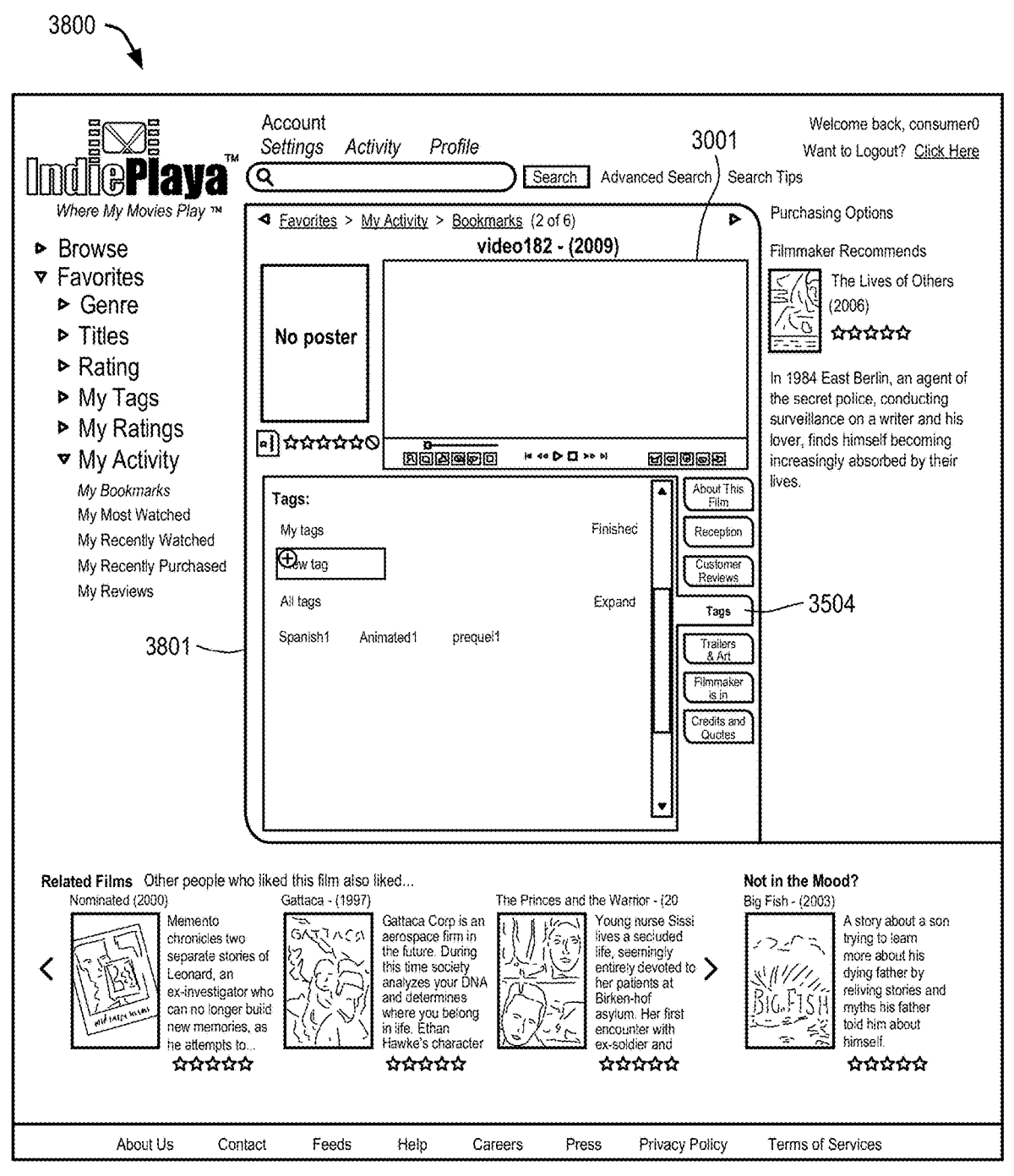
Figure 39:
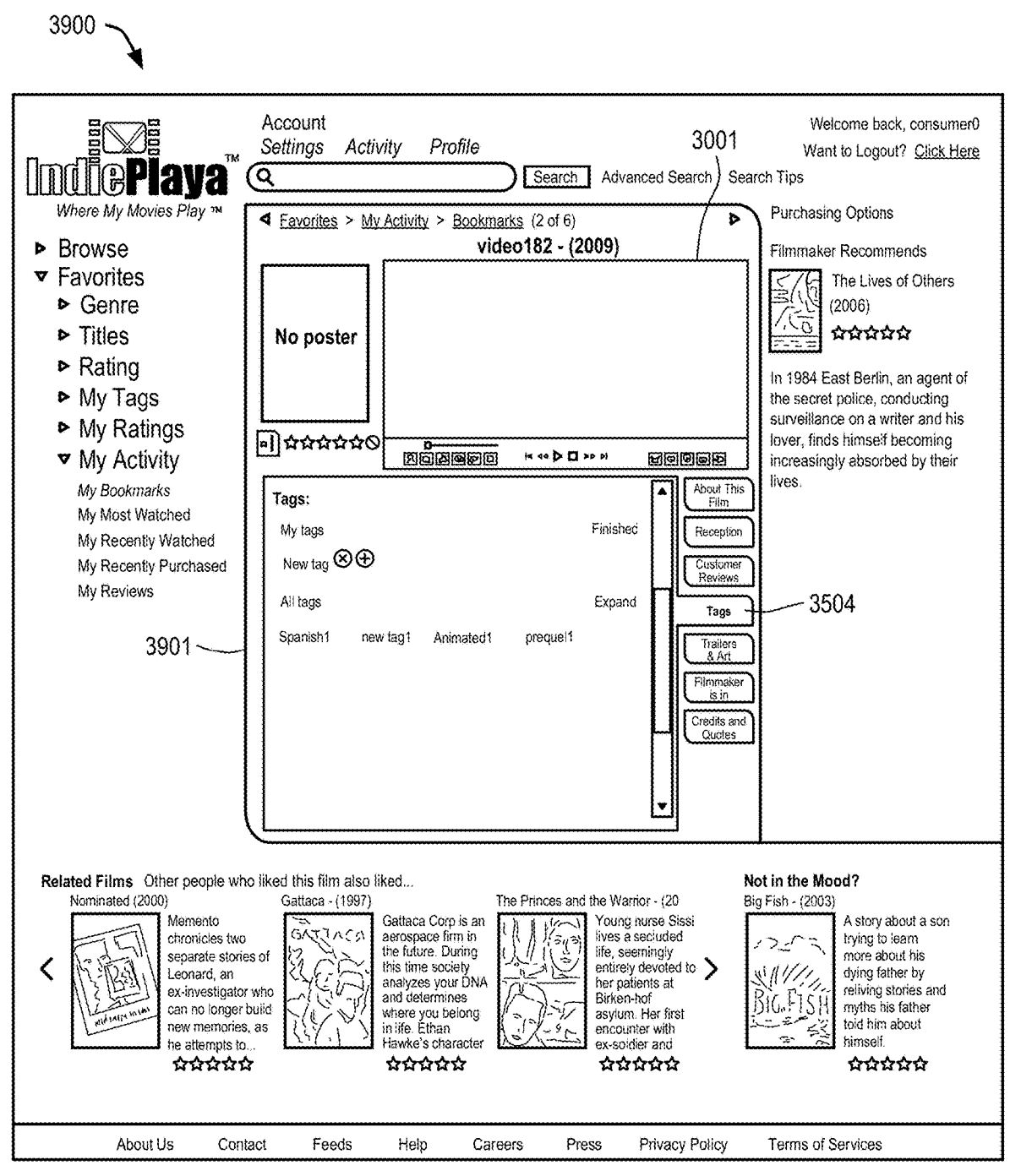

FIG. 38 shows an exemplary interface 3800 including additional "tags" control 3504. Interacting with the tags control 3504 can cause the system to generate and display one or more areas in which a user (e.g., a customer) can enter tag data corresponding to a content tag (e.g., a tag corresponding to and used to search for content displayed in viewing area 3001), in expanded viewing area 3801. Tag data can be displayed (e.g., in accordance with manage profanities area 1202 noted above). In some implementations, tags can be edited automatically by the system to comply with graphic language area 1203, and types of language to restrict area 1204 in manage profanities area 1202. FIG. 39 shows an exemplary interface 3900 displaying tag data in expanded viewing area 3901.

In some implementations, as noted with respect to FIG. 3 above, intelligence 305 can be processed and statistics can be automatically generated (e.g., in real-time) based upon website activity (e.g., audience 306 interaction). Generated statistics can be used (e.g., by the system) to generate one or more reports (e.g., based upon audience 306 interaction). For example, reports can be used by a content creator to examine account histories and to make one or more content recommendations or offers (e.g., licensing packages). Additionally, content recommendations or offers can be made available for a single account or for a group of related accounts.

Reports can be generated according to one or more parameters such as report type, report demographic, and report dimension. Report types can include, but are not limited to, business activity and site activity. In some implementations, business activity and site activity can be further categorized. For example, business activity can be categorized by revenues, purchases, impressions, streams, downloads, bookmarks, ratings, reviews, tags, insider interactions, video search click throughs, video search ad click throughs, video search ad impressions, and referral search ad impressions. Site activity, for example, can be categorized by visitors, logins, registrations, revenues, purchases, impressions, streams, downloads, bookmarks, ratings, reviews, tags, insider interactions, video search click throughs, video search ad click throughs, video search ad impressions, and referral search ad impressions.

Figure 40:
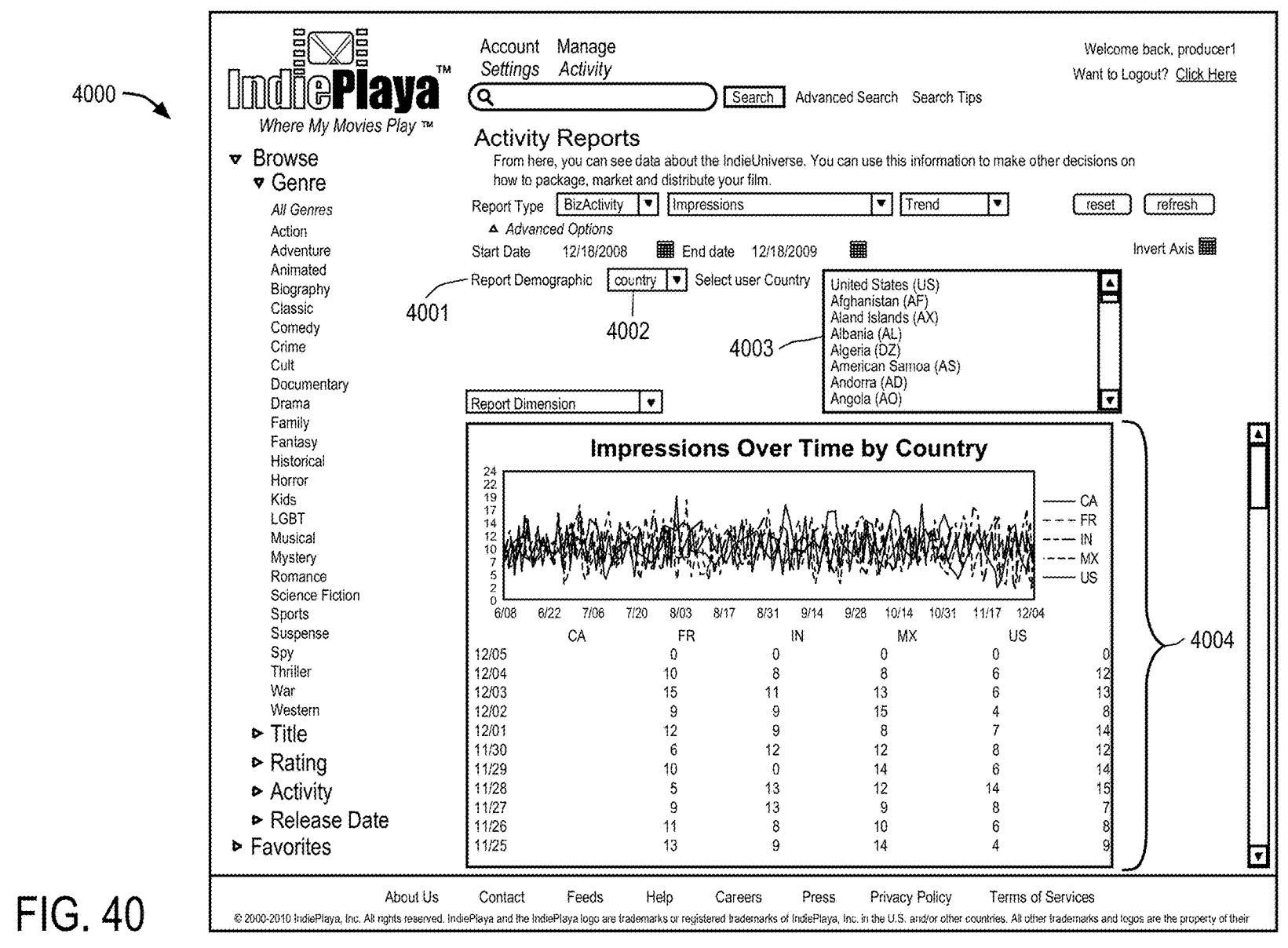

FIGS. 40-49 show exemplary interfaces for interacting with content to generate and display reports. FIG. 40 shows exemplary interface 4000 including an example activity report. In some implementations, an example activity report can include one or more selectable options for specifying content selection and for generating one or more graphic interpretations (e.g., scatter plot, pie chart, bar chart, etc.) of the selected content. In this example, an activity report has been generated based upon the report demographic 4001. Report demographic 4001 can include selectable region 4002 that can list one or more selectable report demographic options such as country, gender, or age. In this example, an activity report has been generated based upon a selection 4002 of report demographic 4001 country. Additionally, a selection 4002 of a report demographic 4001 country can cause the system to generate one or more additional options (e.g., dropdown menu 4003) for specifying content selection by geographic region (e.g., cities, states, towns, regions, countries, sets of countries, etc.). Example interface 4000 also includes a graphic interpretation 4004 of the selected content.

Figure 41:
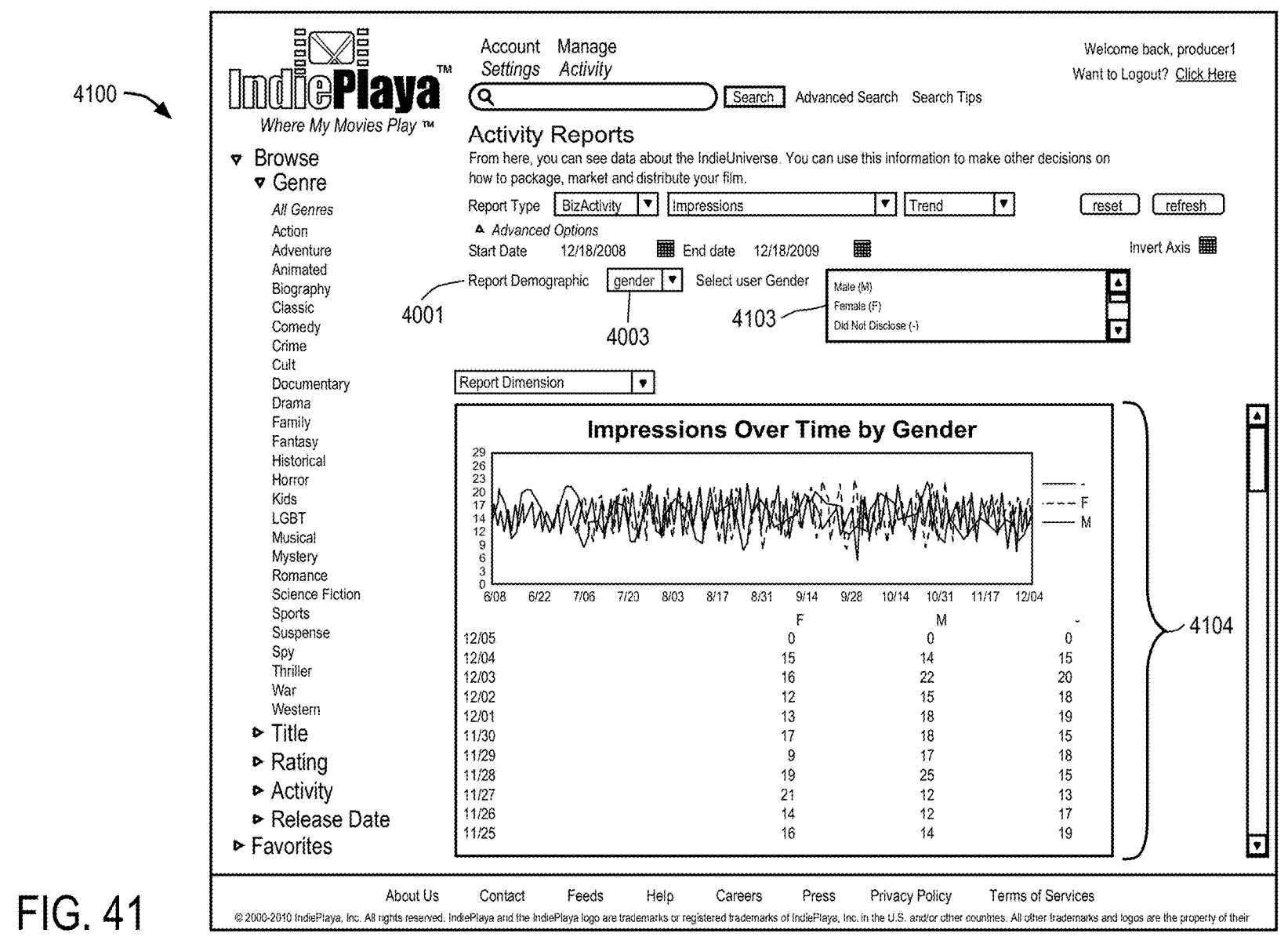
Figure 42:
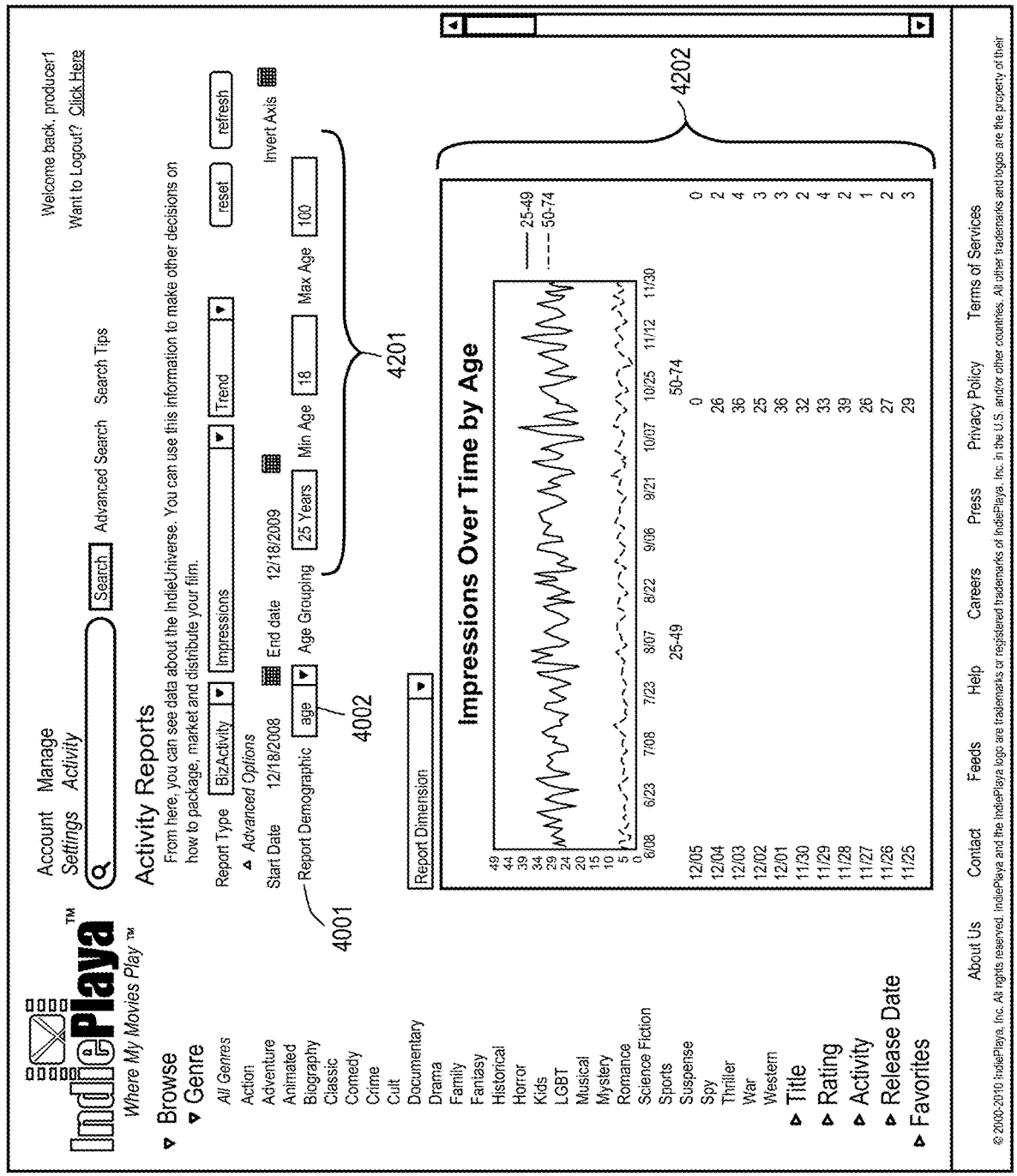
FIG. 42 shows an example of an interface including another exemplary activity report.

FIG. 41 shows an exemplary interface 4100 including another exemplary activity report. In this example, an activity report has been generated based upon a selection 4002 of the report demographic 4001 "gender". Additionally, a selection 4002 of a report demographic 4001 can cause the system to generate one or more additional options (e.g., dropdown menu 4103), for specifying content selection by gender. Exemplary interface 4100 also includes a graphic interpretation 4104 of the selected content. FIG. 42 shows an exemplary interface 4200 including another exemplary activity report. In this example, an activity report has been generated based upon a selection 4002 of a report demographic 4001 age. Additionally, a selection 4002 of a report demographic 4001 can cause the system to generate one or more additional options (e.g., options area 4201), for specifying content selection by age (e.g., age grouping, maximum age, or minimum age). Exemplary interface 4200 also includes a graphic interpretation 4202 of the selected content.

Figure 43:
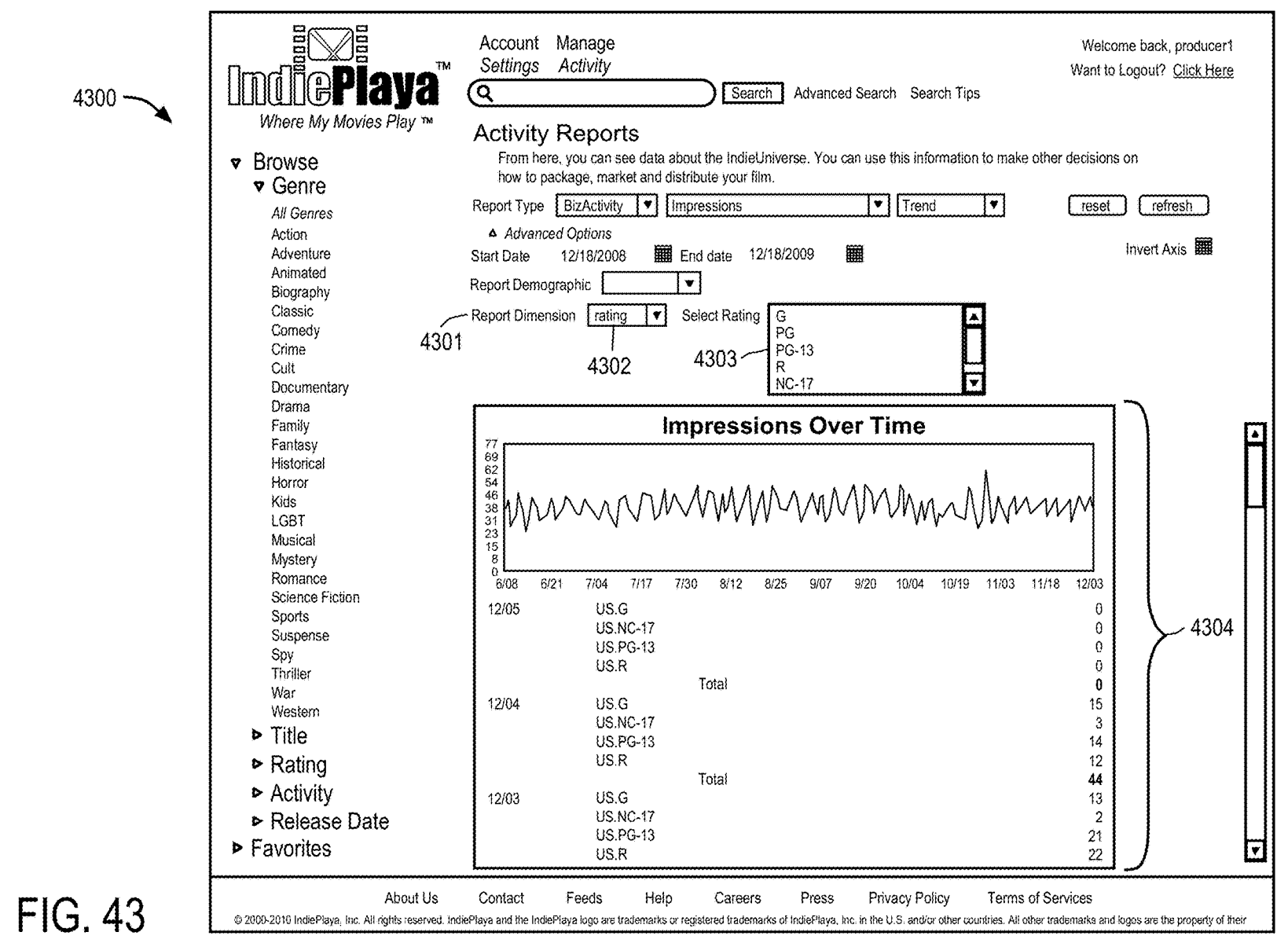

FIG. 43 shows an exemplary interface 4300 including another exemplary activity report. In this example, the activity report has been generated based upon the report dimension 4301. Report dimension 4301 can include a selectable region 4302 that can list one or more selectable report dimension options such as rating, video, genre, or type of license package. In this example, an activity report has been generated based upon a selection 4302 of report dimension 4301 rating. Additionally, a selection 4302 of a report dimension 4301 rating can cause the system to generate one or more additional options (e.g., dropdown menu 4303), for specifying content selection by rating. Exemplary interface 4300 also includes a graphic interpretation 4304 of the selected content.

Figure 44:
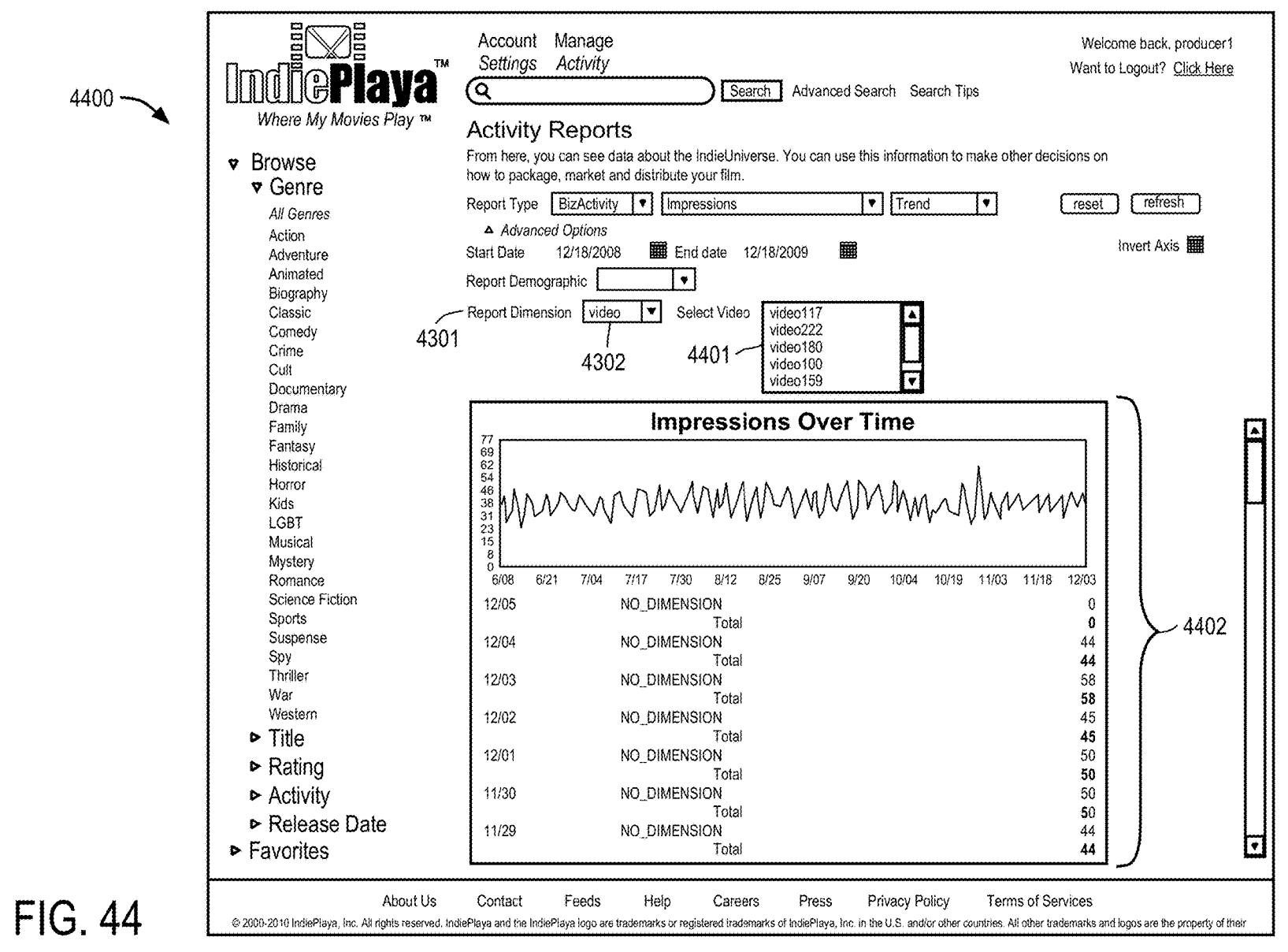
Figure 45:
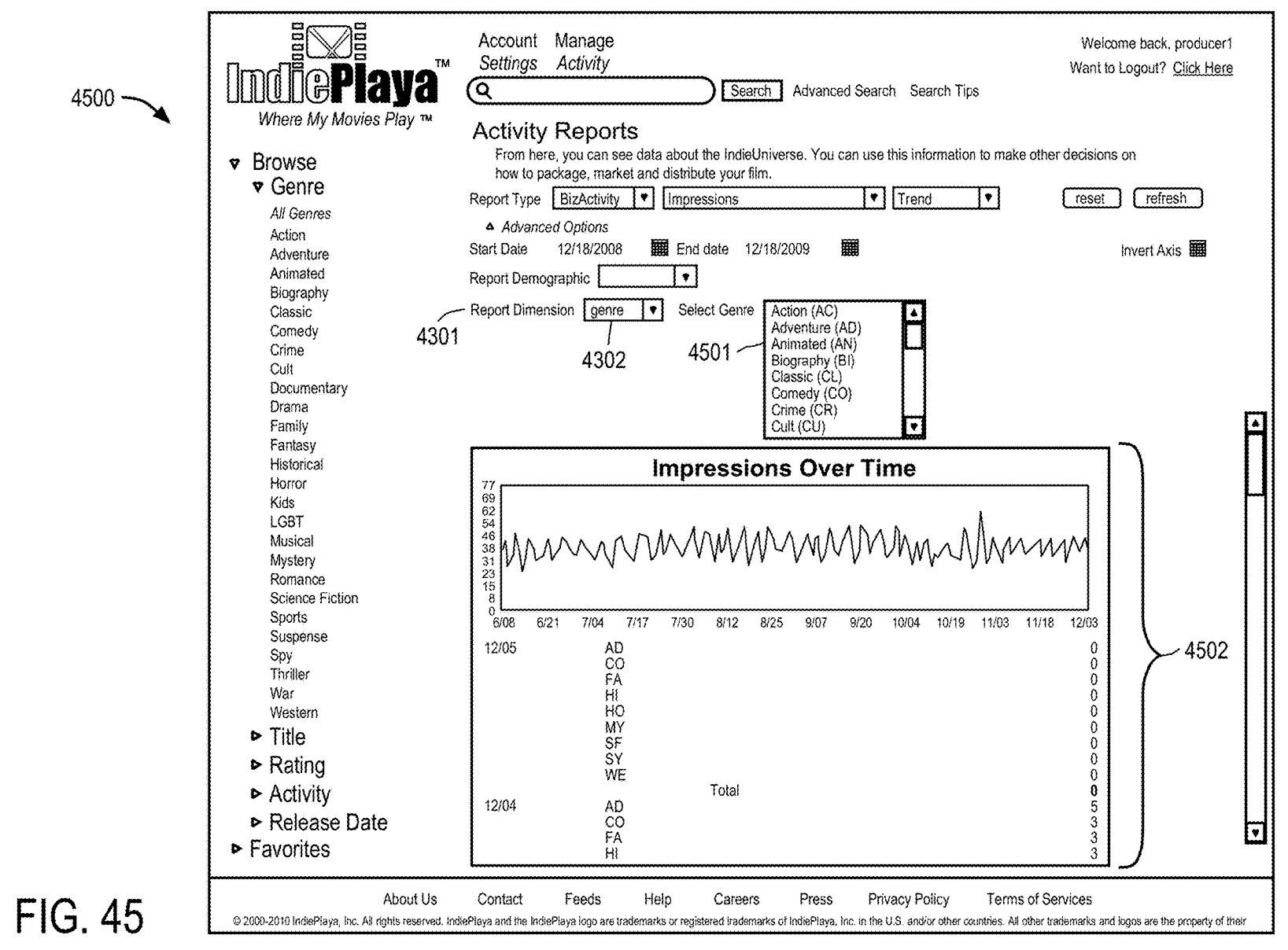

FIG. 44 shows an exemplary interface 4400 including another exemplary activity report. In this example, an activity report has been generated based upon a selection 4302 of the report dimension 4301 video. Additionally, a selection 4302 of a report dimension can cause the system to generate one or more additional options (e.g., dropdown menu 4401), for specifying content selection by video. Exemplary interface 4400 also includes a graphic interpretation 4402 of the selected content. FIG. 45 shows an exemplary interface 4500 including another example activity report. In this example, an activity report has been generated based upon a selection 4302 of report dimension 4301 genre. Additionally, a selection 4302 of the report dimension 4301 can cause the system to generate one or more additional options (e.g., dropdown menu 4501) for specifying content selection by genre. Exemplary interface 4500 also includes a graphic interpretation 4502 of the selected content.

Figure 46:
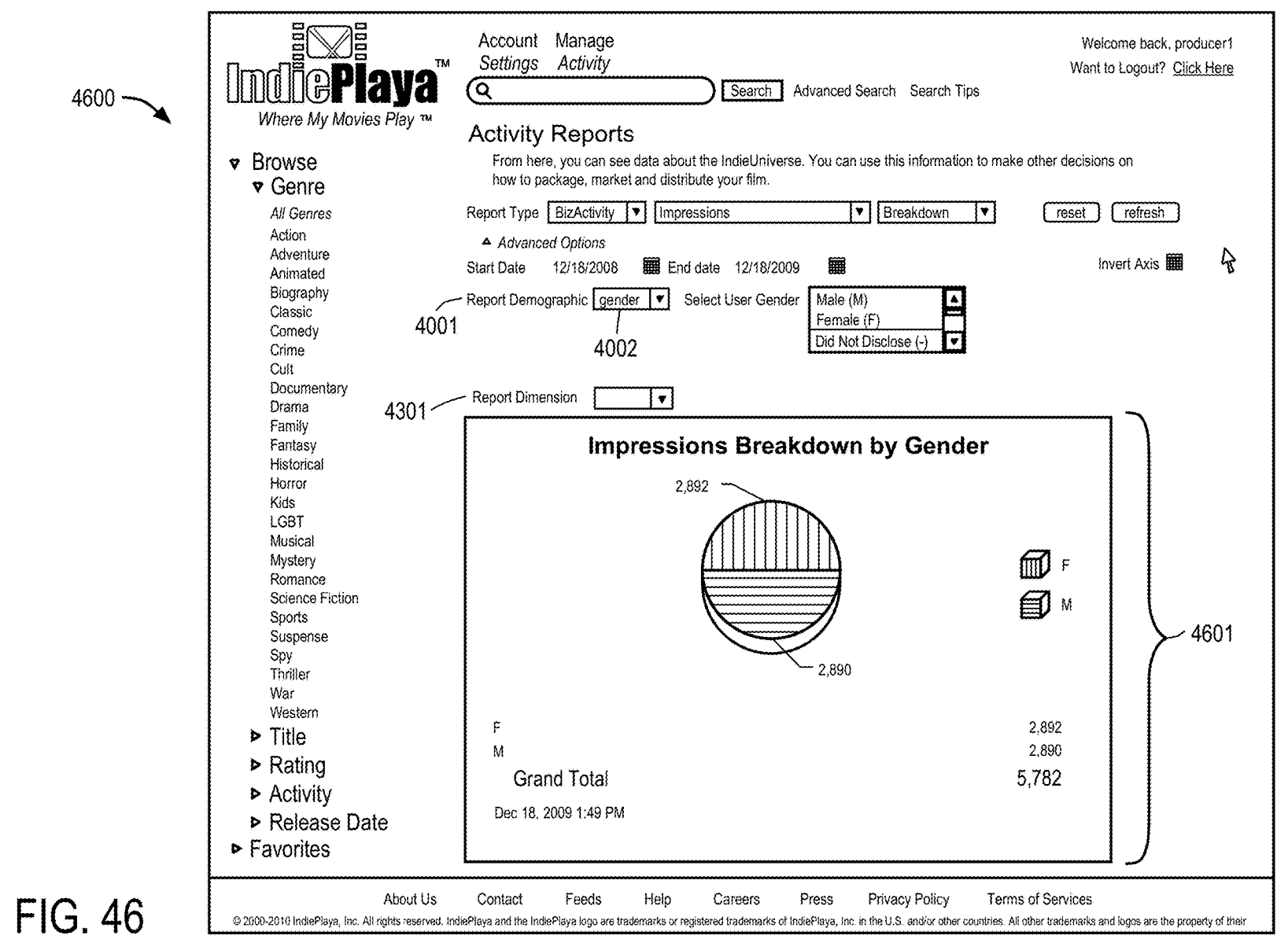
Figure 47:
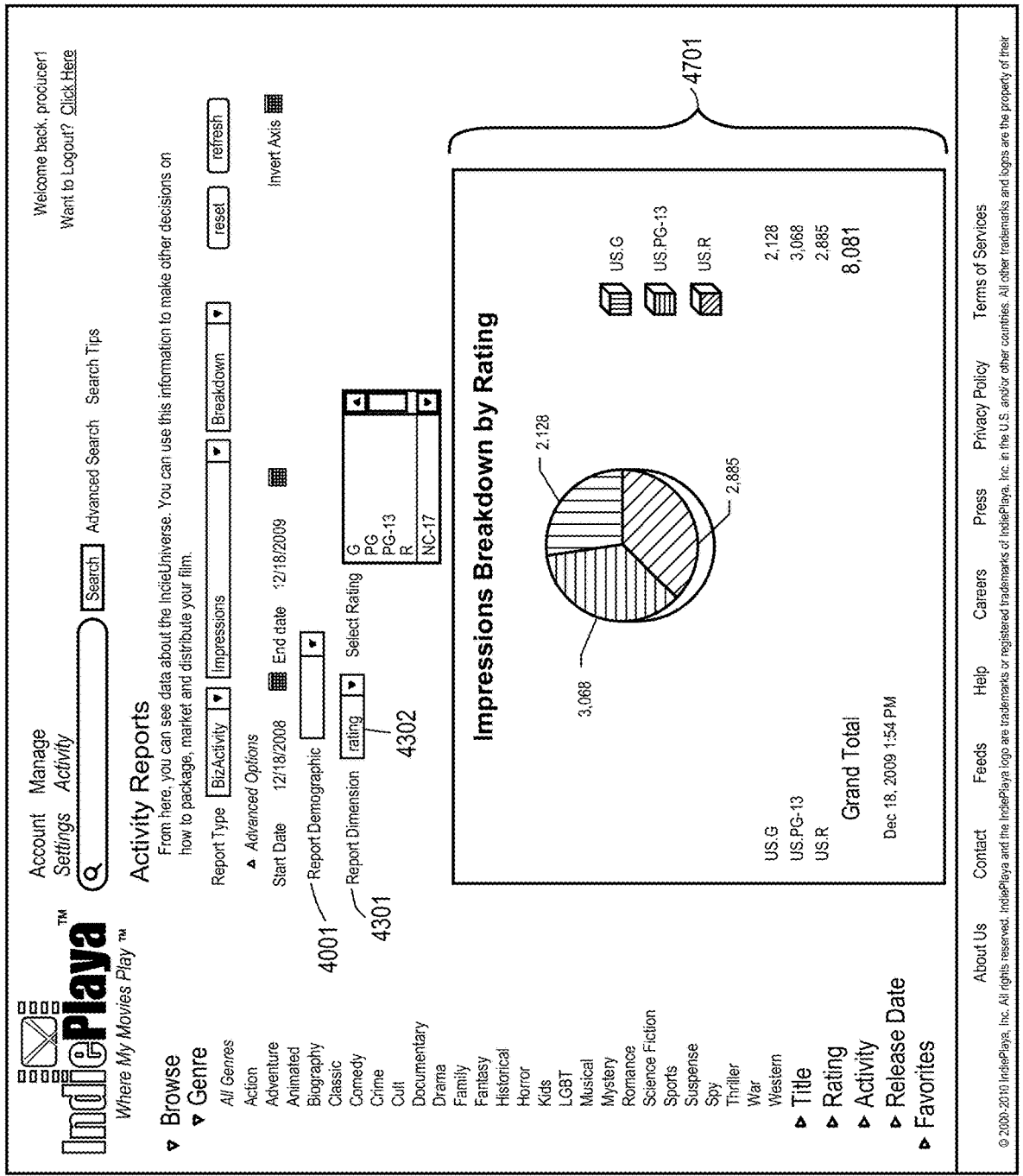
FIG. 47 shows an example of an interface including a pie chart graphic interpretation of content.

FIG. 46 shows an exemplary interface 4400 including a pie chart graphic interpretation 4601 of content. In this example, the content is graphically displayed in a pie chart 4601 in accordance with a selected 4002 report demographic 4001 gender. FIG. 47 shows an exemplary interface 4700 including a pie chart graphic interpretation 4701 of content. In this example, the content is graphically displayed in a pie chart 4701 in accordance with a selected 4302 report dimension 4301 rating. In some implementations, one or more reports can be generated based upon any combination of report demographic and report dimension selections.

Figure 48:
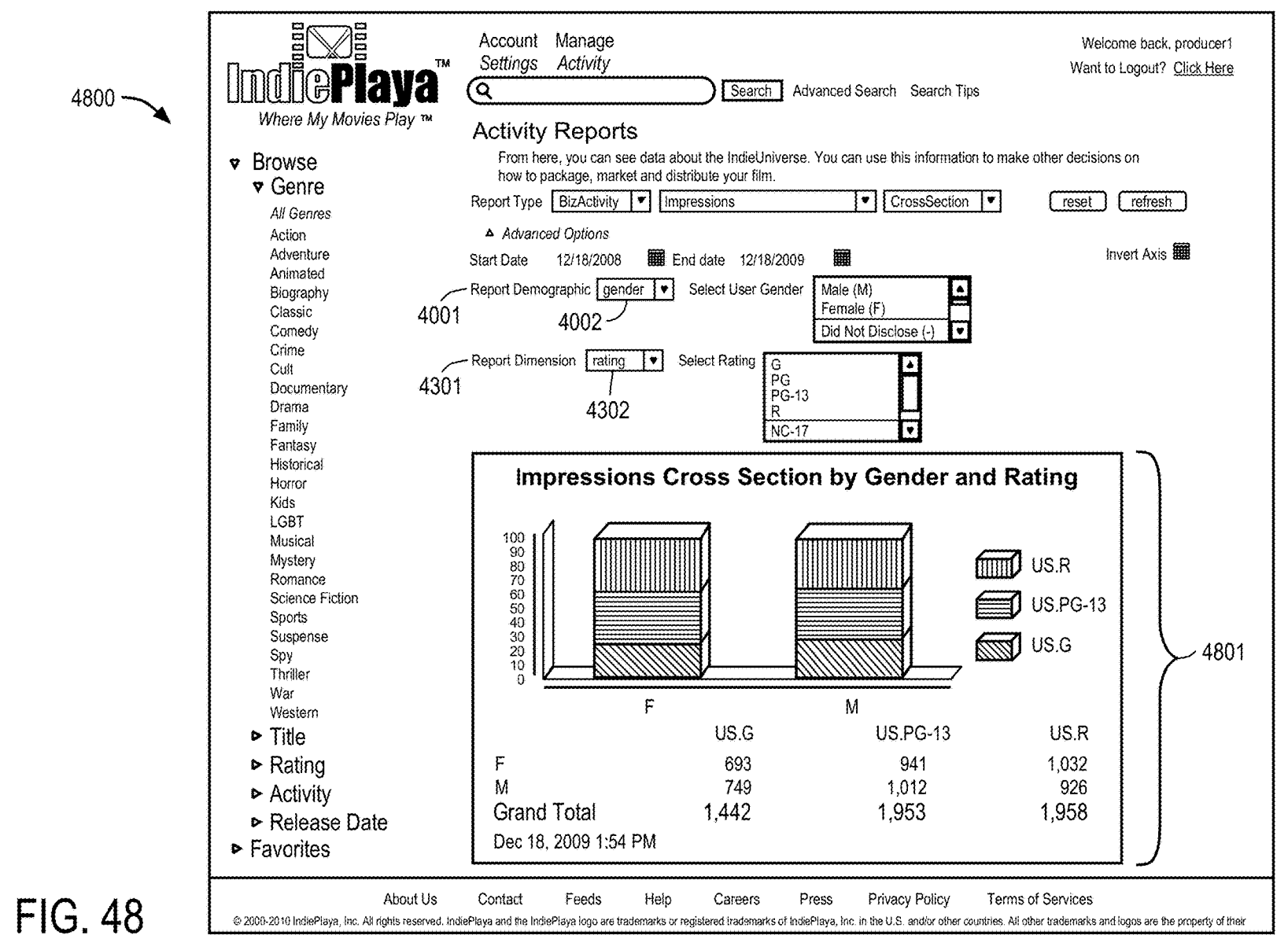
Figure 49:
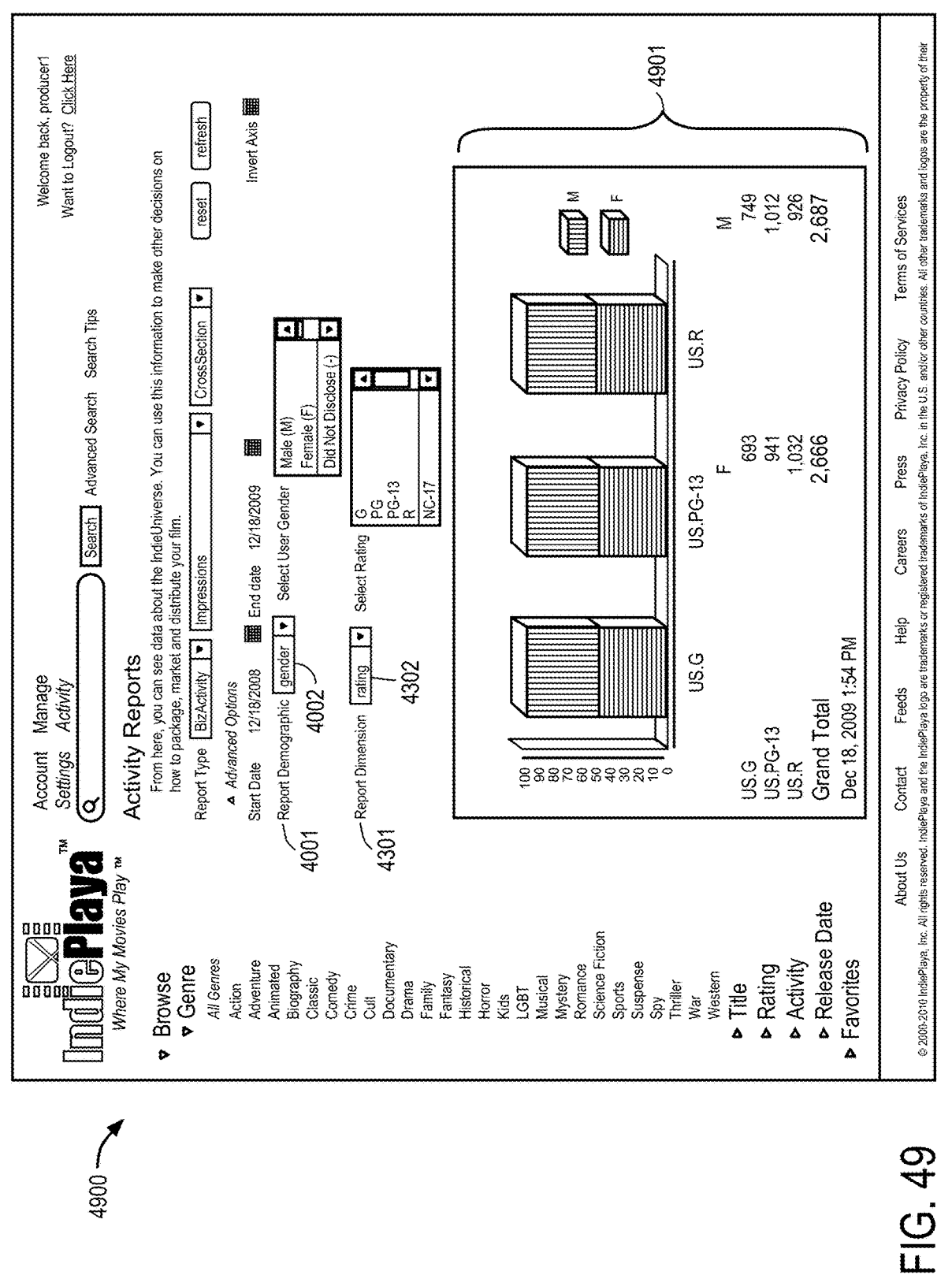

FIG. 48 shows an exemplary interface 4800 including a bar chart graphic interpretation 4801 of content. In this example, the content is graphically displayed in a bar chart 4801 in accordance with a selected 4002 report demographic 4001 gender and a selected 4302 report dimension 4301 rating (e.g., as a cross section graphic display by gender and rating). FIG. 49 shows an exemplary interface 4900 including a bar chart graphic interpretation 4901 of content. In this example, the content is graphically displayed in a bar chart 4901 in accordance with a selected 4002 report demographic 4001 gender and a selected 4302 report dimension 4301 rating (e.g., as a cross section graphic display by rating and gender).

Embodiments of the subject matter and the functional operations described in this specification optionally can be implemented in digital electronic circuitry, or in computer software, firmware, or hardware, including the structures disclosed in this specification and their structural equivalents, or in combinations of one or more of them. Embodiments of the subject matter described in this specification can, for example, be implemented as one or more computer program products, e.g., one or more modules of computer program instructions encoded on a computer-readable medium for execution by, or to control the operation of, data processing apparatus.

The computer-readable medium can be a machine-readable tangible storage device, a machine-readable tangible storage substrate, a tangible memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A computer program (also known as a program, software, software application, script, or code), can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed o a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method of providing access to content via a content distribution platform by which a plurality of content providers distribute a plurality of items of media content for users of the platform to access, the platform including a content database storing items of media content belonging to disparate content providers, each item of media content being associated with a media content characteristic and an access control parameter, the method being implemented by one or more data processors and comprising:

receiving data over a communications network by one or more of the data which includes user requests for distribution of items of media content according to access control parameters of those items of media content;

tracking, by the one or more data processors, numbers of accesses of a particular item of media content of a first content provider and a value of the access control parameter associated with those accesses;

automatically compiling, by the one or more data processors, demographic information associated with the user requests, media content access data and associated access control parameters for items of media content including the particular item, said compiling aggregating access data comprising the numbers of accesses and access control parameters for a plurality of items of media content, including the particular item of media content, having corresponding media content characteristics;

transmitting, by the one or more data processors, from the content distribution platform to the first content provider over the communications network, the access data in which impressions for the media content comprise parameters over two or more dimensions;

causing, by the one or more data processors, the access data to be displayed characterized in a graphical user interface (GUI) having at least one GUI element for content selection by an attribute;

receiving, by the one or more data processors, user-generated input via the at least one GUI element selecting an attribute;

causing, by the one or more data processors, the access data to be displayed characterized in the GUI as filtered by the selected attribute;

receiving, by the one or more data processors, data comprising a request from the first content provider to change a value of the access control parameter for the particular item for a specified demographic;

modifying, by the one or more data processors in response to the received data, the access control parameter in the particular item in the content database;

promoting, by the one or more data processors, the particular item in the content database to users in the specified demographic according to the modified access control parameter and by way of an online advertising campaign solely to the users in the specified demographic;

receiving, by the one or more data processors in response to the advertising campaign, a user identification from a terminal of a user in the specified demographic via a communication channel;

providing, by the one or more data processors, an authentication step in which a unique challenge is provided to a mobile device of the user and an authentication function is executed at the mobile device of the user that results in a response to the unique challenge being received via the communication channel;

as a criterion for determining whether a transaction is to be granted, determining, by the one or more data processors, a correctness of the response to the unique challenge received via the communication channel, wherein the authentication function is activated for a particular period of time upon determining that the response to the unique challenge is correct;

selectively providing, by the one or more data processors, the transaction that provides access to the particular item to the specified demographic via the content distribution platform according to the modified access control parameter for the period of time; and thereafter deactivating, by the one or more data processors, the authentication function upon expiration of the period of time.

2. The method of claim 1, further comprising capturing a user metric associated with each tracked access.

3. The method of claim 2, wherein the transmitted access data is filtered according to the user metric.

4. The method of claim 2, wherein the user metric is a location of an accesser.

5. The method of claim 1, wherein the access data is transmitted upon occurrence of a trigger condition.

6. The method of claim 5, wherein the trigger is based on a request received at the platform or a passage of time.

7. The method of claim 1, wherein the access data includes anonymized historical information regarding activity associated with one or more items of media content that share a common value media content characteristic and are associated with multiple content providers.

8. A computer-implemented system for providing access to content via a content distribution platform by which a plurality of content providers distribute a plurality of items of media content for users of the platform to access, the platform including a content database storing items of media content belonging to disparate content providers, each item of media content being associated with a media content characteristic and a license characteristic, the system comprising:

one or more data processors;

one or more computer-readable medium encoded with instructions for commanding the one or more data processors to execute steps comprising:

receiving user requests for distribution of items of media content according to license characteristics of those items of media content;

tracking accesses of a particular item of media content of a first content provider and a value of the license characteristic associated with those accesses;

compiling demographic information associated with the user requests, media content access data and associated license characteristics for items of media content including the particular item;

transmitting the access data from the content distribution platform to the first content provider;

receiving data comprising a request from the first content provider to change a value of the license characteristic for the particular item for a specified demographic;

modifying, in response to the received data, the license characteristic in the particular item in the content database;

promoting the particular item in the content database to users in the specified demographic according to the modified access control parameter and by way of an online advertising campaign solely to the users in the specified demographic; and selectively providing access to the particular item to the specified demographic according to the modified license characteristic by:

receiving a user identification from a terminal of a user in the specified demographic via a communication channel responsive to the advertising campaign;

providing an authentication step in which a unique challenge is provided to a mobile device of the user and an authentication function is executed at the mobile device of the user that results in a response to the unique challenge being received via the communication channel;

as a criterion for determining whether a transaction is to be granted, determining a correctness of the response to the unique challenge received via the communication channel, wherein the authentication function is activated for a particular period of time upon determining that the response to the unique challenge is correct; and thereafter deactivating the authentication function upon expiration of the period of time;

wherein:

the license characteristic comprises one or more of: a purchase price, an availability of content over a fixed period of time, an availability to download content or a geographic availability;

the media content characteristic comprises one or more of: genres, a country of origin, one or more spoken languages, a presence of subtitles, a release date, one or more professional or government certifications or ratings, a selection by one or more industry festivals or events, one or more nominations or grant of one or more awards, or a list of participants in the item of media content.

9. The system of claim 8, the steps further comprising capturing a user metric associated with each tracked access.

10. The system of claim 9, wherein the transmitted access data is filtered according to the user metric.

11. The system of claim 9, wherein the user metric is a location of an accesser.

12. The system of claim 8, wherein the access data is transmitted upon occurrence of a trigger condition.

13. The system of claim 12, wherein the trigger is based on a request received at the platform or a passage of time.

14. The system of claim 8, wherein the access data includes anonymized historical information regarding activity associated with one or more items of media content that share a common value media content characteristic and are associated with multiple content.

\* \* \* \* \*